US011122428B2

(12) United States Patent
Wang et al.

(10) Patent No.: US 11,122,428 B2
(45) Date of Patent: Sep. 14, 2021

(54) TRANSMISSION DATA PROTECTION SYSTEM, METHOD, AND APPARATUS

(71) Applicant: Huawei Technologies Co., Ltd., Shenzhen (CN)

(72) Inventors: Haiguang Wang, Singapore (SG); Fei Liu, Singapore (SG); Xin Kang, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 508 days.

(21) Appl. No.: 16/237,902

(22) Filed: Jan. 2, 2019

(65) Prior Publication Data
US 2019/0141524 A1    May 9, 2019

Related U.S. Application Data

(63) Continuation of application No. PCT/CN2017/077952, filed on Mar. 23, 2017.

(30) Foreign Application Priority Data

Jul. 6, 2016    (CN) .......................... 201610526350.0

(51) Int. Cl.
*H04W 12/041*    (2021.01)
*H04L 29/06*    (2006.01)
(Continued)

(52) U.S. Cl.
CPC ............. *H04W 12/041* (2021.01); *H04L 9/08* (2013.01); *H04L 9/30* (2013.01); *H04L 29/06* (2013.01);
(Continued)

(58) Field of Classification Search
None
See application file for complete search history.

(56) References Cited

U.S. PATENT DOCUMENTS 7,003,117 B2    2/2006 Kacker et al.
7,827,408 B1*  11/2010 Gehringer ............. H04L 9/0631
                                                        713/170
(Continued)

FOREIGN PATENT DOCUMENTS

CN    101626294 A    1/2010
CN    101951603 A    1/2011
(Continued)

OTHER PUBLICATIONS

Youngblood "An Introduction to Identity-Based Cryptography," CSEP 590TU, Mar. 2005, pp. 1-7 (Year: 2005).*
(Continued)

*Primary Examiner* — Luu T Pham
*Assistant Examiner* — James J Wilcox
(74) *Attorney, Agent, or Firm* — Slater Matsil, LLP

(57) ABSTRACT

A system for transmission data protection includes user equipment (UE) and an access point. The access point sends a broadcast message that carries a public key for encryption. The UE receives and stores the public key for encryption. The UE obtains a global public key or a private key corresponding to the UE, and protects transmission data using the public key for encryption and the global public key or the private key corresponding to the UE.

8 Claims, 23 Drawing Sheets

(51) Int. Cl.
*H04L 9/08* (2006.01)
*H04L 9/30* (2006.01)
*H04W 12/0433* (2021.01)
*H04L 29/08* (2006.01)
*H04W 8/04* (2009.01)
*H04W 12/02* (2009.01)
*H04W 12/06* (2021.01)

(52) U.S. Cl.
CPC ...... *H04L 63/0435* (2013.01); *H04L 63/0876* (2013.01); *H04L 67/02* (2013.01); *H04W 8/04* (2013.01); *H04W 12/02* (2013.01); *H04W 12/0433* (2021.01); *H04W 12/06* (2013.01)

(56) References Cited

U.S. PATENT DOCUMENTS

| | | | |
|---|---|---|---|
| 7,961,879 B1 | 6/2011 | Spies et al. | |
| 8,108,678 B1* | 1/2012 | Boyen | H04L 9/0847 713/176 |
| 8,589,679 B2* | 11/2013 | Chen | H04L 9/321 713/165 |
| 8,964,982 B2 | 2/2015 | Takeuchi et al. | |
| 9,032,501 B1* | 5/2015 | Martin | H04L 63/061 726/10 |
| 9,106,410 B2 | 8/2015 | Sundaram | |
| 9,191,208 B2* | 11/2015 | Yagisawa | H04L 9/083 |
| 9,203,626 B2* | 12/2015 | Zizzi | H04L 9/0866 |
| 9,928,379 B1* | 3/2018 | Hoffer | G16H 40/67 |
| 10,136,310 B2* | 11/2018 | Rainisto | H04L 9/3231 |
| 10,263,965 B2* | 4/2019 | Mosko | H04L 9/00 |
| 10,305,864 B2* | 5/2019 | Wood | H04L 63/0428 |
| 10,454,674 B1* | 10/2019 | Bar-El | H04L 9/0637 |
| 10,880,085 B1* | 12/2020 | Kongs | H04L 63/061 |
| 2005/0084100 A1 | 4/2005 | Spies et al. | |
| 2005/0089173 A1* | 4/2005 | Harrison | H04L 9/0866 380/277 |
| 2005/0135610 A1* | 6/2005 | Chen | H04L 9/3247 380/30 |
| 2006/0026426 A1* | 2/2006 | Chen | H04L 9/3073 713/168 |
| 2006/0126832 A1* | 6/2006 | Takahashi | H04L 9/3073 380/30 |
| 2006/0215837 A1* | 9/2006 | Chen | H04L 9/3252 380/44 |
| 2007/0199071 A1* | 8/2007 | Callas | H04L 9/3073 726/26 |
| 2008/0214175 A1* | 9/2008 | Papadoglou | H04W 88/16 455/422.1 |
| 2009/0208019 A1* | 8/2009 | Celik | H04L 9/085 380/277 |
| 2010/0250949 A1 | 9/2010 | Torino et al. | |
| 2013/0212377 A1* | 8/2013 | Malek | H04L 9/0825 713/155 |
| 2013/0301611 A1* | 11/2013 | Baghel | H04W 72/04 370/331 |
| 2015/0156176 A1* | 6/2015 | Collinge | G06Q 20/4012 713/168 |
| 2015/0372819 A1 | 12/2015 | Luukkala et al. | |
| 2016/0219043 A1* | 7/2016 | Blanke | G06F 21/42 |
| 2017/0222993 A1* | 8/2017 | Dearlove | H04W 12/04 |
| 2017/0339044 A1* | 11/2017 | Garcia Morchon | H04L 12/185 |
| 2017/0366520 A1* | 12/2017 | Templin | H04L 9/3268 |
| 2019/0052611 A1* | 2/2019 | Templin | H04L 63/0442 |
| 2019/0158283 A1* | 5/2019 | Kang | H04L 9/30 |
| 2019/0159023 A1* | 5/2019 | Wang | H04L 63/062 |
| 2019/0268882 A1* | 8/2019 | Baghel | H04W 12/03 |
| 2020/0267693 A1* | 8/2020 | Baghel | H04L 67/18 |
| 2021/0014819 A1* | 1/2021 | Oduwaiye | H04W 28/16 |

FOREIGN PATENT DOCUMENTS

| | | | | |
|---|---|---|---|---|
| CN | 103002417 A | 3/2013 | | |
| CN | 103166919 A | 6/2013 | | |
| CN | 103166931 A | 6/2013 | | |
| CN | 103812650 A | 5/2014 | | |
| CN | 104243153 A | 12/2014 | | |
| CN | 104901803 A | 9/2015 | | |
| CN | 104902471 A | 9/2015 | | |
| WO | 2005001629 A2 | 1/2005 | | |
| WO | 2008047195 A1 | 4/2008 | | |
| WO | WO-2008047195 A1 * | 4/2008 | ......... | H04L 63/0869 |
| WO | 2013012734 A1 | 1/2013 | | |

OTHER PUBLICATIONS

Pradeep et al "Global Public Key Algorithm for Secure Location Service in VANET," Oct. 2009, pp. 1-6 (Year: 2009).*
"pCR to add IBC managed Content Encryption Key (CEK) for S/MIME," Source: Motorola Solutions and Alcatel-Lucent, Document for: Discussion and Approval, Agenda Item: MCPTT, Work Item / Release: MCPTT/Rel-13, 3GPP TSG SA WG3 (Security) Meeting #81, S3-152514, Nov. 9-13, 2015 Anaheim, CA, 5 pages.
Nan, L. et al., "Research on Key Management Technology in Identity-based Cryptography," Information Engineering University, 2012, with English abstract, A Dissertation Submitted to PLA Information Engineering University for the Degree of Master of Military Science, 2010, 58 pages.
"3rd Generation Partnership Project; Technical Specification Group Services and System Aspects; Study on Architecture for Next Generation System (Release 14)," 3GPP TR 23.799 V0.5.0, May 2016, 178 pages.
"3rd Generation Partnership Project; Technical Specification Group Services and System Aspects; Study on the security aspects of the next generation system (Release 14)," 3GPP TR 33.899 V0.2.0, May 2016, 75 pages.
"pCR to add IBC managed Content Encryption Key (CEK) for S/MIME," Source: Motorola Solutions and Alcatel-Lucent, Document for: Discussion and Approval, Agenda Item: MCPTT, Work Item / Release: MCPTT/Rel-13, 3GPP TSG SA WG3 (Security) Meeting #81, S3-152231, Anaheim, CA, Nov. 9-13, 2015, 5 pages.
Van Den Broek, F. et al., "Defeating IMSI Catchers," CCS'15, Denver, Colorado, Oct. 12-16, 2015, 12 pages.

* cited by examiner

TRANSMISSION DATA PROTECTION SYSTEM, METHOD, AND APPARATUS

CROSS-REFERENCE TO RELATED APPLICATIONS

This application is a continuation of International Application No. PCT/CN2017/077952, filed on Mar. 23, 2017, which claims priority to a continuation of Chinese Application No. 201610526350.0, filed on Jul. 6, 2016. The disclosures of the aforementioned applications are hereby incorporated by reference in their entireties.

TECHNICAL FIELD

The present invention relates to the field of communications technologies, and in particular, to a transmission data protection system, method, and apparatus.

BACKGROUND

In a 4G network, a shared key is not established between user equipment (UE) and a network before mutual authentication between the UE and the network is completed. Data is transmitted between the UE and the network in a plaintext transmission manner, and an attacker can easily intercept identity information of the UE by using air interface signaling, thereby causing privacy leakage of the UE. The above security risk of data transmission also exists in a 5G network.

In the prior art of the 4G network, in order to protect the identity information, the UE needs to add non-permanent identity information, such as pseudo mobile subscriber information (PMSI), of the UE to an attachment request to be sent to the network. After receiving the PMSI of the UE, the network side allocates new PMSI to the UE and transmits the new PMSI to the UE by using an authorization vector. After receiving the new PMSI, the UE may use the new PMSI to send an attachment request to the network side during next network access, so as to avoid using permanent identity information (such as an international mobile subscriber identity (IMSI)) of the UE to send the attachment request, thereby preventing the attacker from eavesdropping the IMSI of the UE through an air interface and avoiding privacy leakage of the UE. However, because the UE uses new PMSI to send an attachment request to an home subscriber server (HSS) every time, the network side needs to maintain update of a temporary identity of the UE, which increases complexity of a network side server, has high implementation costs, and has low applicability in data transmission of the 5G network.

In addition, in the 5G network, in order to better support data transmission of an Internet of Things (TOT) device, it is also necessary to protect transmission of connectionless data. In 3GPP TR 22.799, during transmission of connectionless data, after the UE and the network are authenticated and a connection is established between the UE and the network, the network side generates a cookie including a security context for the UE and sends the cookie to the UE; the UE receives the cookie that carries the security context and that is sent by the network side, and stores the cookie; and when the UE needs to send data, the UE encrypts the data by using the security context information included in the cookie, and sends the cookie along with the security context to the network side. After receiving the cookie including the security context, a base station or the network side uses information provided in the cookie to reconstruct the security context and decrypt the data packet. Because content of the cookie may be large, signaling overheads of the data transmission are increased. In addition, the cookie includes privacy information such as a user identity, and sensitive information such as the user identity in the cookie cannot be protected, thereby causing a security risk.

SUMMARY

This application provides a transmission data protection system, method, and apparatus, so as to protect transmission data and filter out insecure data, thereby improving network security.

According to a first aspect, a transmission data protection system is provided, and the protection system may include user equipment UE and an access point, where the access point is configured to send a broadcast message, where the broadcast message carries a public key for encryption, the UE is configured to receive the broadcast message of the access point and store the public key for encryption, the UE is further configured to, when transmission data needs to be sent to the access point, obtain a global public key in an identity based cryptography IBC technology or a private key corresponding to the UE from first prestored data of the UE, and protect the transmission data by using the public key for encryption and the global public key or the private key corresponding to the UE, to obtain a protection message, the UE is further configured to send the protection message to the access point, where the protection message carries an indication message indicating a protection manner of the transmission data, the access point is further configured to, after receiving the protection message, obtain the global public key and a private key corresponding to the access point from second prestored data of the access point based on the indication message indicating the protection manner, and parse the protection message by using the global public key and the private key corresponding to the access point, to obtain the transmission data sent by the UE, and the access point is further configured to send, to a core network, the transmission data that is obtained through parsing and that is sent by the UE.

In this application, when the UE sends uplink data to the access point, the UE may use information such as an identity of the access point as the public key for encryption, and encrypt the to-be-uploaded transmission data by using the global public key in the IBC technology, so as to effectively protect air interface signaling and data in a network and avoid leakage of user privacy and signaling content. The access point decrypts, signs, and attempts to authenticate, by using a message authentication code, the message sent by the UE, to filter out invalid signaling and data and protect security of the core network.

With reference to the first aspect, in a first possible implementation, the global public key includes a first global public key and a second global public key, and the private key corresponding to the access point includes a first private key and a second private key, and the access point is further configured to, before sending the broadcast message, obtain system parameters from a network or a key management system KMS and store the system parameters as the second prestored data of the access point, where the system parameters include the public key for encryption and at least one of the following two groups of data, including the first global public key and the first private key, or the second global public key and the second private key, where the first global public key is a global public key $GPK_{enc}$ for data encryption in the IBC technology, the first private key is a private key $SKB_{BS\_ID\_enc}$ for data encryption corresponding to the access point in the IBC technology, the second global public key is a global public key $GPK_{Sig}$ for data signature in the IBC technology, and the second private key is a private key $SK_{BS\_ID\_Sig}$ for data signature corresponding to the access point in the IBC technology.

With reference to the first possible implementation of the first aspect, in a second possible implementation, the public key for encryption is a base station BS identity BS_ID, or the public key for encryption includes a BS_ID, or the public key for encryption includes a media access control MAC address of a Wireless Fidelity Wi-Fi access point AP or a service set identifier SSID of a Wi-Fi AP, or the public key for encryption includes a hotspot UE identity UE_ID or an international mobile subscriber identity IMSI of hotspot UE.

With reference to the first aspect, in a third possible implementation, the global public key includes a first global public key and a second global public key, and the private key corresponding to the UE includes a third private key and a fourth private key, and the UE is further configured to, before receiving the broadcast message of the access point, obtain, from a network or a KMS, processing parameters used by the UE to process the transmission data, and store the processing parameters as the first prestored data of the UE, where the processing parameters include an identity (operator ID1) of an operator to which the UE belongs, and at least one of the following three groups of data, including the first global public key, or the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

With reference to the second possible implementation of the first aspect or the third possible implementation of the first aspect, in a fourth possible implementation, the second prestored data includes the $GPK_{Sig}$ and the $SK_{BS\_ID\_Sig}$, and the access point is further configured to sign the broadcast message by using the $GPK_{Sig}$ and the $SK_{BS\_ID\_Sig}$, to obtain a signature Sig1 of the broadcast message, and add indication information indicating that the access point has a data signature function or the signature Sig1 of the broadcast message to the broadcast message.

With reference to the fourth possible implementation of the first aspect, in a fifth possible implementation, the first prestored data includes the operator ID1 and the $GPK_{Sig}$, and the UE is specifically configured to determine, based on the indication information carried in the received broadcast message, that the access point has a data signature function, and determine, based on identification information of the access point corresponding to the broadcast message, an identity (operator ID2) of an operator to which the access point belongs, match the operator ID2 with the operator ID1, and search the first prestored data for a third global public key $GPK_{Sig}1$ corresponding to the access point, when the broadcast message carries the signature Sig1, attempt to authenticate the broadcast message by using the $GPK_{Sig}1$ and the identification information of the access point, and when the broadcast message has been authenticated, determine to add, to the first prestored data, the public key for encryption that is carried in the broadcast message.

With reference to the fifth possible implementation of the first aspect, in a sixth possible implementation, the first prestored data includes the $GPK_{enc}$, and the UE is specifically configured to when the transmission data needs to be sent to the access point, obtain the public key for encryption and the $GPK_{enc}$ from the first prestored data, and encrypt the transmission data by using the public key for encryption and the $GPK_{enc}$, to obtain the protection message, where the protection manner of the transmission data is encrypting the transmission data by using the public key for encryption and the $GPK_{enc}$.

With reference to the sixth possible implementation of the first aspect, in a seventh possible implementation, the second prestored data includes the $GPK_{enc}$, the $SK_{BS\_ID\_enc}$, the $GPK_{Sig}$, and the $SK_{BS\_ID\_Sig}$, and the access point is specifically configured to determine the protection manner of the transmission data based on the indication message indicating the protection manner, obtain the $SK_{BS\_ID\_enc}$ and the $GPK_{enc}$ from the second prestored data, and decrypt the protection message by using the $SK_{BS\_ID\_enc}$ and the $GPK_{enc}$, to obtain a decrypted message, and perform the step of sending, to the core network, the transmission data that is carried in the decrypted message and that is sent by the UE.

With reference to the fifth possible implementation of the first aspect, in an eighth possible implementation, the first prestored data includes the $GPK_{enc}$ and the $SK_{UE\_ID\_enc}$, the UE is specifically configured to, when the transmission data needs to be sent to the access point, obtain the public key for encryption, the $GPK_{enc}$, and the $SK_{UE\_ID\_enc}$ from the first prestored data, generate a first symmetric key K1 based on the public key for encryption, the $GPK_{enc}$, and the $SK_{UE\_ID\_enc}$, and input the transmission data and the K1 into a system function to obtain a third message authentication code MAC 2, and encrypt the transmission data, identification information of the UE, and the MAC 2 by using the public key for encryption and the $GPK_{enc}$, to obtain the protection message, where the protection manner of the transmission data is encrypting the transmission data, the identification information of the UE, and the MAC 2 by using the public key for encryption and the $GPK_{enc}$.

With reference to the eighth possible implementation of the first aspect, in a ninth possible implementation, the second prestored data includes the public key for encryption, the $GPK_{enc}$, and the $SK_{BS\_ID\_enc}$, the access point is specifically configured to determine the protection manner of the transmission data based on the indication message indicating the protection manner, obtain the $GPK_{enc}$ and the $SK_{BS\_ID\_enc}$ from the second prestored data, and decrypt the protection message by using the $SK_{BS\_ID\_enc}$ and the $GPK_{enc}$, to obtain a decrypted message, and the access point is further configured to obtain the MAC 2, the identification information of the UE, and the transmission data that are carried in the protection message from the decrypted message, generate a symmetric key K2 by using the identification information of the UE, the $GPK_{enc}$, and the $SK_{BS\_ID\_enc}$, and calculate a fourth message authentication code MAC 3 by using the symmetric key K2, the identification information of the UE, and the transmission data obtained through decryption, and when the MAC 3 matches the MAC 2, perform the step of sending, to the core network, the transmission data sent by the UE.

With reference to the fifth possible implementation of the first aspect, in a tenth possible implementation, the first prestored data includes the $GPK_{enc}$ and the $SK_{UE\_ID\_Sig}$, said the UE is specifically configured to, when the transmission data needs to be sent to the access point, obtain the public key for encryption, the $GPK_{enc}$, the $GPK_{sig}$, and the $SK_{UE\_ID\_Sig}$ from the first prestored data, and sign the transmission data based on the $GPK_{sig}$ and the $SK_{UE\_ID\_Sig}$ to obtain a signature Sig2, and encrypt the transmission data, identification information of the UE, and the Sig2 by using the public key for encryption and the $GPK_{enc}$, to obtain the protection message, where the protection manner of the transmission data is encrypting the transmission data and the Sig2 by using the public key for encryption and the $GPK_{enc}$.

With reference to the tenth possible implementation of the first aspect, in an eleventh possible implementation, the second prestored data includes the $GPK_{enc}$, the $SK_{BS\_ID\_enc}$, and the $GPK_{Sig}$, and the access point is specifically configured to determine the protection manner of the transmission data based on the indication message indicating the encryption manner, obtain the $GPK_{enc}$ and the $SK_{BS\_ID\_enc}$ from the second prestored data, and decrypt the protection message by using the $SK_{BS\_ID\_enc}$ the $GPK_{enc}$, to obtain the transmission data, and the access point is further configured to obtain the identification information of the UE and the signature Sig2 from a decrypted message obtained by decrypting the protection message, determine the protection manner of the transmission data based on the indication message indicating the protection manner, and obtain the $GPK_{sig}$ from the second prestored data, and attempt to authenticate the protection message by using the identification information of the UE and the $GPK_{sig}$, and when the protection message has been authenticated, perform the step of sending, to the core network, the transmission data sent by the UE.

According to a second aspect, a transmission data protection system is provided, and the protection system may include user equipment UE, an access point, and a core network node, where the UE is configured to, when transmission data needs to be sent, obtain a public key for encryption, and a global public key in an identity based cryptography IBC technology or a private key corresponding to the UE from first prestored data of the UE, and protect the transmission data by using the public key for encryption and the global public key or the private key corresponding to the UE, to obtain a protection message, the UE is further configured to send the protection message to the access point, where the protection message carries an indication message indicating a protection manner of the transmission data, the access point is configured to send the protection message to the core network node, and the core network node is configured to, after receiving the protection message, obtain the global public key and a private key corresponding to the core network node from second prestored data of the core network node based on the indication message indicating the protection manner, and parse the protection message by using the global public key and the private key corresponding to the core network node, to obtain the transmission data sent by the UE.

In this application, when the UE sends uplink data to the core network node, the UE may use information such as an identity of the core network node as the public key for encryption, and encrypt the to-be-uploaded transmission data by using the global public key in the IBC technology and the private key corresponding to the core network node, so as to effectively protect air interface signaling and data in a network and avoid leakage of user privacy and signaling content. The core network node decrypts, signs, and attempts to authenticate, by using a message authentication code, the message sent by the UE, to filter out invalid signaling and data and protect security of the core network.

With reference to the second aspect, in a first possible implementation, the global public key includes a first global public key and a second global public key, and the private key corresponding to the core network node includes a fifth private key and a sixth private key, and the core network node is further configured to obtain core network system parameters from a key management system KMS, and store the core network system parameters as the second prestored data of the core network access point, where the core network system parameters include a public key for encryption and at least one of the following two groups of data, including the first global public key and the fifth private key, or the second global public key and the sixth private key, where the first global public key is a global public key $GPK_{enc}$ for data encryption in the IBC technology, the fifth private key is a private key $SK_{CP\_ID\_enc}$ for data encryption corresponding to the core network node in the IBC technology, the second global public key is a global public key $GPK_{Sig}$ for data signature in the IBC technology, and the sixth private key is a private key $SK_{CP\_ID\_Sig}$ for data signature corresponding to the core network node in the IBC technology.

With reference to the first possible implementation of the second aspect, in a second possible implementation, the public key for encryption is an identity of the core network authentication node, or the public key for encryption includes an identity of the core network node.

With reference to the second aspect, in a third possible implementation, the global public key includes a first global public key and a second global public key, and the private key corresponding to the UE includes a third private key and a fourth private key, and the UE is further configured to obtain, from a core network, the public key for encryption and core network processing parameters used by the UE to process the transmission data, and store the public key for encryption and the core network processing parameters as the first prestored data of the UE, where the core network processing parameters include at least one of the following three groups of data, including the first global public key, or the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

With reference to the second possible implementation of the second aspect or the third possible implementation of the second aspect, in a fourth possible implementation, the first prestored data includes the public key for encryption and the $GPK_{enc}$, and the UE is specifically configured to, when the transmission data needs to be sent to the access point, obtain the public key for encryption and the $GPK_{enc}$ from the first prestored data, and encrypt the transmission data by using the public key for encryption and the $GPK_{enc}$, to obtain the protection message, where the protection manner of the transmission data is encrypting the transmission data by using the public key for encryption and the $GPK_{enc}$.

With reference to the fourth possible implementation of the second aspect, in a fifth possible implementation, the second prestored data includes the $GPK_{enc}$ and the $SK_{CP\_ID\_enc}$, and the core network node is specifically configured to determine the protection manner of the transmission data based on the indication message indicating the protection manner, obtain the $SK_{CP\_ID\_enc}$ and the $GPK_{enc}$ from the second prestored data, and decrypt the protection message by using the $SK_{CP\_ID\_enc}$ and the $GPK_{enc}$, to obtain the transmission data of the UE.

With reference to the second possible implementation of the second aspect or the third possible implementation of the second aspect, in a sixth possible implementation, the first prestored data includes the public key for encryption, the $GPK_{enc}$, and the and the $SK_{UE\_ID\_enc}$, and the UE is specifically configured to, when the transmission data needs to be sent to the access point, obtain the public key for encryption, the $GPK_{enc}$, and the $SK_{UE\_ID\_enc}$ from the first prestored data, generate a symmetric key K3 based on the public key for encryption, the $GPK_{enc}$, and the $SK_{UE\_ID\_enc}$, and input the transmission data and the K3 into a system function to obtain a fourth message authentication code MAC 3, and encrypt the transmission data and the MAC 3 by using the public key for encryption and the $GPK_{enc}$, to obtain the protection message, where the protection manner of the transmission data is encrypting the transmission data and the MAC 3 by using the public key for encryption and the $GPK_{enc}$.

With reference to the sixth possible implementation of the second aspect, in a seventh possible implementation, the second prestored data includes the $GPK_{enc}$ and the $SK_{CP\_ID\_enc}$, and the core network node is specifically configured to determine the protection manner of the transmission data based on the indication message indicating the protection manner, obtain the $GPK_{enc}$ and the $SK_{CP\_ID\_enc}$ from the second prestored data, and decrypt the protection message to obtain a decrypted message, generate a symmetric key K4 by using identification information of the UE, the $GPK_{enc}$, and the $SK_{CP\_ID\_enc}$, and generate a fifth message authentication code MAC 4 by using the K4, the identification information of the UE, and the decrypted message, and obtain the transmission data when the MAC 4 matches the MAC 3.

With reference to the second possible implementation of the second aspect or the third possible implementation of the second aspect, in an eighth possible implementation, the first prestored data includes the public key for encryption, the $GPK_{enc}$, and the $SK_{UE\_ID\_Sig}$, and the UE is specifically configured to, when the transmission data needs to be sent to the access point, obtain the public key for encryption, the $GPK_{enc}$, the $GPK_{sig}$, and the $SK_{UE\_ID\_Sig}$ from the first prestored data, and sign the transmission data based on the $GPK_{sig}$ and the $SK_{UE\_ID\_Sig}$ to obtain a signature Sig3, and encrypt the transmission data and the signature Sig2 by using the public key for encryption and the $GPK_{enc}$, to obtain the protection message, where the protection manner of the transmission data is encrypting the transmission data and the signature by using the public key for encryption and the $GPK_{enc}$.

With reference to the eighth possible implementation of the second aspect, in a ninth possible implementation, the second prestored data includes the public key for encryption, the $GPK_{enc}$, the $SK_{CP\_ID\_enc}$, and the $GPK_{Sig}$, and the core network node is specifically configured to determine the protection manner of the transmission data based on the indication message indicating the encryption manner, and decrypt the protection message by using the $GPK_{enc}$, the public key for encryption, and the $SK_{CP\_ID\_enc}$ that are obtained from the second prestored data, and obtain the signature Sig3 from a decrypted message obtained by decrypting the protection message, attempt to authenticate the protection message by using identification information of the UE and the $GPK_{sig}$, and obtain the transmission data when the protection message has been authenticated.

According to a third aspect, a transmission data protection system is provided, and the protection system may include user equipment UE, an access point, and a core network node; where the core network node is configured to receive transmission data delivered by a user plane gateway, and obtain, from second prestored data of the core network node, identification information of the UE, a global public key in an identity based cryptography IBC technology, and a private key corresponding to the core network node, the core network node is further configured to protect the transmission data by using the identification information of the UE, the global public key, and the private key, to obtain a protection message, and send the protection message to the access point, the access point is configured to send the protection message to the UE, and the UE is configured to obtain, from first prestored data of the UE, an identity of the core network node, the global public key, and a private key corresponding to the UE, and parse the protection message to obtain the transmission data.

In this application, the UE and the core network node may use the IBC-based technology to encrypt and protect, through authentication, downlink data, thereby improving security of the network transmission data.

With reference to the third aspect, in a first possible implementation, the global public key includes a first global public key and a second global public key, and the private key corresponding to the core network node includes a fifth private key and a sixth private key, and the core network node is further configured to obtain core network system parameters from a network or a key management system KMS, and store the core network system parameters as the second prestored data of the core network access point, where the core network system parameters include a public key for encryption and at least one of the following two groups of data, including the first global public key and the fifth private key, or the second global public key and the sixth private key, where the first global public key is a global public key $GPK_{enc}$ for data encryption in the IBC technology, the fifth private key is a private key $SK_{CP\_ID\_enc}$ for data encryption corresponding to the core network node in the IBC technology, the second global public key is a global public key $GPK_{Sig}$ for data signature in the IBC technology, and the sixth private key is a private key $SK_{CP\_ID\_Sig}$ for data signature corresponding to the core network node in the IBC technology.

With reference to the third aspect, in a second possible implementation, the global public key includes a first global public key and a second global public key, and the private key corresponding to the UE includes a third private key and a fourth private key, and the UE is further configured to obtain, from a core network, the identification information of the UE and core network processing parameters used by the UE to process the transmission data, and store the identification information and the core network processing parameters as the first prestored data of the UE, where the core network processing parameters include at least one of the following two groups of data, including the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

With reference to the first possible implementation of the third aspect or the second possible implementation of the third aspect, in a third possible implementation, the second prestored data includes the $GPK_{enc}$ and the $SK_{CP\_ID\_enc}$, and the core network node is specifically configured to obtain the identification information of the UE, the $GPK_{enc}$, and the $SK_{CP\_ID\_enc}$ from the second prestored data after receiving the transmission data, generate a symmetric key K5 based on the identification information of the UE, the $GPK_{enc}$, and the $SK_{CP\_ID\_enc}$, and input the transmission data and the K5 into a system function to obtain a sixth message authentication code MAC 5, and encrypt the transmission data by using the K5, to obtain the protection message.

With reference to the third possible implementation of the third aspect, in a fourth possible implementation, the first prestored data includes the identification information of the UE, the identity of the core network node, the $GPK_{enc}$, and the $SK_{UE\_ID\_enc}$, and the UE is specifically configured to obtain the $GPK_{enc}$ and the $SK_{UE\_ID\_enc}$ from the first prestored data, and decrypt the protection message by using the $GPK_{enc}$ and the $SK_{UE\_ID\_enc}$, to obtain a decrypted message, generate a symmetric key K6 by using identification information of the core network node, the $GPK_{enc}$, and the $SK_{UE\_ID\_enc}$, decrypt the protection message by using the K6, to obtain a decrypted message, and generate a seventh message authentication code MAC 6 by using the K6 and the decrypted message, and obtain the transmission data when the MAC 6 matches the MAC 5 carried in the decrypted message.

According to a fourth aspect, a transmission data protection method is provided, and the protection method may include receiving, by user equipment UE, a broadcast message sent by an access point, and storing a public key for encryption that is carried in the broadcast message, when transmission data needs to be sent to the access point, obtaining, by the UE, a global public key in an identity based cryptography IBC technology or a private key corresponding to the UE from first prestored data of the UE, and protecting the transmission data by using the public key for encryption and the global public key or the private key corresponding to the UE, to obtain a protection message, and sending, by the UE, the protection message to the access point, where the protection message carries an indication message indicating a protection manner of the transmission data.

With reference to the fourth aspect, in a first possible implementation, the global public key includes a first global public key and a second global public key, and the private key corresponding to the UE includes a third private key and a fourth private key, and before the receiving, by UE, a broadcast message of the access point, the method further includes obtaining, by the UE from a network or a KMS, processing parameters used by the UE to process the transmission data, and storing the processing parameters as the first prestored data of the UE, where the processing parameters include an identity (operator ID1) of an operator to which the UE belongs, and at least one of the following three groups of data, including the first global public key, or the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

With reference to the first possible implementation of the fourth aspect, in a second possible implementation, the first prestored data includes the operator ID1 and the $GPK_{Sig}$, and before the storing, by the UE, a public key for encryption that is carried in the broadcast message, the method further includes determining, by the UE based on indication information carried in the received broadcast message, that the access point has a data signature function, and determining, based on identification information of the access point corresponding to the broadcast message, an identity (operator ID2) of an operator to which the access point belongs, matching the operator ID2 with the operator ID1, and searching the first prestored data for a third global public key $GPK_{Sig}1$ corresponding to the access point, when the broadcast message carries the signature Sig1, attempting to authenticate the broadcast message by using the $GPK_{Sig}1$ and the identification information of the access point, and when the broadcast message has been authenticated, determining to add, to the first prestored data, the public key for encryption that is carried in the broadcast message.

With reference to the second possible implementation of the fourth aspect, in a third possible implementation, the first prestored data includes the $GPK_{enc}$, and the obtaining, by the UE, a global public key in an identity based cryptography IBC technology from first prestored data of the UE when transmission data needs to be sent to the access point, and protecting the transmission data by using the public key for encryption and the global public key includes when the UE needs to send the transmission data to the access point, obtaining, by the UE, the public key for encryption and the $GPK_{enc}$ from the first prestored data, and encrypting the transmission data by using the public key for encryption and the $GPK_{enc}$, to obtain the protection message, where the protection manner of the transmission data is encrypting the transmission data by using the public key for encryption and the $GPK_{enc}$.

With reference to the second possible implementation of the fourth aspect, in a fourth possible implementation, the first prestored data includes the $GPK_{enc}$ and the $SK_{UE\_ID\_enc}$, and the obtaining, by the UE, a global public key in an identity based cryptography IBC technology or a private key corresponding to the UE from first prestored data of the UE when the UE needs to send transmission data to the access point, and protecting the transmission data by using the public key for encryption and the global public key or the private key corresponding to the UE includes when the UE needs to send the transmission data to the access point, obtaining, by the UE, the public key for encryption, the $GPK_{enc}$, and the $SK_{UE\_ID\_enc}$ from the first prestored data, generating a first symmetric key K1 based on the public key for encryption, the $GPK_{enc}$, and the $SK_{UE\_ID\_enc}$, and inputting the transmission data and the K1 into a system function to obtain a third message authentication code MAC 2, and encrypting the transmission data, identification information of the UE, and the MAC 2 by using the public key for encryption and the $GPK_{enc}$, to obtain the protection message, where the protection manner of the transmission data is encrypting the transmission data, the identification information of the UE, and the MAC 2 by using the public key for encryption and the $GPK_{enc}$.

With reference to the second possible implementation of the fourth aspect, in a fifth possible implementation, the first prestored data includes the $GPK_{enc}$ and the $SK_{UE\_ID\_Sig}$, and the obtaining, by the UE, a global public key in an identity based cryptography IBC technology or a private key corresponding to the UE from first prestored data of the UE when the UE needs to send transmission data to the access point, and protecting the transmission data by using the public key for encryption and the global public key or the private key corresponding to the UE, to obtain a protection message includes when the UE needs to send the transmission data to the access point, obtaining, by the UE, the public key for encryption, the $GPK_{enc}$, the $GPK_{sig}$, and the $SK_{UE\_ID\_Sig}$ from the first prestored data, and signing the transmission data based on the $GPK_{sig}$ and the $SK_{UE\_ID\_Sig}$ to obtain a signature Sig2, and encrypting the transmission data, identification information of the UE, and the Sig2 by using the public key for encryption and the $GPK_{enc}$, to obtain the protection message, where the protection manner of the transmission data is encrypting the transmission data and the Sig2 by using the public key for encryption and the $GPK_{enc}$.

According to a fifth aspect, a transmission data protection method is provided, and the protection method may include sending, by an access point, a broadcast message, where the broadcast message carries a public key for encryption, receiving, by the access point, a protection message that is sent by user equipment UE and that is obtained after the UE protects transmission data based on the public key for encryption, where the protection message carries an indication message indicating a protection manner of the transmission data sent by the UE, obtaining, by the access point, a global public key in an identity based cryptography IBC technology and a private key corresponding to the access point from second prestored data of the access point based on the indication message indicating the protection manner, and parsing the protection message by using the global public key and the private key corresponding to the access point, to obtain the transmission data sent by the UE, and sending, by the access point to a core network, the transmission data that is obtained through parsing and that is sent by the UE.

With reference to the fifth aspect, in a first possible implementation, the global public key includes a first global public key and a second global public key, and the private key corresponding to the access point includes a first private key and a second private key, and before the sending, by an access point, a broadcast message, the method further includes obtaining, by the access point, system parameters from a network or a key management system KMS, and storing the system parameters as the second prestored data of the access point, where the system parameters include the public key for encryption and at least one of the following two groups of data, including the first global public key and the first private key, or the second global public key and the second private key, where the first global public key is a global public key $GPK_{enc}$ for data encryption in the IBC technology, the first private key is a private key $SK_{BS\_ID\_enc}$ for data encryption corresponding to the access point in the IBC technology, the second global public key is a global public key $GPK_{Sig}$ for data signature in the IBC technology, and the second private key is a private key $SK_{BS\_ID\_Sig}$ for data signature corresponding to the access point in the IBC technology.

With reference to the first possible implementation of the fifth aspect, in a second possible implementation, the public key for encryption is a base station BS identity BS_ID, or the public key for encryption includes a BS_ID, or the public key for encryption includes a media access control MAC address of a Wireless Fidelity Wi-Fi access point AP or a service set identifier SSID of a Wi-Fi AP, or the public key for encryption includes a hotspot UE identity UE_ID or an international mobile subscriber identity IMSI of hotspot UE.

With reference to the second possible implementation of the fifth aspect, in a third possible implementation, the second prestored data includes the $GPK_{Sig}$ and the $SK_{BS\_ID\_Sig}$, and before the sending, by an access point, a broadcast message, the method further includes signing, by the access point, the broadcast message by using the $GPK_{Sig}$ and the $SK_{BS\_ID\_Sig}$, to obtain a signature Sig1 of the broadcast message, and adding indication information indicating that the access point has a data signature function or the signature Sig1 of the broadcast message to the broadcast message.

With reference to the second possible implementation of the fifth aspect, in a fourth possible implementation, the second prestored data includes the $GPK_{enc}$, the $SK_{BS\_ID\_enc}$, the $GPK_{Sig}$, and the $SK_{BS\_ID\_Sig}$, and the obtaining, by the access point, a global public key in an identity based cryptography IBC technology and a private key corresponding to the access point from second prestored data of the access point based on the indication message indicating the protection manner, and parsing the protection message by using the global public key and the private key corresponding to the access point includes determining, by the access point, the protection manner of the transmission data based on the indication message indicating the protection manner, obtaining the $SK_{BS\_ID\_enc}$ and the $GPK_{enc}$ from the second prestored data, and decrypting the protection message by using the $SK_{BS\_ID\_enc}$ and the $GPK_{enc}$, to obtain a decrypted message.

With reference to the second possible implementation of the fifth aspect, in a fifth possible implementation, the second prestored data includes the public key for encryption, the $GPK_{enc}$, and the $SK_{BS\_ID\_enc}$, and the obtaining, by the access point, a global public key in an identity based cryptography IBC technology and a private key corresponding to the access point from second prestored data of the access point based on the indication message indicating the protection manner, and parsing the protection message by using the global public key and the private key corresponding to the access point includes determining, by the access point, the protection manner of the transmission data based on the indication message indicating the protection manner, obtaining the $GPK_{enc}$ and the $SK_{BS\_ID\_enc}$ from the second prestored data, and decrypting the protection message by using the $SK_{BS\_ID\_enc}$ and the $GPK_{enc}$, to obtain a decrypted message, and the sending, by the access point to a core network, the transmission data that is obtained through parsing and that is sent by the UE includes obtaining, by the access point, a third message authentication code MAC 2, identification information of the UE, and the transmission data that are carried in the protection message from the decrypted message, generating a symmetric key K2 by using the identification information of the UE, the $GPK_{enc}$, and the $SK_{BS\_ID\_enc}$, and calculating a fourth message authentication code MAC 3 by using the symmetric key K2, the identification information of the UE, and the transmission data obtained through decryption, and when the MAC 3 matches the MAC 2, sending, to the core network, the transmission data sent by the UE.

With reference to the second possible implementation of the fifth aspect, in a sixth possible implementation, the second prestored data includes the $GPK_{enc}$, the $SK_{BS\_ID\_enc}$, and the $GPK_{Sig}$, and the obtaining, by the access point, a global public key in an identity based cryptography IBC technology and a private key corresponding to the access point from second prestored data of the access point based on the indication message indicating the protection manner, and parsing the protection message by using the global public key and the private key corresponding to the access point includes determining the protection manner of the transmission data based on the indication message indicating the encryption manner, obtaining the $GPK_{enc}$ and the $SK_{BS\_ID\_enc}$ from the second prestored data, and decrypting the protection message by using the $SK_{BS\_ID\_enc}$ and the $GPK_{enc}$, to obtain the transmission data, and the sending, by the access point to a core network, the transmission data that is obtained through parsing and that is sent by the UE includes obtaining identification information of the UE and the signature Sig2 from a decrypted message obtained by decrypting the protection message, determining the protection manner of the transmission data based on the indication message indicating the protection manner, and obtaining the $GPK_{sig}$ from the second prestored data, and attempting to authenticate the protection message by using the identification information of the UE and the $GPK_{sig}$, and when the protection message has been authenticated, sending, to the core network, the transmission data sent by the UE.

According to a sixth aspect, a transmission data protection method is provided, and the protection method may include when user equipment UE needs to send transmission data, obtaining, by the UE, a public key for encryption, and a global public key in an identity based cryptography IBC technology or a private key corresponding to the UE from first prestored data of the UE, and protecting the transmission data by using the public key for encryption and the global public key or the private key corresponding to the UE, to obtain a protection message, and sending, by the UE, the protection message to an access point, so that the access point sends the protection message to a core network node, where the protection message carries an indication message indicating a protection manner of the transmission data.

With reference to the sixth aspect, in a first possible implementation, the global public key includes a first global public key and a second global public key, and the private key corresponding to the UE includes a third private key and a fourth private key, and before the UE sends the transmission data, the method further includes obtaining, by the UE from a core network, the public key for encryption and core network processing parameters used by the UE to process the transmission data, and storing the public key for encryption and the core network processing parameters as the first prestored data of the UE, where the core network processing parameters include at least one of the following three groups of data, including the first global public key, or the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

With reference to the first possible implementation of the sixth aspect, in a second possible implementation, the first prestored data includes the public key for encryption and the $GPK_{enc}$, and the obtaining, by the UE, a public key for encryption and a global public key in an identity based cryptography IBC technology from first prestored data of the UE, and protecting the transmission data by using the public key for encryption and the global public key includes when the UE needs to send the transmission data to the access point, obtaining, by the UE, the public key for encryption and the $GPK_{enc}$ from the first prestored data, and encrypting the transmission data by using the public key for encryption and the $GPK_{enc}$, to obtain the protection message, where the protection manner of the transmission data is encrypting the transmission data by using the public key for encryption and the $GPK_{enc}$.

With reference to the first possible implementation of the sixth aspect, in a third possible implementation, the first prestored data includes the public key for encryption, the $GPK_{enc}$, and the $SK_{UE\_ID\_enc}$, and the obtaining, by the UE, a public key for encryption, and a global public key in an identity based cryptography IBC technology or a private key corresponding to the UE from first prestored data of the UE, and protecting the transmission data by using the public key for encryption and the global public key or the private key corresponding to the UE includes when the UE needs to send the transmission data to the access point, obtaining, by the UE, the public key for encryption, the $GPK_{enc}$, and the $SK_{UE\_ID\_enc}$ from the first prestored data, generating a symmetric key K3 based on the public key for encryption, the $GPK_{enc}$, and the $SK_{UE\_ID\_enc}$, and inputting the transmission data and the K3 into a system function to obtain a fourth message authentication code MAC 3, and encrypting the transmission data and the MAC 3 by using the public key for encryption and the $GPK_{enc}$, to obtain the protection message, where the protection manner of the transmission data is encrypting the transmission data and the MAC 3 by using the public key for encryption and the $GPK_{enc}$.

With reference to the first possible implementation of the sixth aspect, in a fourth possible implementation, the first prestored data includes the public key for encryption, the $GPK_{enc}$, and the $SK_{UE\_ID\_Sig}$, and the obtaining, by the UE, a public key for encryption, and a global public key in an identity based cryptography IBC technology or a private key corresponding to the UE from first prestored data of the UE, and protecting the transmission data by using the public key for encryption and the global public key or the private key corresponding to the UE includes when the UE needs to send the transmission data to the access point, obtaining, by the UE, the public key for encryption, the $GPK_{enc}$, the $GPK_{sig}$, and the $SK_{UE\_ID\_Sig}$ from the first prestored data, and signing the transmission data based on the $GPK_{sig}$ and the $SK_{UE\_ID\_Sig}$ to obtain a signature Sig3, and encrypting the transmission data and the signature Sig2 by using the public key for encryption and the $GPK_{enc}$, to obtain the protection message, where the protection manner of the transmission data is encrypting the transmission data and the signature by using the public key for encryption and the $GPK_{enc}$.

According to a seventh aspect, a transmission data protection method is provided, and the protection method may include receiving, by a core network node, a protection message sent by an access point, where the protection message carries an indication message indicating a protection manner of the transmission data sent by user equipment UE, and obtaining, by the core network node, a global public key in an identity based cryptography IBC technology and a private key corresponding to the core network node from second prestored data of the core network node based on the indication message indicating the protection manner, and parsing the protection message by using the global public key and the private key corresponding to the core network node, to obtain the transmission data sent by the UE.

With reference to the seventh aspect, in a first possible implementation, the global public key includes a first global public key and a second global public key, and the private key corresponding to the core network node includes a fifth private key and a sixth private key, and before the receiving, by a core network node, a protection message sent by an access point, the method further includes obtaining, by the core network node, core network system parameters from a key management system KMS, and storing the core network system parameters as the second prestored data of the core network access point, where the core network system parameters include a public key for encryption and at least one of the following two groups of data, including the first global public key and the fifth private key, or the second global public key and the sixth private key, where the first global public key is a global public key $GPK_{enc}$ for data encryption in the IBC technology, the fifth private key is a private key $SK_{CP\_ID\_enc}$ for data encryption corresponding to the core network node in the IBC technology, the second global public key is a global public key $GPK_{Sig}$ for data signature in the IBC technology, and the sixth private key is a private key $SK_{CP\_ID\_Sig}$ for data signature corresponding to the core network node in the IBC technology.

With reference to the first possible implementation of the seventh aspect, in a second possible implementation, the public key for encryption is an identity of the core network authentication node, or the public key for encryption includes an identity of the core network node.

With reference to the second possible implementation of the seventh aspect, in a third possible implementation, the second prestored data includes the $GPK_{enc}$ and the $SK_{CP\_ID\_enc}$, and the obtaining, by the core network node, a global public key in an identity based cryptography IBC technology and a private key corresponding to the core network node from second prestored data of the core network node based on the indication message indicating the protection manner, and parsing the protection message by using the global public key and the private key corresponding to the core network node includes determining, by the core network node, the protection manner of the transmission data based on the indication message indicating the protection manner, obtaining the $SK_{CP\_ID\_enc}$ and the $GPK_{enc}$ from the second prestored data, and decrypting the protection message by using the $SK_{CP\_ID\_enc}$ and the $GPK_{enc}$, to obtain the transmission data of the UE.

With reference to the second possible implementation of the seventh aspect, in a fourth possible implementation, the second prestored data includes the $GPK_{enc}$ and the $SK_{CP\_ID\_enc}$, and the obtaining, by the core network node, a global public key in an identity based cryptography IBC technology and a private key corresponding to the core network node from second prestored data of the core network node based on the indication message indicating the protection manner, and parsing the protection message by using the global public key and the private key corresponding to the core network node includes determining, by the core network node, the protection manner of the transmission data based on the indication message indicating the protection manner, obtaining the $GPK_{enc}$ and the $SK_{CP\_ID\_enc}$ from the second prestored data, and decrypting the protection message to obtain a decrypted message, obtaining a fourth message authentication code MAC 3 carried in the decrypted message, and generating a symmetric key K4 by using identification information of the UE, the $GPK_{enc}$, and the $SK_{CP\_ID\_enc}$, and generating a fifth message authentication code MAC 4 by using the K4, the identification information of the UE, and the decrypted message, and obtaining the transmission data when the MAC 4 matches the MAC 3.

With reference to the second possible implementation of the seventh aspect, in a fifth possible implementation, the second prestored data includes the public key for encryption, the $GPK_{enc}$, the $SK_{CP\_ID\_enc}$, and the $GPK_{Sig}$, and the obtaining, by the core network node, a global public key in an identity based cryptography IBC technology and a private key corresponding to the core network node from second prestored data of the core network node based on the indication message indicating the protection manner, and parsing the protection message by using the global public key and the private key corresponding to the core network node includes determining, by the core network node, the protection manner of the transmission data based on the indication message indicating the encryption manner, and decrypting the protection message by using the $GPK_{enc}$, the public key for encryption, and the $SK_{CP\_ID\_enc}$ that are obtained from the second prestored data, and obtaining the signature Sig3 from a decrypted message obtained by decrypting the protection message, attempting to authenticate the protection message by using identification information of the UE and the $GPK_{sig}$, and obtaining the transmission data when the protection message has been authenticated.

According to an eighth aspect, a transmission data protection method is provided, and the protection method may include receiving, by a core network node, transmission data delivered by a user plane gateway, and obtaining, from second prestored data of the core network node, identification information of user equipment UE, a global public key in an identity based cryptography IBC technology, and a private key corresponding to the core network node, and protecting, by the core network node, the transmission data by using the identification information of the UE, the global public key, and the private key, to obtain a protection message, and sending the protection message to an access point.

With reference to the eighth aspect, in a first possible implementation, the global public key includes a first global public key and a second global public key, and the private key corresponding to the core network node includes a fifth private key and a sixth private key, and before the receiving, by a core network node, transmission data delivered by a user plane gateway, the method further includes obtaining, by the core network node, core network system parameters from a network or a key management system KMS, and storing the core network system parameters as the second prestored data of the core network access point, where the core network system parameters include a public key for encryption and at least one of the following two groups of data, including the first global public key and the fifth private key, or the second global public key and the sixth private key, where the first global public key is a global public key $GPK_{enc}$ for data encryption in the IBC technology, the fifth private key is a private key $SK_{CP\_ID\_enc}$ for data encryption corresponding to the core network node in the IBC technology, the second global public key is a global public key $GPK_{Sig}$ for data signature in the IBC technology, and the sixth private key is a private key $SK_{CP\_ID\_Sig}$ for data signature corresponding to the core network node in the IBC technology.

With reference to the first possible implementation of the eighth aspect, in a second possible implementation, the second prestored data includes the $GPK_{enc}$ and the $SK_{CP\_ID\_enc}$, and the obtaining, by the core network node from second prestored data of the core network node, identification information of user equipment UE, a global public key in an identity based cryptography IBC technology, and a private key corresponding to the core network node includes obtaining, by the core network node, the identification information of the UE, the $GPK_{enc}$, and the $SK_{CP\_ID\_enc}$ from the second prestored data, and the protecting, by the core network node, the transmission data by using the identification information of the UE, the global public key, and the private key, to obtain a protection message includes generating, by the core network node, a symmetric key K5 based on the identification information of the UE, the $GPK_{enc}$, and the $SK_{CP\_ID\_enc}$, and inputting the transmission data and the K5 into a system function to obtain a sixth message authentication code MAC 5, and encrypting the transmission data by using the K5, to obtain the protection message.

According to a ninth aspect, a transmission data protection method is provided, and the protection method may include receiving, by user equipment UE, a protection message sent by an access point, and obtaining, by the UE from first prestored data of the UE, an identity of a core network node, a global public key in an identity based cryptography IBC technology, and a private key corresponding to the UE, and parsing the protection message to obtain the transmission data.

With reference to the ninth aspect, in a first possible implementation, the global public key includes a first global public key and a second global public key, and the private key corresponding to the UE includes a third private key and a fourth private key, and before the receiving, by UE, a protection message sent by an access point, the method further includes obtaining, by the UE from a core network, identification information of the UE and core network processing parameters used by the UE to process the transmission data, and storing the identification information and the core network processing parameters as the first prestored data of the UE, where the core network processing parameters include at least one of the following two groups of data, including the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

With reference to the first possible implementation of the ninth aspect, in a second possible implementation, the first prestored data includes the identification information of the UE, the identity of the core network node, the $GPK_{enc}$, and the $SK_{UE\_ID\_enc}$, and the obtaining, by the UE from first prestored data of the UE, an identity of a core network node, a global public key in an identity based cryptography IBC technology, and a private key corresponding to the UE, and parsing the protection message to obtain the transmission data includes obtaining, by the UE, the $GPK_{enc}$ and the $SK_{UE\_ID\_enc}$ from the first prestored data, and decrypting the protection message by using the $GPK_{enc}$ and the $SK_{UE\_ID\_enc}$, to obtain a decrypted message, generating a symmetric key K6 by using identification information of the core network node, the $GPK_{enc}$, and the $SK_{UE\_ID\_enc}$, decrypting the protection message by using the K6, to obtain a decrypted message, and generating a seventh message authentication code MAC 6 by using the K6 and the decrypted message, and obtaining the transmission data when the MAC 6 matches a sixth message authentication code MAC 5 carried in the decrypted message.

According to a tenth aspect, a transmission data protection apparatus is provided, and the protection apparatus may include a receiving unit, configured to receive a broadcast message sent by an access point, and store a public key for encryption that is carried in the broadcast message, a processing unit, configured to, when transmission data needs to be sent to the access point, obtain a global public key in an identity based cryptography IBC technology or a private key corresponding to user equipment UE from first prestored data of the UE, and protect the transmission data by using the public key for encryption and the global public key or the private key corresponding to the UE that are received by the receiving unit, to obtain a protection message, and a sending unit, configured to send the protection message processed by the processing unit to the access point, where the protection message carries an indication message indicating a protection manner of the transmission data.

With reference to the tenth aspect, in a first possible implementation, the global public key includes a first global public key and a second global public key, and the private key corresponding to the UE includes a third private key and a fourth private key, and the processing unit is further configured to obtain, from a network or a KMS, processing parameters used by the UE to process the transmission data, and store the processing parameters as the first prestored data of the UE, where the processing parameters include an identity (operator ID1) of an operator to which the UE belongs, and at least one of the following three groups of data, including the first global public key, or the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

With reference to the first possible implementation of the tenth aspect, in a second possible implementation, the first prestored data includes the operator ID1 and the $GPK_{Sig}$, and the receiving unit is specifically configured to determine, based on indication information carried in the received broadcast message, that the access point has a data signature function, and determine, based on identification information of the access point corresponding to the broadcast message, an identity (operator ID2) of an operator to which the access point belongs, match the operator ID2 with the operator ID1, and search the first prestored data for a third global public key $GPK_{Sig}1$ corresponding to the access point, when the broadcast message carries the signature Sig1, attempt to authenticate the broadcast message by using the $GPK_{Sig}1$ and the identification information of the access point, and when the broadcast message has been authenticated, determine to add, to the first prestored data, the public key for encryption that is carried in the broadcast message.

With reference to the second possible implementation of the tenth aspect, in a third possible implementation, the first prestored data includes the $GPK_{enc}$, and the processing unit is specifically configured to, when the transmission data needs to be sent to the access point, obtain the public key for encryption and the $GPK_{enc}$ from the first prestored data, and encrypt the transmission data by using the public key for encryption and the $GPK_{enc}$, to obtain the protection message, where the protection manner of the transmission data is encrypting the transmission data by using the public key for encryption and the $GPK_{enc}$.

With reference to the second possible implementation of the tenth aspect, in a fourth possible implementation, the first prestored data includes the $GPK_{enc}$ and the $SK_{UE\_I}$ $D\_enc$, and the processing unit is specifically configured to, when the transmission data needs to be sent to the access point, obtain the public key for encryption, the $GPK_{enc}$, and the $SK_{UE\_ID\_enc}$ from the first prestored data, generate a first symmetric key K1 based on the public key for encryption, the $GPK_{enc}$, and the $SK_{UE\_ID\_enc}$, and input the transmission data and the K1 into a system function to obtain a third message authentication code MAC 2, and encrypt the transmission data, identification information of the UE, and the MAC 2 by using the public key for encryption and the $GPK_{enc}$, to obtain the protection message, where the protection manner of the transmission data is encrypting the transmission data, the identification information of the UE, and the MAC 2 by using the public key for encryption and the $GPK_{enc}$.

With reference to the second possible implementation of the tenth aspect, in a fifth possible implementation, the first prestored data includes the $GPK_{enc}$ and the $SK_{UE\_ID\_Sig}$, and the processing unit is specifically configured to, when the transmission data needs to be sent to the access point, obtain the public key for encryption, the $GPK_{enc}$, the $GPK_{sig}$, and the $SK_{UE\_ID\_Sig}$ from the first prestored data, and sign the transmission data based on the $GPK_{sig}$ and the $SK_{UE\_ID\_Sig}$ to obtain a signature Sig2, and encrypt the transmission data, identification information of the UE, and the Sig2 by using the public key for encryption and the $GPK_{enc}$, to obtain the protection message, where the protection manner of the transmission data is encrypting the transmission data and the Sig2 by using the public key for encryption and the $GPK_{enc}$.

According to an eleventh aspect, a transmission data protection apparatus is provided, and the protection apparatus may include a sending unit, configured to send a broadcast message, where the broadcast message carries a public key for encryption, a receiving unit, configured to receive a protection message that is sent by user equipment UE and that is obtained after the UE protects transmission data based on the public key for encryption sent by the sending unit, where the protection message carries an indication message indicating a protection manner of the transmission data sent by the UE, and a parsing unit, configured to obtain a global public key in an identity based cryptography IBC technology and a private key corresponding to the access point from second prestored data of the access point based on the indication message indicating the protection manner that is received by the receiving unit, and parse the protection message by using the global public key and the private key corresponding to the access point, to obtain the transmission data sent by the UE; where the sending unit is further configured to send, to a core network, the transmission data that is obtained by the parsing unit through parsing and that is sent by the UE.

With reference to the eleventh aspect, in a first possible implementation, the global public key includes a first global public key and a second global public key, and the private key corresponding to the access point includes a first private key and a second private key, and the parsing unit is further configured to obtain system parameters from a network or a key management system KMS, and store the system parameters as the second prestored data of the access point, where the system parameters include the public key for encryption and at least one of the following two groups of data, including the first global public key and the first private key, or the second global public key and the second private key, where the first global public key is a global public key $GPK_{enc}$ for data encryption in the IBC technology, the first private key is a private key $SK_{BS\_ID\_enc}$ for data encryption corresponding to the access point in the IBC technology, the second global public key is a global public key $GPK_{Sig}$ for data signature in the IBC technology, and the second private key is a private key $SK_{BS\_ID\_Sig}$ for data signature corresponding to the access point in the IBC technology.

With reference to the first possible implementation of the eleventh aspect, in a second possible implementation, the public key for encryption is a base station BS identity BS_ID, or the public key for encryption includes a BS_ID, or the public key for encryption includes a media access control MAC address of a Wireless Fidelity Wi-Fi access point AP or a service set identifier SSID of a Wi-Fi AP, or the public key for encryption includes a hotspot UE identity UE_ID or an international mobile subscriber identity IMSI of hotspot UE.

With reference to the second possible implementation of the eleventh aspect, in a third possible implementation, the second prestored data includes the $GPK_{Sig}$ and the $SK_{BS\_ID\_Sig}$, and the sending unit is specifically configured to sign the broadcast message by using the $GPK_{Sig}$ and the $SK_{BS\_ID\_Sig}$, to obtain a signature Sig1 of the broadcast message, and add indication information indicating that the access point has a data signature function or the signature Sig1 of the broadcast message to the broadcast message.

With reference to the second possible implementation of the eleventh aspect, in a fourth possible implementation, the second prestored data includes the $GPK_{enc}$, the $SK_{BS\_ID\_enc}$, the $GPK_{Sig}$, and the $SK_{BS\_ID\_Sig}$, and the parsing unit is specifically configured to determine the protection manner of the transmission data based on the indication message indicating the protection manner, obtain the $SK_{BS\_ID\_enc}$ and the $GPK_{enc}$ from the second prestored data, and decrypt the protection message by using the $SK_{BS\_ID\_enc}$ and the $GPK_{enc}$, to obtain a decrypted message.

With reference to the second possible implementation of the eleventh aspect, in a fifth possible implementation, the second prestored data includes the public key for encryption, the $GPK_{enc}$, and the $SK_{BS\_ID\_enc}$, and the parsing unit is specifically configured to determine the protection manner of the transmission data based on the indication message indicating the protection manner, obtain the $GPK_{enc}$ and the $SK_{BS\_ID\_enc}$ from the second prestored data, and decrypt the protection message by using the $SK_{BS\_ID\_enc}$ and the $GPK_{enc}$, to obtain a decrypted message, and the sending unit is specifically configured to obtain a third message authentication code MAC 2, identification information of the UE, and the transmission data that are carried in the protection message from the decrypted message obtained by the parsing unit through parsing, generate a symmetric key K2 by using the identification information of the UE, the $GPK_{enc}$, and the $SK_{BS\_ID\_enc}$, and calculate a fourth message authentication code MAC 3 by using the symmetric key K2, the identification information of the UE, and the transmission data obtained through decryption, and when the MAC 3 matches the MAC 2, send, to the core network, the transmission data sent by the UE.

With reference to the second possible implementation of the eleventh aspect, in a sixth possible implementation, the second prestored data includes the $GPK_{enc}$, the $SK_{BS\_ID\_enc}$, and the $GPK_{Sig}$, and the parsing unit is specifically configured to determine the protection manner of the transmission data based on the indication message indicating the encryption manner, obtain the $GPK_{enc}$ and the $SK_{BS\_ID\_enc}$ from the second prestored data, and decrypt the protection message by using the $SK_{BS\_ID\_enc}$ and the $GPK_{enc}$, to obtain the transmission data, and the sending unit is specifically configured to obtain identification information of the UE and the signature Sig2 from a decrypted message obtained by decrypting the protection message, determine the protection manner of the transmission data based on the indication message indicating the protection manner, and obtain the $GPK_{sig}$ from the second prestored data, and attempt to authenticate the protection message by using the identification information of the UE and the $GPK_{sig}$, and when the protection message has been authenticated, send, to the core network, the transmission data sent by the UE.

According to a twelfth aspect, a transmission data protection apparatus is provided, and the protection apparatus may include a protection unit, configured to, when transmission data needs to be sent, obtain a public key for encryption, and a global public key in an identity based cryptography IBC technology or a private key corresponding to user equipment from first prestored data of the UE, and protect the transmission data by using the public key for encryption and the global public key or the private key corresponding to the UE, to obtain a protection message, and a sending unit, configured to send, to an access point, the protection message obtained by the protection unit through processing, so that the access point sends the protection message to a core network node, where the protection message carries an indication message indicating a protection manner of the transmission data.

With reference to the twelfth aspect, in a first possible implementation, the global public key includes a first global public key and a second global public key, and the private key corresponding to the UE includes a third private key and a fourth private key, and the protection unit is further configured to obtain, from a core network, the public key for encryption and core network processing parameters used by the UE to process the transmission data, and store the public key for encryption and the core network processing parameters as the first prestored data of the UE, where the core network processing parameters include at least one of the following three groups of data, including the first global public key, or the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

With reference to the first possible implementation of the twelfth aspect, in a second possible implementation, the first prestored data includes the public key for encryption and the $GPK_{enc}$, and the protection unit is specifically configured to, when the transmission data needs to be sent to the access point, obtain the public key for encryption and the $GPK_{enc}$ from the first prestored data, and encrypt the transmission data by using the public key for encryption and the $GPK_{enc}$, to obtain the protection message, where the protection manner of the transmission data is encrypting the transmission data by using the public key for encryption and the $GPK_{enc}$.

With reference to the first possible implementation of the twelfth aspect, in a third possible implementation, the first prestored data includes the public key for encryption, the $GPK_{enc}$, and the $SK_{UE\_ID\_enc}$, and the protection unit is specifically configured to, when the transmission data needs to be sent to the access point, obtain the public key for encryption, the $GPK_{enc}$, and the $SK_{UE\_ID\_enc}$ from the first prestored data, generate a symmetric key K3 based on the public key for encryption, the $GPK_{enc}$, and the $SK_{UE\_ID\_enc}$, and input the transmission data and the K3 into a system function to obtain a fourth message authentication code MAC 3, and encrypt the transmission data and the MAC 3 by using the public key for encryption and the $GPK_{enc}$, to obtain the protection message, where the protection manner of the transmission data is encrypting the transmission data and the MAC 3 by using the public key for encryption and the $GPK_{enc}$.

With reference to the first possible implementation of the twelfth aspect, in a fourth possible implementation, the first prestored data includes the public key for encryption, the $GPK_{enc}$, and the $SK_{UE\_ID\_Sig}$, and the protection unit is specifically configured to, when the transmission data needs to be sent to the access point, obtain the public key for encryption, the $GPK_{enc}$, the $GPK_{sig}$, and the $SK_{UE\_ID\_Sig}$ from the first prestored data, and sign the transmission data based on the $GPK_{sig}$ and the $SK_{UE\_ID\_Sig}$ to obtain a signature Sig3, and encrypt the transmission data and the signature Sig2 by using the public key for encryption and the $GPK_{enc}$, to obtain the protection message, where the protection manner of the transmission data is encrypting the transmission data and the signature by using the public key for encryption and the $GPK_{enc}$.

According to a thirteenth aspect, a transmission data protection apparatus is provided, and the protection apparatus may include a receiving unit, configured to receive a protection message sent by an access point, where the protection message carries an indication message indicating a protection manner of the transmission data sent by user equipment UE, and a parsing unit, configured to obtain a global public key in an identity based cryptography IBC technology and a private key corresponding to the core network node from second prestored data of the core network node based on the indication message indicating the protection manner that is received by the receiving unit, and parse the protection message by using the global public key and the private key corresponding to the core network node, to obtain the transmission data sent by the UE.

With reference to the thirteenth aspect, in a first possible implementation, the global public key includes a first global public key and a second global public key, and the private key corresponding to the core network node includes a fifth private key and a sixth private key, and the parsing unit is further configured to obtain core network system parameters from a key management system KMS, and store the core network system parameters as the second prestored data of the core network access point, where the core network system parameters include a public key for encryption and at least one of the following two groups of data, including the first global public key and the fifth private key, or the second global public key and the sixth private key, where the first global public key is a global public key $GPK_{enc}$ for data encryption in the IBC technology, the fifth private key is a private key $SK_{CP\_ID\_enc}$ for data encryption corresponding to the core network node in the IBC technology, the second global public key is a global public key $GPK_{Sig}$ for data signature in the IBC technology, and the sixth private key is a private key $SK_{CP\_ID\_Sig}$ for data signature corresponding to the core network node in the IBC technology.

With reference to the first possible implementation of the thirteenth aspect, in a second possible implementation, the public key for encryption is an identity of the core network authentication node, or the public key for encryption includes an identity of the core network node.

With reference to the second possible implementation of the thirteenth aspect, in a third possible implementation, the second prestored data includes the $GPK_{enc}$ and the $SK_{CP\_ID\_enc}$, and the parsing unit is specifically configured to determine the protection manner of the transmission data based on the indication message indicating the protection manner, obtain the $SK_{CP\_ID\_enc}$ and the $GPK_{enc}$ from the second prestored data, and decrypt the protection message by using the $SK_{CP\_ID\_enc}$ and the $GPK_{enc}$, to obtain the transmission data of the UE.

With reference to the second possible implementation of the thirteenth aspect, in a fourth possible implementation, the second prestored data includes the $GPK_{enc}$ and the $SK_{CP\_ID\_enc}$, and the parsing unit is specifically configured to determine the protection manner of the transmission data based on the indication message indicating the protection manner, obtain the $GPK_{enc}$ and the $SK_{CP\_ID\_enc}$ from the second prestored data, and decrypt the protection message to obtain a decrypted message, obtain a fourth message authentication code MAC 3 carried in the decrypted message, and generate a symmetric key K4 by using identification information of the UE, the $GPK_{enc}$, and the $SK_{CP\_ID\_enc}$, and generate a fifth message authentication code MAC 4 by using the K4, the identification information of the UE, and the decrypted message, and obtain the transmission data when the MAC 4 matches the MAC 3.

With reference to the second possible implementation of the thirteenth aspect, in a fifth possible implementation, the second prestored data includes the public key for encryption, the $GPK_{enc}$, the $SK_{CP\_ID\_enc}$, and the $GPK_{Sig}$, and the parsing unit is specifically configured to determine the protection manner of the transmission data based on the indication message indicating the encryption manner, and decrypt the protection message by using the $GPK_{enc}$, the public key for encryption, and the $SK_{CP\_ID\_enc}$ that are obtained from the second prestored data, and obtain the signature Sig3 from a decrypted message obtained by decrypting the protection message, attempt to authenticate the protection message by using identification information of the UE and the $GPK_{sig}$, and obtain the transmission data when the protection message has been authenticated.

According to a fourteenth aspect, a transmission data protection apparatus is provided, and the protection apparatus may include a receiving unit, configured to receive transmission data delivered by a user plane gateway, a processing unit, configured to obtain, from second prestored data of a core network node, identification information of user equipment UE, a global public key in an identity based cryptography IBC technology, and a private key corresponding to the core network node, and protect the transmission data by using the identification information of the UE, the global public key, and the private key, to obtain a protection message, and a sending unit, configured to send, to an access point, the protection message obtained by the processing unit through processing.

With reference to the fourteenth aspect, in a first possible implementation, the global public key includes a first global public key and a second global public key, and the private key corresponding to the core network node includes a fifth private key and a sixth private key, and the processing unit is further configured to obtain core network system parameters from a network or a key management system KMS, and store the core network system parameters as the second prestored data of the core network access point, where the core network system parameters include a public key for encryption and at least one of the following two groups of data, including the first global public key and the fifth private key, or the second global public key and the sixth private key, where the first global public key is a global public key $GPK_{enc}$ for data encryption in the IBC technology, the fifth private key is a private key $SK_{CP\_ID\_enc}$ for data encryption corresponding to the core network node in the IBC technology, the second global public key is a global public key $GPK_{Sig}$ for data signature in the IBC technology, and the sixth private key is a private key $SK_{CP\_ID\_Sig}$ for data signature corresponding to the core network node in the IBC technology.

With reference to the first possible implementation of the fourteenth aspect, in a second possible implementation, the second prestored data includes the $GPK_{enc}$ and the $SK_{CP\_ID\_enc}$, and the processing unit is specifically configured to obtain the identification information of the UE, the $GPK_{enc}$, and the $SK_{CP\_ID\_enc}$ from the second prestored data, generate a symmetric key K5 based on the identification information of the UE, the $GPK_{enc}$, and the $SK_{CP\_ID\_enc}$, and input the transmission data and the K5 into a system function to obtain a sixth message authentication code MAC 5, and encrypt the transmission data by using the K5, to obtain the protection message.

According to a fifteenth aspect, a transmission data protection apparatus is provided, and the protection apparatus may include a receiving unit, configured to receive a protection message sent by an access point, and a parsing unit, configured to obtain, from first prestored data of user equipment, an identity of a core network node, a global public key in an identity based cryptography IBC technology, and a private key corresponding to the UE, and parse the protection message to obtain the transmission data.

With reference to the fifteenth aspect, in a first possible implementation, the global public key includes a first global public key and a second global public key, and the private key corresponding to the UE includes a third private key and a fourth private key, and the parsing unit is further configured to obtain, from a core network, identification information of the UE and core network processing parameters used by the UE to process the transmission data, and store the identification information and the core network processing parameters as the first prestored data of the UE, where the core network processing parameters include at least one of the following two groups of data, including the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

With reference to the first possible implementation of the fifteenth aspect, in a second possible implementation, the first prestored data includes the identification information of the UE, the identity of the core network node, the $GPK_{enc}$, and the $SK_{UE\_ID\_enc}$, and the parsing unit is specifically configured to obtain the $GPK_{enc}$ and the $SK_{UE\_ID\_enc}$ from the first prestored data, and decrypt the protection message by using the $GPK_{enc}$ and the $SK_{UE\_ID\_enc}$, to obtain a decrypted message, generate a symmetric key K6 by using identification information of the core network node, the $GPK_{enc}$, and the $SK_{UE\_ID\_enc}$, decrypt the protection message by using the K6, to obtain a decrypted message, and generate a seventh message authentication code MAC 6 by using the K6 and the decrypted message, and obtain the transmission data when the MAC 6 matches a MAC 5 carried in the decrypted message.

According to a sixteenth aspect, user equipment is provided, and the user equipment may include a memory and a processor, where the memory is connected to the processor, the memory is configured to store a group of program instructions, and the processor is configured to invoke program code stored in the memory to perform the transmission data protection method according to the fourth aspect.

According to a seventeenth aspect, an access point is provided, and the access point may include a memory and a processor, where the memory is connected to the processor, the memory is configured to store a group of program instructions, and the processor is configured to invoke program code stored in the memory to perform the transmission data protection method according to the fifth aspect.

According to an eighteenth aspect, user equipment is provided, and the user equipment may include a memory and a processor, where the memory is connected to the processor, the memory is configured to store a group of program instructions, and the processor is configured to invoke program code stored in the memory to perform the transmission data protection method according to the sixth aspect.

According to a nineteenth aspect, a core network node is provided, and the core network node may include a memory and a processor, where the memory is connected to the processor, the memory is configured to store a group of program instructions, and the processor is configured to invoke program code stored in the memory to perform the transmission data protection method according to the seventh aspect.

According to a twentieth aspect, a core network node is provided, and the core network node may include a memory and a processor, where the memory is connected to the processor, the memory is configured to store a group of program instructions, and the processor is configured to invoke program code stored in the memory to perform the transmission data protection method according to the eighth aspect.

According to a twenty-first aspect, user equipment is provided, and the user equipment may include a memory and a processor, where the memory is connected to the processor, the memory is configured to store a group of program instructions, and the processor is configured to invoke program code stored in the memory to perform the transmission data protection method according to the ninth aspect.

It can be learned from the foregoing that this application discloses a transmission data protection system, method, and apparatus. The system includes user equipment UE and an access point. The access point sends a broadcast message that carries a public key for encryption. The UE receives and stores the public key for encryption. The UE obtains a global public key or a private key corresponding to the UE from first prestored data, and protects transmission data by using the public key for encryption and the global public key or the private key corresponding to the UE. The UE sends a protection message to the access point, where the protection message carries an indication message indicating a protection manner of the transmission data. After receiving the protection message, the access point obtains the global public key and a private key corresponding to the access point from second prestored data of the access point based on the indication message indicating the protection manner, and parses the protection message by using the global public key and the private key corresponding to the access point. The access point sends, to a core network, the transmission data obtained through parsing. According to this application, transmission data can be protected, and insecure data can be filtered out, so that network security is improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
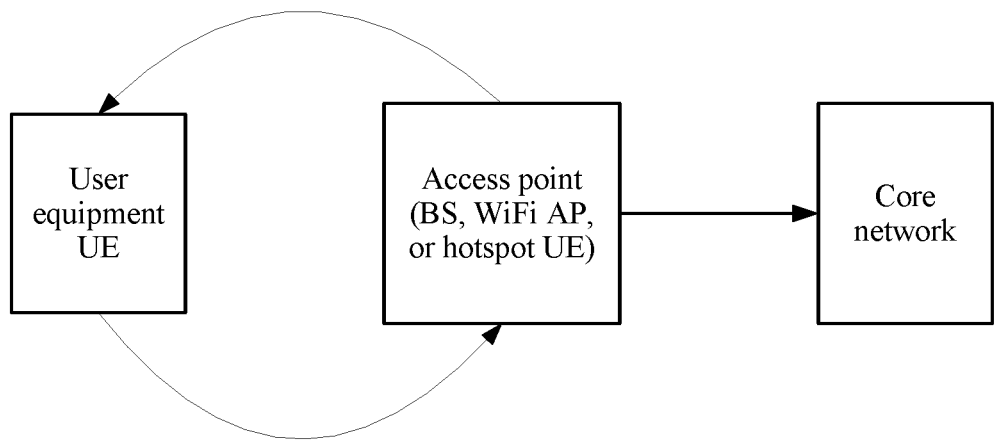
FIG. 1 is a transmission architecture diagram of data transmission according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

An identity based cryptography (IBC) technology provides an identity based encryption (IBE) technology, an identity based signature (IBS) technology, and the like. The IBC technology is a public key technology. First, a key is generated based on a pair of global parameters including a global public key (GPK) and a global secret key (GSK). A key generator performs, based on identity (ID) information provided by a user, an operation by using the foregoing global parameters, to generate a private key $SK_{ID}$ corresponding to the ID of the user for the user. For example, the key generator may perform, based on an identity (such as a UE_ID) provided by UE, an operation by using the foregoing global parameters, to obtain a private key $SK_{UE\_ID}$ corresponding to the UE. Further, the ID of the user, the private key $SK_{ID}$, and the global public key GPK may be distributed to the user by using a reliable means, and a specific means may be determined based on an actual application scenario.

When performing encryption by using the IBC technology, an encryptor needs to obtain a public key for encryption (which may be specifically an ID of a receiver) and a global public key GPK. The encryptor encrypts plaintext data M of a user by using the ID of the receiver and the global public key, to form a ciphertext E (M), and sends the ciphertext to the receiver. After receiving the ciphertext E (M), the receiver first obtains, based on the ID of the receiver, a private key $SK_{ID}$ and the global public key GPK that are corresponding to the ID and that are for decryption, and then decrypts the ciphertext E (M) by using the $SK_{ID}$ and the GPK, to obtain the corresponding plaintext M.

When performing signing by using the IBC technology, a signer needs to have an ID of the signer, a private key $SK_{ID}$ for signature, and a global public key GPK. The signer signs plaintext data M of a user by using the global public key and the private key $SK_{ID}$, to form a signature Sig ($SK_{ID}$, M), and sends a receiver a message {ID, M, Sig ($SK_{ID}$, M)} obtained after signing. After receiving the message with the signature, the receiver first obtains the corresponding global public key GPK based on the ID carried in the message, and uses the ID and GPK to attempt to authenticate the signature Sig ($SK_{ID}$, M) carried in the message, so as to attempt to authenticate integrity of the message.

A difference between the IBC technology and an existing public key infrastructure (PKI)-based public key technology is that a public key in the existing PKI technology is a string of random numbers, which has no identity significance, while the IBC technology overcomes this disadvantage. In the IBC technology, a public key may be any string of meaningful characters, which is usually identity information in real life, such as an email address: abc@xyz.com, or may be information such as a phone number or an IMSI to facilitate memorization and authentication.

In the embodiments of the present invention, the IBC technology can be used to protect transmission of air interface signaling or small data with a low frequency. In other words, the transmission data described in the present invention may include air interface signaling or connectionless small data with a low frequency. Specific transmission data may be determined based on an actual application scenario, and no limitation is imposed herein.

FIG. 1 is a transmission architecture diagram of data transmission according to an embodiment of the present invention. The transmission architecture shown in FIG. 1 may include data transmit ends such as UE, an access point, and a core network. The access point may include a base station (BS), an access point (AP) in a Wi-Fi network, or hotspot UE serving as a network hotspot. The foregoing BS may be a NodeB (NB) in a 3G network, an evolved NodeB (eNB) in a 4G network, or a base station in an earlier network era. No limitation is imposed herein.

Figure 2:
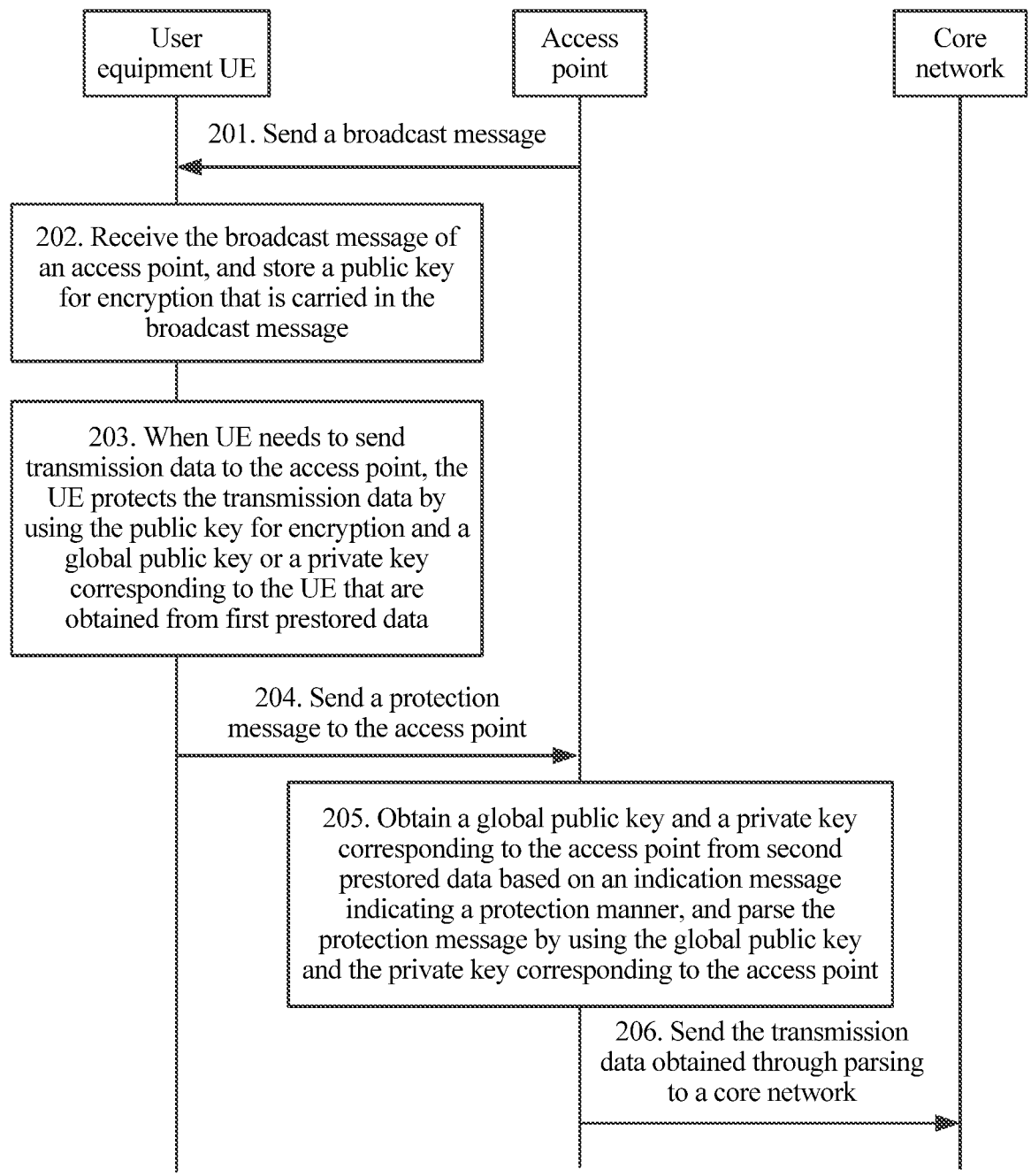
FIG. 2 is a schematic interaction diagram of data transmission performed in a transmission data protection system according to an embodiment of the present invention.

FIG. 2 is a schematic interaction diagram of data transmission performed in a transmission data protection system according to an embodiment of the present invention. A process in which data transmit ends in the protection system according to this embodiment of the present invention perform data transmission may include the following steps.

S201. An access point sends a broadcast message to UE.

In some feasible implementations, before sending the broadcast message, the access point may obtain system parameters in advance from a network or a key management system (KMS), and store the obtained system parameters in specified storage space on the access point. In this way, the obtained system parameters can be stored as prestored data (namely, second prestored data) of the access point. The system parameters obtained by the access point from the network or the KMS may include a public key for encryption, a first global public key and a first private key, a second global public key and a second private key, or the like.

Information specifically included in the system parameters obtained by the access point from the network or the KMS may be determined based on a requirement of a data transmission operation performed by the access point in an actual application scenario, and is not limited herein.

In a specific implementation, the foregoing public key for encryption may be an identity of the access point. If the access point is a BS in a specific application scenario, the public key for encryption may be an identity (namely, a BS_ID) of the BS, or the public key for encryption includes a BS_ID. That the public key for encryption includes a BS_ID means that the public key for encryption consists of the BS_ID and other data, and the BS_ID is only a part of data in a long string of the public key for encryption. Specific content of the public key for encryption may be determined based on an actually used data form of the public key for encryption, and is not limited herein.

If the access point is a Wi-Fi AP in a specific application scenario, the public key for encryption may be a Media Access Control (MAC) address of the Wi-Fi AP, or a service set identifier (SSID) of the Wi-Fi AP. In a specific implementation, when the access point is a Wi-Fi AP, a specific composition form of the public key for encryption may be determined based on an actual application scenario, and is not limited herein.

If the access point is hotspot UE in a specific application scenario, the public key for encryption may be a UE_ID of the hotspot UE, or an international mobile subscriber identity (IMSI) of the hotspot UE. In a specific implementation, when the access point is hotspot UE, a specific composition form of the public key for encryption may be determined based on an actual application scenario, and is not limited herein.

Further, in a specific implementation, the first global public key obtained by the access point from the network or the KMS may be a global public key $GPK_{enc}$ for data encryption in an IBC technology. The first private key may be a private key $SK_{BS\_ID\_enc}$ for data encryption corresponding to the access point that is generated based on the ID of the access point and the foregoing $GPK_{enc}$ by using the IBC technology. The access point BS, the Wi-Fi AP, and the hotspot UE are all used as base stations in data transmission, and the ID of the access point that is used for generating the private key for data encryption includes the ID of the BS, an ID of the Wi-Fi AP, or the ID of the hotspot UE. Therefore, private keys for data encryption corresponding to the access point are all represented as $SK_{BS\_ID\_enc}$. The second global public key is a global public key $GPK_{Sig}$ for data signature in the IBC technology. The second private key is a private key $SK_{BS\_ID\_Sig}$ for data signature corresponding to the access point that is generated based on the ID of the access point and the foregoing $GPK_{Sig}$ by using the IBC technology. Likewise, the access point BS, the Wi-Fi AP, and the hotspot UE are all used as base stations in data transmission, and the ID of the access point that is used for generating the private key for data signature includes the ID of the BS, the ID of the Wi-Fi AP, or the ID of the hotspot UE. Therefore, private keys for data signature corresponding to the access point are all represented as $SK_{BS\_ID\_Sig}$.

In some feasible implementations, the UE may also obtain processing parameters for processing transmission data from the network or the foregoing KMS. The processing parameters may include an identity of an operator to which the UE belongs, a global public key, a private key corresponding to the UE, or the like. The identity of the operator to which the UE belongs may be represented as operator ID1. For example, if the operator to which the UE belongs is an operator A, the operator ID1 is an identity of the operator A. The global public key includes a first global public key and a second global public key, and the private key includes a third private key and a fourth private key. The first global public key is a global public key $GPK_{enc}$ for data encryption that is the same as the first global public key obtained by the access point. The second global public key is a global public key $GPK_{sig}$ for data signature that is the same as the second global public key obtained by the access point. The third private key may be a private key $SK_{UE\_ID\_enc}$ for data encryption corresponding to the UE that is generated based on a UE_ID and the foregoing $GPK_{enc}$ by using the IBC technology. The fourth private key is a private key $SK_{UE\_ID\_Sig}$ for data signature corresponding to the UE that is generated based on the UE_ID and the foregoing $GPK_{sig}$ by using the IBC technology.

In a specific implementation, the access point may periodically send the broadcast message to the UE, where the broadcast message carries the public key for encryption, so that the UE performs data protection based on the public key for encryption.

Further, in some feasible implementations, the access point may use the $GPK_{Sig}$ and the $SK_{BS\_ID\_Sig}$ that are stored in the second prestored data to sign the broadcast message to obtain a signature (represented as Sig1) of the broadcast message, and add, to the broadcast message, indication information indicating that the access point has a data signature function. Further, the broadcast message may carry the Sig1.

S202. The UE receives the broadcast message of the access point, and stores a public key for encryption that is carried in the broadcast message.

In some feasible implementations, after receiving the broadcast message sent by the access point, the UE may determine, based on information carried in the broadcast message, whether the access point supports data encryption or data signature based on the public key for encryption, and a type of the public key for encryption. The type of the public key for encryption may include a public key for encryption in the IBC technology or a public key in a PKI technology. This embodiment of the present invention specifically describes data transmission supporting the public key for encryption in the IBC technology. In a specific implementation, if the broadcast message sent by the access point does not carry the public key for encryption, it may be determined that the access point does not support data encryption based on the public key for encryption, and the UE does not need to encrypt data when sending the data to the access point. For this application scenario, details are not described in this embodiment of the present invention. If the broadcast message carries the public key for encryption but does not include indication information indicating whether the access point has a data signature function, the UE may directly store the public key for encryption that is carried in the broadcast message, so as to encrypt, based on the public key for encryption, data that subsequently needs to be sent to the access point.

In some feasible implementations, if the UE receives the broadcast message sent by the access point, and determines that the broadcast message carries indication information, the UE may determine, based on the indication information, whether the access point has a data signature function. The UE may further check whether a timestamp or a sequence number carried in the broadcast message is valid. If the timestamp or the sequence number is valid, the UE may further directly store information carried in the broadcast message, including information such as the public key for encryption, the timestamp, and the sequence number.

Further, in some feasible implementations, if the UE determines, based on the indication information carried in the broadcast message, that the access point has the data signature function, validity of the broadcast message may be checked based on the signature carried in the broadcast message. Specifically, the UE may determine, based on identification information of the access point (for example, the ID of the access point) carried in the broadcast message, an identity (operator ID2) of an operator to which the access point belongs. The operator ID2 is matched with the operator ID1, and if the operator ID2 is the same as the operator ID1, it may be determined that the access point and the UE belong to the same operator. Further, after determining that the access point and the UE belong to the same operator, the UE may search, based on the operator ID1 (in this case, the operator ID2 is the same as the operator ID1), first prestored data of the UE for a global public key for data signature (set to a third global public key) corresponding to the operator ID1, that is, a third global public key $GPK_{Sig}1$ corresponding to the access point. Further, if the broadcast message carries the signature Sig1, the UE may attempt to authenticate the broadcast message by using information such as the $GPK_{Sig}1$ and the ID of the access point. When the broadcast message has been authenticated, the UE determines to add the information carried in the broadcast message, such as the public key for encryption and the timestamp or the sequence number, to the first prestored data of the UE for use in subsequent transmission data processing. If the broadcast message fails to be authenticated, the broadcast message is discarded. When the UE needs to send the transmission data, the UE may process the data based on information about a target access point that is stored in the first prestored data, and send the data to the target access point.

S203. When the UE needs to send transmission data to the access point, the UE protects the transmission data by using the public key for encryption and a global public key or a private key corresponding to the UE that are obtained from first prestored data, to obtain a protection message.

In a specific implementation, the global public key may include the $GPK_{enc}$ or the $GPK_{Sig}$, and may be specifically determined based on a specific manner in which the UE processes the transmission data. The private key corresponding to the UE may include the $SK_{UE\_ID\_enc}$ or the $SK_{UE\_ID\_Sig}$, and may be specifically determined based on the specific manner in which the UE processes the transmission data. The following specifically describes an implementation of data transmission with reference to steps S204 to S206.

S204. The UE sends the protection message to the access point.

In a specific implementation, the protection message carries an indication message indicating a protection manner of the transmission data. The protection manner may include encryption, or encryption and signature, or a key used for encryption, and information such as a key used for signature. The following specifically describes an implementation of data transmission with reference to steps S205 to S206.

S205. The access point obtains a global public key and a private key corresponding to the access point from second prestored data based on an indication message indicating a protection manner, and parses the protection message by using the global public key and the private key corresponding to the access point.

S206. The access point sends the transmission data obtained through parsing to a core network.

In some feasible implementations, when the UE needs to send the transmission data to the target access point, the UE may obtain, from the first prestored data based on identification information such as an ID of the target access point, a public key for encryption and a $GPK_{enc}$ that are corresponding to the target access point. The target access point may be an access point corresponding to a piece of access point information in one or more pieces of access point information included in the first prestored data of the UE. For example, if the target access point is a target BS (abbreviated as BS), a public key for encryption may be obtained from the first prestored data based on a BS_ID, where the public key for encryption may be the BS_ID, or the public key for encryption includes the BS_ID. Further, the UE may further obtain identification information of the UE, such as a UE_ID and other information, from the first prestored data of the UE. The UE may input information such as the transmission data that needs to be sent and the UE_ID into a system function, to obtain a first message authentication code (MAC) (such as a MAC 0), and encrypt the transmission data and the MAC 0 by using the public key for encryption and the $GPK_{enc}$, to obtain a protection message. The protection message may carry indication information indicating a protection manner of the transmission data. The protection manner of the transmission data is encrypting the transmission data and the MAC 0 by using the public key for encryption and the $GPK_{enc}$.

Further, in some feasible implementations, when the UE generates the message authentication code, information such as a timestamp and a sequence number that are stored in the first prestored data may be input into the system function together with the information such as the transmission data that needs to be sent and the UE_ID, to generate the MAC 0 by using the system function. The information such as the timestamp and the sequence number is added to data for generating the MAC 0, so that the access point can better check message integrity, and data transmission security is improved. In the following application scenarios, during generation of the message authentication code, the timestamp and the sequence number may also be added, based on actual application scenario requirements, to data that is input into the system function, to improve data transmission security in the application scenarios. Details are not described below.

In a specific implementation, after the UE obtains the protection message by encrypting the transmission data, the UE may send the protection message to the access point. The protection message may include an indicator, and the indicator is used to transmit the foregoing indication information to notify the access point of the protection manner of the transmission data.

In some feasible implementations, after receiving the protection message, the access point may first determine the protection manner of the transmission data based on the protection message, and then obtain related data from the second prestored data based on the protection manner to parse the transmission data. If the protection manner of the transmission data is encrypting the transmission data and the MAC 0 by using the public key for encryption and the $GPK_{enc}$, the access point may obtain the $SK_{BS\_ID\_enc}$ and the $GPK_{enc}$ from the second prestored data, and decrypt the protection message by using the $SK_{BS\_ID\_enc}$ and the $GPK_{enc}$, to obtain a decrypted message. Further, the access point may obtain, from the decrypted message, the MAC 0 carried in the protection message. After obtaining the decrypted message through decryption, the access point may further input the decrypted message into a system function to obtain a message authentication code (which may be specifically set to a second message authentication code MAC 1). Data for generating the MAC 1 may also include information such as a timestamp and a sequence number. Specifically, if the broadcast message of the access point carries information such as a timestamp and a sequence number, when generating the message authentication code, the UE may add the timestamp and the sequence number to the data for generating the message authentication code. Correspondingly, when the access point attempts to authenticate the protection message sent by the UE, the access point may add the information such as the timestamp and the sequence number to the data for generating the message authentication code used to attempt to authenticate the protection message, which may be specifically determined based on an actual application scenario. In the following application scenarios, during generation of a message authentication code, it may also be determined, based on actual application scenario requirements, whether to add a timestamp and a message authentication code, and details are not described herein. When the MAC 1 matches the MAC 0, the transmission data carried in the protection message can be obtained, and then the transmission data can be sent to the core network.

Further, in some feasible implementations, when the UE needs to send the transmission data to the target access point (access point for short), the UE may further sign the transmission data. Specifically, when the UE needs to send the transmission data to the access point, the UE may obtain the public key for encryption, the $GPK_{enc}$, the $GPK_{sig}$, and the $SK_{UE\_ID\_Sig}$ from the first prestored data. Then the UE may sign the transmission data based on the $GPK_{sig}$ and the $SK_{UE\_ID\_Sig}$ to obtain a signature Sig2, and encrypt the transmission data, the identification information of the UE, and the Sig2 by using the public key for encryption and the $GPK_{enc}$, to obtain the protection message. The protection message may carry indication information indicating a protection manner of the transmission data. The protection manner of the transmission data is encrypting the transmission data and the Sig2 by using the public key for encryption and the $GPK_{enc}$.

In a specific implementation, after the UE obtains the protection message by encrypting the transmission data, the UE may send the protection message to the access point. The protection message may include an indicator, and the indicator is used to transmit the foregoing indication information to notify the access point of the protection manner of the transmission data.

In some feasible implementations, after receiving the protection message, the access point may first determine the protection manner of the transmission data based on the protection message, and then obtain related data from the second prestored data based on the protection manner to parse the transmission data. The protection manner of the transmission data is encrypting the transmission data and the Sig2 by using the public key for encryption and the $GPK_{enc}$. After determining, based on the indication message indicating the encryption manner, that the protection manner of the transmission data is encrypting the transmission data and the Sig2 by using the public key for encryption and the $GPK_{enc}$, the access point may obtain the $GPK_{enc}$ and the $SKB_{BS\_ID\_enc}$ from the second prestored data, and decrypt the protection message by using the $SK_{BS\_ID\_enc}$ and the $GPK_{enc}$, to obtain the transmission data. Further, the access point may further obtain the identification information (such as the UE_ID) of the UE and the Sig2 from a decrypted message obtained by decrypting the protection message. In a specific implementation, when the UE sends the protection message to the access point, the UE may add an identifier such as the UE_ID to the protection message, so that the access point attempts to authenticate the signature in the protection message based on the identifier such as the UE_ID, to determine whether to transmit the transmission data to the core network.

In a specific implementation, after determining, based on the indication message indicating the encryption manner, that the protection manner of the transmission data is encrypting the transmission data and the Sig2 by using the public key for encryption and the $GPK_{enc}$, the access point may obtain the $GPK_{sig}$ from the second prestored data, and attempt to authenticate the Sig2 carried in the protection message by using the UE_ID and the $GPK_{sig}$. If the Sig2 in the protection message has been authenticated, the access point may send the transmission data to the core network.

In this embodiment of the present invention, when the UE sends uplink data to the access point, the UE may use information such as the identity of the access point as the public key for encryption, and encrypt the to-be-uploaded transmission data by using the global public key in the IBC technology, so as to effectively protect air interface signaling and data in a 5G network and avoid leakage of user privacy and signaling content. The access point decrypts, signs, and attempts to authenticate, by using a message authentication code, the message sent by the UE, to filter out invalid signaling and data and protect security of the core network.

Figure 3:
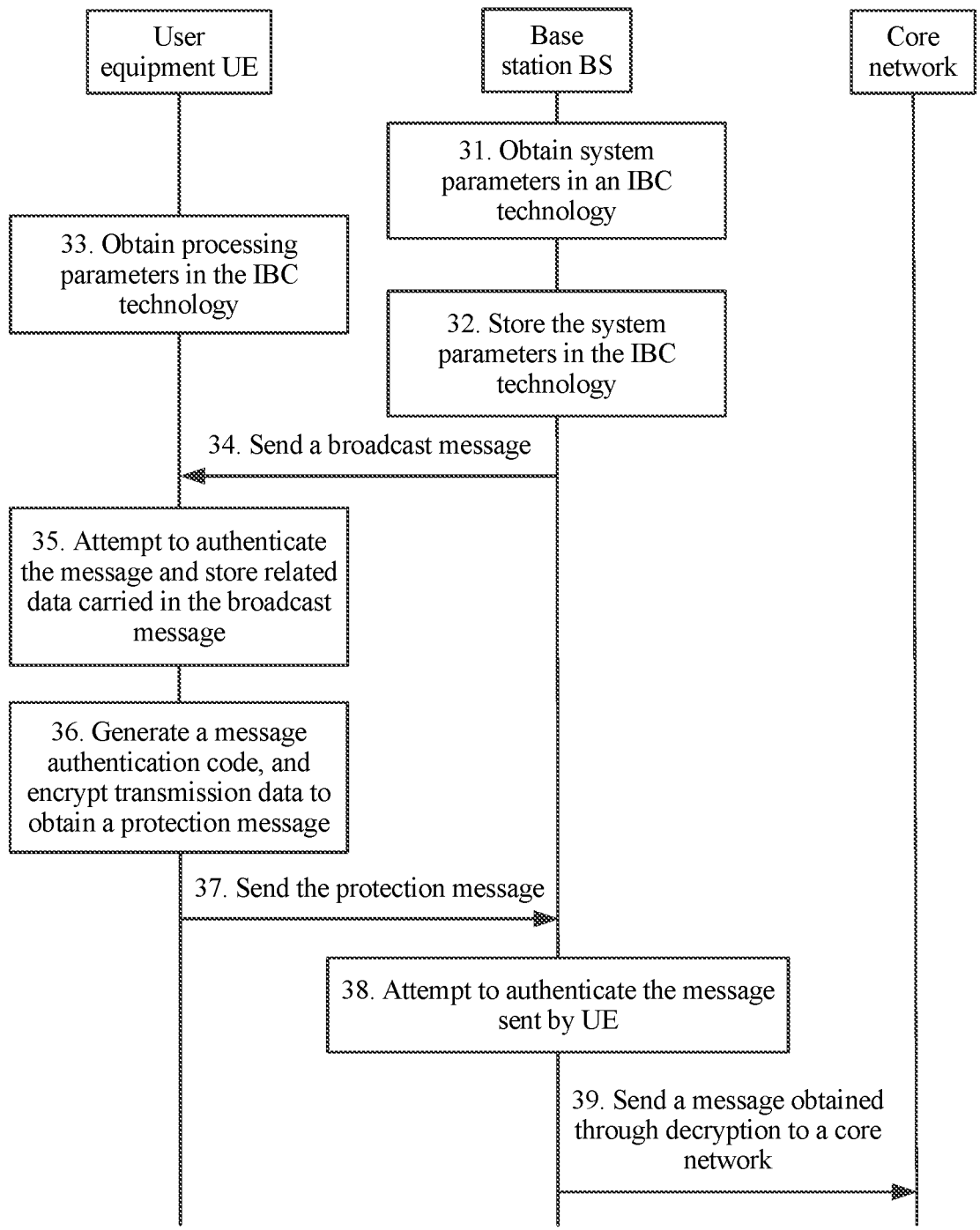
FIG. 3 is a schematic interaction diagram of a protection system in scenario 1 according to an embodiment of the present invention.

FIG. 3 is a schematic interaction diagram of a protection system in scenario 1 according to an embodiment of the present invention. The following describes a data interaction process, in scenario 1, of data transmit ends in the transmission data protection system according to this embodiment of the present invention with reference to FIG. 3. An access point is a BS. When the access point is the BS, a public key for encryption may be a BS_ID, or a public key for encryption includes a BS_ID. A private key $SK_{BS\_ID\_enc}$ and a private key $SK_{BS\_ID\_Sig}$ are specifically a private key for data encryption and a private key for data signature that are corresponding to the BS.

In this application scenario, UE and a radio access network (RAN) use an IBE technology to perform encryption for transmission of uplink data from the UE to the RAN, but the UE does not provide authentication information for a message. Therefore, the RAN has no authentication capability for the user message. The RAN is a network to which the access point belongs, and the RAN can provide a function of the access point. In this application scenario, an example in which an RAN side is a base station is used for description. A specific procedure in which a system including the UE and the base station performs data transmission includes the following steps.

31. The base station obtains system parameters in an IBC technology.

In a specific implementation, the base station may obtain the system parameters from a network. The system parameters may include the public key for encryption (such as the BS_ID), a global public key GPK, and a key $SK_{BS\_ID}$ for encryption or signature corresponding to the base station. When the base station has both functions of encryption and signature, the system parameters that the base station needs to obtain from the network include two global public keys, namely a $GPK_{enc}$ and a $GPK_{Sig}$, and two private keys, which are respectively the $SK_{BS\_ID\_enc}$ and the $SK_{BS\_ID\_Sig}$.

32. The base station stores the system parameters in the IBC technology.

The system parameters include the BS_ID, the $GPK_{enc}$, the $GPK_{Sig}$, the $SK_{BS\_ID\_enc}$, the $SK_{BS\_ID\_Sig}$, and the like.

33. The UE obtains processing parameters in the IBC technology.

In a specific implementation, the UE obtains, from a network, an operator ID of an operator to which the UE belongs and an IBC technology-based public key GPK. There may be two GPKs that are respectively corresponding to encryption and signature, such as a $GPK_{enc}$ and a $GPK_{Sig}$.

34. The base station sends a broadcast message.

In a specific implementation, the broadcast message includes an indicator, and the indicator (such as an indicator 1) may be used to indicate whether the message includes a public key in a PKI technology or a public key in the IBC technology, or may be used to indicate an identity (namely, the BS_ID) of the base station, or may be used to indicate whether the base station supports IBE technology-based encryption, whether the base station has a signature capability, and so on. The broadcast message may further carry a timestamp or a message sequence number.

Further, the base station may sign the message by using the $GPK_{Sig}$ and the private key $SK_{BS\_ID\_Sig}$, to obtain a Sig1.

35. The UE attempts to authenticate the message and stores related data carried in the broadcast message.

In a specific implementation, after receiving the broadcast message sent by the base station, the UE first determines, based on the indicator 1 included in the broadcast message, whether the base station supports public key-based encryption and a public key type. The public key type includes a PKI public key or an IBC public key. The IBC public key is described in this embodiment of the present invention, and the PKI public key is not limited. The UE may further determine whether the timestamp or the sequence number in the message is valid. The UE further determines whether the message carries a signature. If the broadcast message includes a signature (such as the foregoing Sig1), the UE obtains a corresponding operator ID (such as the foregoing operator ID2) based on an operator to which the base station belongs, and further determines a global public key $GPK_{Sig}$ corresponding to the operator ID2. The UE checks validity of the message by using identification information (such as the BS_ID) of the base station and the $GPK_{sig}$. If the message is valid, the public key for encryption (such as the BS_ID, where the BS_ID is also the identification information of the base station), the timestamp, the sequence number, and the like that are included in the broadcast message are stored. Otherwise, the UE discards the message. In a specific implementation, for authentication of the foregoing signature and broadcast message, refer to the related description of each step in the foregoing S201 to S206, and details are not described herein again.

36. The UE generates a message authentication code, and encrypts transmission data to obtain a protection message.

In a specific implementation, when the UE needs to send signaling or connectionless small data to the RAN, the UE first obtains, from first prestored data based on the ID (such as the BS_ID) of the receiver, the public key for encryption (the public key for encryption may be specifically the BS_ID or a key including the BS_ID) corresponding to the BS_ID and system parameters (such as the timestamp, the sequence number, and the $GPK_{enc}$) corresponding to the BS_ID. The UE inputs a message to be encrypted by a user into a system function (which may be specifically a hash function (Hash)) to obtain a message authentication code (such as a MAC 0). The message to be encrypted by the user may be signaling (or connectionless small data). Further, the message to be encrypted by the user may include signaling (or connectionless small data), a timestamp, a sequence number, and the like. The timestamp or the sequence number may be a value recently received by the UE. The UE performs an encryption operation on the to-be-sent signaling (or connectionless small data) and the MAC 0 by using the public key for encryption (BS_ID) or the global public key $GPK_{enc}$ corresponding to the BS, to obtain the protection message.

37. The UE sends the protection message obtained through encryption in step 36 to the base station.

In a specific implementation, the protection message includes an indicator (such as an indicator 2) indicating whether the protection message is encrypted, or a protection manner of the protection message, for example, whether the message is encrypted by using the BS_ID.

38. The base station attempts to authenticate the message sent by the UE.

In a specific implementation, after receiving the protection message sent by the UE, the base station first determines the protection manner of the protection message based on the indicator (such as the indicator 2) carried in the protection message. If the protection message is encrypted by using the BS_ID and the $GPK_{enc}$, the base station may obtain the BS_ID, the private key $SK_{BS\_ID\_enc}$ corresponding to the BS_ID, and the global public key $GPK_{enc}$ from the prestored data of the base station. Then the base station may decrypt the received protection message by using the obtained parameters (the $SK_{BS\_ID\_enc}$ and the global public key $GPK_{enc}$). If the message further includes the message authentication code (MAC 0), the base station further generates another message authentication code (MAC 1) based on a message obtained through decryption, and checks integrity of the message by comparing the MAC 0 and the MAC 1.

39. The base station sends a message obtained through decryption to a core network.

In a specific implementation, if the base station determines the integrity of the protection message by comparing the MAC 0 and the MAC 1, the base station may send the transmission data carried in the protection message to the core network. Further, after authentication of the message is completed, the base station may update charging information of the related user and send updated charging information to a charging unit of the core network.

In a specific implementation, for more detailed implementations of the foregoing steps, refer to the related description of each step in the foregoing S201 to S206, and details are not described herein again.

Figure 4:
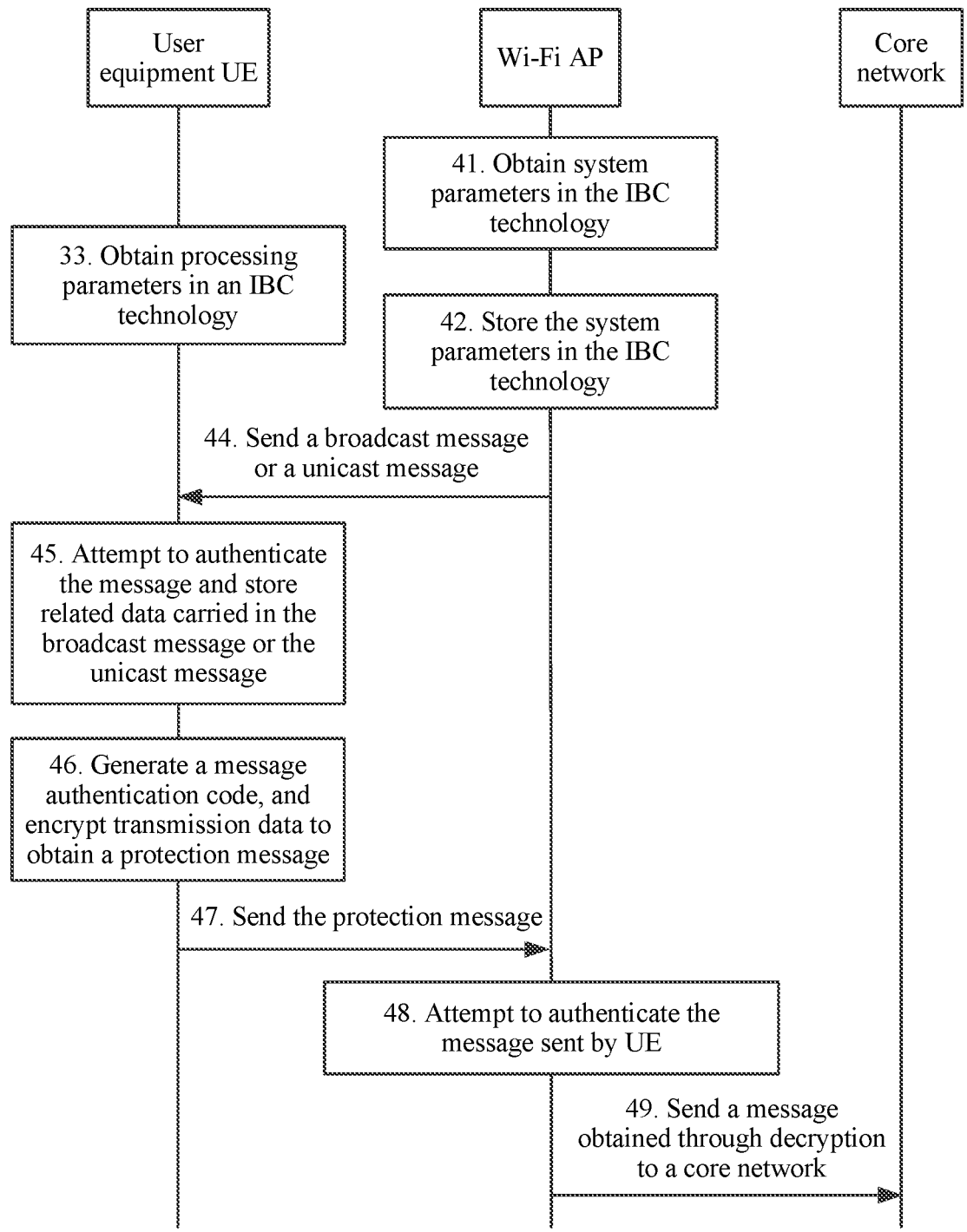
FIG. 4 is another schematic interaction diagram of a protection system in scenario 1 according to an embodiment of the present invention.

FIG. 4 is another schematic interaction diagram of a protection system in scenario 1 according to an embodiment of the present invention. The following describes a data interaction process, in scenario 1, of data transmit ends in the transmission data protection system according to this embodiment of the present invention with reference to FIG. 4. An access point is a Wi-Fi AP. When the access point is the Wi-Fi AP, a public key for encryption may be a MAC address or an SSID of the Wi-Fi AP. A private key $SK_{BS\_ID\_enc}$ and a private key $SK_{BS\_ID\_Sig}$ are specifically a private key for data encryption and a private key for data signature that are corresponding to the Wi-Fi AP.

In this application scenario, UE and the Wi-Fi AP use an IBE technology to encrypt data from the UE to a RAN, but the UE does not provide authentication information for a message. Therefore, the Wi-Fi AP has no authentication capability for the user message. The RAN is a network to which the access point belongs, and the RAN can provide a function of the access point. In this application scenario, an example in which an RAN side is a Wi-Fi AP is used for description. A specific procedure in which a system including the UE and the Wi-Fi AP performs data transmission includes the following steps.

41. The Wi-Fi AP obtains system parameters in an IBC technology.

In a specific implementation, the Wi-Fi AP may obtain the system parameters from a network. The system parameters may include the public key for encryption (such as the MAC address or the SSID), a global public key GPK, and a key $SK_{BS\_ID}$ for encryption or signature corresponding to the Wi-Fi AP. When the Wi-Fi AP has both functions of encryption and signature, the system parameters that the Wi-Fi AP needs to obtain from the network include two global public keys, namely a $GPK_{enc}$ and a $GPK_{Sig}$, and two private keys, which are respectively the $SK_{BS\_ID\_enc}$ and the $SK_{BS\_ID\_Sig}$.

42. The Wi-Fi AP stores the system parameters in the IBC technology.

The system parameters include the MAC address or the SSID, the $GPK_{enc}$, the $GPK_{Sig}$, the $SK_{BS\_ID\_enc}$, the $SK_{BS\_ID\_Sig}$, and the like.

43. The UE obtains processing parameters in the IBC technology.

In a specific implementation, the UE obtains, from a network, an operator ID of an operator to which the UE belongs and an IBC technology-based public key GPK. There may be two GPKs that are respectively corresponding to encryption and signature, such as a $GPK_{enc}$ and a $GPK_{Sig}$.

44. The Wi-Fi AP sends a broadcast message or a unicast message.

In a specific implementation, the broadcast message may be a beacon, and the unicast message may be a probe response. The broadcast message is used as an example for description in the following. The broadcast message includes an indicator, and the indicator (such as an indicator 1) may be used to indicate whether the message includes a public key in a PKI technology or a public key in the IBC technology, or may be used to indicate an identity (namely, the MAC address or the SSID) of the Wi-Fi AP, or may be used to indicate whether the Wi-Fi AP supports IBE technology-based encryption, whether the Wi-Fi AP has a signature capability, and so on. The broadcast message may further carry a timestamp or a message sequence number.

Further, the Wi-Fi AP may sign the message by using the MAC address or the SSID, and the private key $SK_{BS\_ID\_Sig}$, to obtain a Sig1.

45. The UE attempts to authenticate the message and stores related data carried in the broadcast message or the unicast message.

In a specific implementation, after receiving the broadcast message sent by the Wi-Fi AP, the UE first determines, based on the indicator 1 included in the broadcast message, whether the Wi-Fi AP supports public key-based encryption and a public key type. The public key type includes a PKI public key or an IBC public key. The IBC public key is described in this embodiment of the present invention, and the PKI public key is not limited. The UE may further determine whether the timestamp or the sequence number in the message is valid. The UE further determines whether the message carries a signature. If the broadcast message includes a signature (such as the foregoing Sig1), the UE further determines the global public key $GPK_{Sig}$ corresponding to the MAC address or the SSID based on the MAC address or the SSID of the Wi-Fi AP. The UE checks validity of the message by using identification information (such as the MAC address or the SSID) of the Wi-Fi AP and the $GPK_{Sig}$. If the message is valid, the public key for encryption (such as the MAC address or the SSID, where the MAC address or the SSID is also the identification information of the Wi-Fi AP), the timestamp, the sequence number, and the like that are included in the broadcast message are stored. Otherwise, the UE discards the message. In a specific implementation, for authentication of the foregoing signature and broadcast message, refer to the related description of each step in the foregoing S201 to S206, and details are not described herein again.

46. The UE generates a message authentication code, and encrypts transmission data to obtain a protection message.

In a specific implementation, when the UE needs to send signaling or connectionless small data to the RAN, the UE first obtains, from first prestored data based on the ID (such as the MAC address or the SSID) of the receiver, the public key for encryption (the public key for encryption may be specifically the MAC address, or the SSID, or a key including the MAC address or the SSID) corresponding to the MAC address or the SSID and system parameters (such as the timestamp, the sequence number, and the $GPK_{enc}$) corresponding to the MAC address or the SSID. The UE inputs a message to be encrypted by a user into a system function (which may be specifically a hash function (Hash)) to obtain a message authentication code (such as a MAC 0). The message to be encrypted by the user may be signaling (or connectionless small data). Further, the message to be encrypted by the user may include signaling (or connectionless small data), a timestamp, a sequence number, and the like. The timestamp or the sequence number may be a value recently received by the UE. The UE performs an encryption operation on the to-be-sent signaling (or connectionless small data) and the MAC 0 by using the public key for encryption (such as the MAC address or the SSID) or the global public key $GPK_{enc}$ corresponding to the Wi-Fi AP, to obtain the protection message.

47. The UE sends the protection message obtained through encryption in step 46 to the Wi-Fi AP, where the protection message includes an indicator (such as an indicator 2) indicating whether the protection message is encrypted, or a protection manner of the protection message, for example, whether the message is encrypted by using the MAC address or the SSID of the Wi-Fi AP.

48. The Wi-Fi AP attempts to authenticate the message.

In a specific implementation, after receiving the protection message sent by the UE, the Wi-Fi AP first determines the protection manner of the protection message based on the indicator (such as the indicator 2) carried in the protection message. If the protection message is $GPK_{enc}$ encrypted by using the GPK and the MAC address or the SSID, the Wi-Fi AP may obtain the MAC address or the SSID, the private key $SK_{BS\_ID\_enc}$ corresponding to the MAC address or the SSID, and the global public key $GPK_{enc}$ from the prestored data of the Wi-Fi AP. Then the Wi-Fi AP may decrypt the received protection message by using the obtained parameters (the $SK_{BS\_ID\_enc}$ and the global public key $GPK_{enc}$). If the message further includes the message authentication code (MAC 0), the Wi-Fi AP further generates another message authentication code (MAC 1) based on a message obtained through decryption, and checks integrity of the message by comparing the MAC 0 and the MAC 1.

49. The Wi-Fi AP sends a message obtained through decryption to a core network.

In a specific implementation, if the Wi-Fi AP determines the integrity of the protection message by comparing the MAC 0 and the MAC 1, the Wi-Fi AP may send the transmission data carried in the protection message to the core network. In a specific implementation, for more detailed implementations of the foregoing steps, refer to the related description of each step in the foregoing S201 to S206, and details are not described herein again.

Further, in some feasible implementations, when the UE needs to send the transmission data to the access point, the UE may further generate a symmetric key based on data such as the public key for encryption, the global public key, and the private key for data encryption corresponding to the UE, and then may protect the transmission data by using the symmetric key. Specifically, when the UE needs to send the transmission data to the access point, the UE may obtain the public key for encryption, the $GPK_{enc}$, and the $SK_{UE\_ID\_enc}$ from the first prestored data. Further, the UE may generate the symmetric key (set to a first symmetric key K1) based on the public key for encryption, the $GPK_{enc}$, and the $SK_{UE\_ID\_enc}$, and input the transmission data and the K1 into a system function to obtain a message authentication code (set to a third message authentication code MAC 2). It should be noted that the system function described in this embodiment of the present invention may be specifically a hash function, or may be another system function that can implement generation of the message authentication code, and may be determined based on an actual application scenario. No limitation is imposed herein.

In a specific implementation, after the UE generates the K1 based on the public key for encryption, the $GPK_{enc}$, and the $SK_{UE\_ID\_enc}$, the UE may encrypt the transmission data, identification information such as a UE_ID of the UE, and the foregoing generated MAC 2 by using the public key for encryption and the $GPK_{enc}$, to obtain the protection message. Further, the UE may add, to the protection message, indication information indicating a protection manner of the transmission data. The indication information is used to indicate that the protection manner of the transmission data is encrypting the transmission data, the UE_ID, and the MAC 2 by using the public key for encryption and the $GPK_{enc}$.

In a specific implementation, after the UE obtains the protection message by encrypting the transmission data, the UE may send the protection message to the access point. The protection message may include an indicator, and the indicator is used to transmit the foregoing indication information to notify the access point of the protection manner of the transmission data.

In some feasible implementations, after receiving the protection message, the access point may first determine the protection manner of the transmission data based on the protection message, and then obtain related data from the second prestored data based on the protection manner to parse the transmission data. The protection manner of the transmission data is encrypting the transmission data, the UE_ID, and the MAC 2 by using the public key for encryption and the $GPK_{enc}$. The access point may determine, based on the indication message indicating the protection manner, that the protection manner of the transmission data is encrypting the transmission data, the UE_ID, and the MAC 2 by using the public key for encryption and the $GPK_{enc}$, then obtain the $GPK_{enc}$ and the $SK_{BS\_ID\_enc}$ from the second prestored data, and decrypt the protection message by using the $SK_{BS\_ID\_enc}$ and the $GPK_{enc}$, to obtain a decrypted message. Further, the access point may obtain, from the decrypted message, the MAC 2, the UE_ID, and the transmission data that are carried in the protection message, and generate a symmetric key K2 by using the public key for encryption, the UE_ID, the $GPK_{enc}$, and the $SK_{BS\_ID\_enc}$. After the access point generates the K2, the access point may calculate a message authentication code (set to a fourth message authentication code MAC 3) by using the K2, the UE_ID, and the transmission data obtained through decryption. If the MAC 3 matches the MAC 2 carried in the protection message, the access point may send, to the core network, the transmission data sent by the UE that is carried in the protection message.

It should be noted that, in this embodiment of the present invention, in a same application scenario, the public key for encryption used by the UE for data encryption is the same as the public key for encryption used by the access point for data decryption or authentication, so that encrypted data can be correctly decrypted by a receiver. The public key for encryption is transmitted from the transmission data receiver (namely, the access point) to the transmission data sender (namely, the UE) by using a broadcast message or the like, and the transmission data sender uses the public key provided by the transmission data receiver to protect data, so as to avoid information leakage caused by carrying information such as a data encryption key during data transmission and improve network security.

Figure 5:
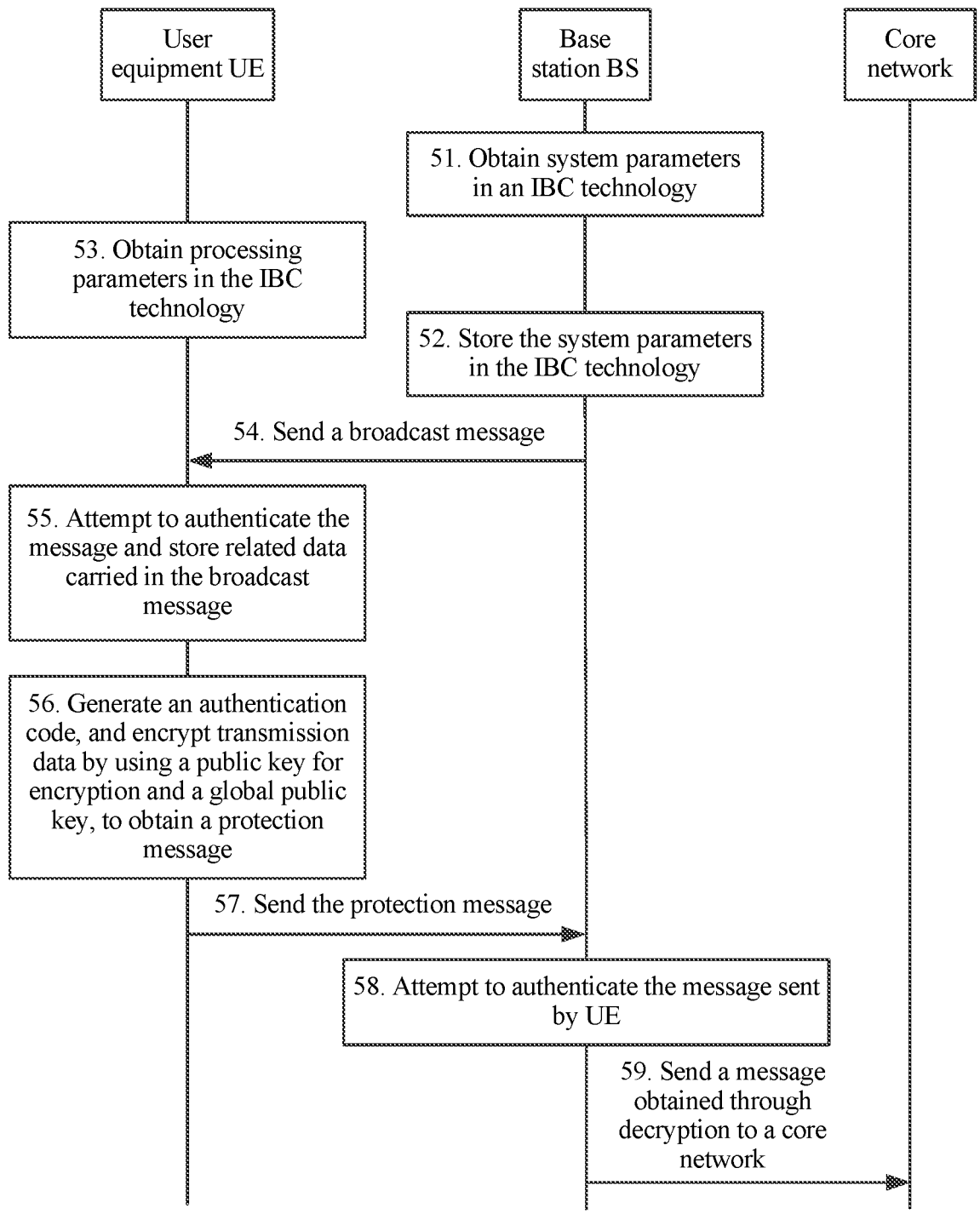
FIG. 5 is a schematic interaction diagram of a protection system in scenario 2 according to an embodiment of the present invention.

FIG. 5 is a schematic interaction diagram of a protection system in scenario 2 according to an embodiment of the present invention. The following describes a data interaction process, in scenario 2, of data transmit ends in the transmission data protection system according to this embodiment of the present invention with reference to FIG. 5. An access point is a BS. When the access point is the BS, a public key for encryption may be a BS_ID, or a public key for encryption includes a BS_ID. A private key $SK_{BS\_ID\_enc}$ and a private key $SK_{BS\_ID\_Sig}$ are specifically a private key for data encryption and a private key for data signature that are corresponding to the BS.

In this application scenario, different from the implementation in the application scenario shown in FIG. 3, UE and a RAN use an IBE technology to perform encryption for transmission of uplink data from the UE to the RAN, and the UE provides authentication information for a message. Therefore, the RAN has an authentication capability for a user message. The RAN is a network to which the access point belongs, and the RAN can provide a function of the access point. In this application scenario, an example in which an RAN side is a base station is used for description. A specific procedure in which a system including the UE and the base station performs data transmission includes the following steps.

51. The base station obtains system parameters in an IBC technology.

In a specific implementation, the base station may obtain the system parameters from a network. The system parameters may include the public key for encryption (such as the BS_ID), a global public key GPK, and a key $SK_{BS\_ID}$ for encryption or signature corresponding to the base station. When the base station has both functions of encryption and signature, the system parameters that the base station needs to obtain from the network include two global public keys, namely a $GPK_{enc}$ and a $GPK_{Sig}$, and two private keys, which are respectively the $SK_{BS\_ID\_enc}$ and the $SK_{BS\_ID\_Sig}$.

52. The base station stores the system parameters in the IBC technology.

The system parameters include the BS_ID, the $GPK_{enc}$, the $GPK_{Sig}$, the $SK_{BS\_ID\_enc}$, the $SK_{BS\_ID\_Sig}$, and the like.

53. The UE obtains processing parameters in the IBC technology.

In a specific implementation, the UE obtains, from a network, an operator ID1 of an operator to which the UE belongs, and an IBC technology-based public key GPK and private key. There may be two GPKs that are respectively corresponding to encryption and signature, such as a $GPK_{enc}$ and a $GPK_{Sig}$. There may also be two private keys that are respectively corresponding to encryption and signature, such as an $SK_{UE\_ID\_enc}$ and an $SK_{UE\_ID\_Sig}$.

54. The base station sends a broadcast message.

In a specific implementation, the broadcast message includes an indicator, and the indicator (such as an indicator 1) may be used to indicate whether the message includes a public key in a PKI technology or a public key in the IBC technology, or may be used to indicate an identity (namely, the BS_ID) of the base station, or may be used to indicate whether the base station supports IBE technology-based encryption, whether the base station has a signature capability, and so on. The broadcast message may further carry a timestamp or a message sequence number.

Further, the base station may sign the message by using the BS_ID and the private key $SK_{BS\_ID\_Sig}$, to obtain a Sig1.

55. The UE attempts to authenticate the message and stores related data carried in the broadcast message.

After receiving the broadcast message sent by the base station, the UE first determines, based on the indicator 1 included in the broadcast message, whether the base station supports public key-based encryption and a public key type. The public key type includes a PKI public key or an IBC public key. The IBC public key is described in this embodiment of the present invention, and the PKI public key is not limited. The UE may further determine whether the timestamp or the sequence number in the message is valid. The UE further determines whether the message carries a signature. If the broadcast message includes a signature (such as the foregoing Sig1), the UE obtains a corresponding operator ID (such as the foregoing operator ID2) based on an operator to which the base station belongs, and further determines a global public key $GPK_{Sig}$ corresponding to the operator ID2. The UE checks validity of the message by using identification information (such as the BS_ID) of the base station and the $GPK_{Sig}$. If the message is valid, the public key for encryption (such as the BS_ID, where the BS_ID is also the identification information of the base station), the timestamp, the sequence number, and the like that are included in the broadcast message are stored. Otherwise, the UE discards the message. In a specific implementation, for authentication of the foregoing signature and broadcast message, refer to the related description of each step in the foregoing S201 to S206, and details are not described herein again.

56. The UE generates an authentication code, and encrypts transmission data by using a public key for encryption and a global public key, to obtain a protection message.

In a specific implementation, when the UE needs to send signaling or connectionless small data to the RAN, the UE first obtains, from first prestored data based on the ID (such as the BS_ID) of the receiver, the public key for encryption (the public key for encryption may be specifically the BS_ID or a key including the BS_ID) corresponding to the BS_ID and system parameters (such as the timestamp, the sequence number, and the $GPK_{enc}$) corresponding to the BS_ID. Further, the UE may generate an authentication code for the message that needs to be sent. There may be two authentication code generation manners.

In a first manner, the UE generates a symmetric key (set to a K1) by using data such as the private key $SK_{UE\_ID}$, the global public key $GPK_{enc}$, and the public key for encryption (namely, the BS_ID). The UE inputs a message to be encrypted by a user (namely, the transmission data, such as signaling or connectionless small data, and may further include the K1 generated by using the foregoing method and a timestamp or a sequence number, where the timestamp or the sequence number may be a value recently received by the UE) into a system function to obtain a message authentication code (set to a MAC 2) with an authentication capability.

In a second manner, the UE directly uses the $GPK_{sig}$ and the $SK_{UE\_ID\_sig}$ to sign the to-be-sent message (namely, the transmission data, such as signaling or connectionless small data, and may further include a timestamp, a sequence number, or the like) to obtain a signature Sig2.

The UE performs an encryption operation on the to-be-sent signaling (or connectionless small data) and the MAC 2 by using the public key for encryption (BS_ID) and the global public key $GPK_{enc}$ that are corresponding to the BS, to obtain the protection message. Further, the UE may also perform an encryption operation on the to-be-sent signaling (or connectionless small data) and the Sig2 by using the public key for encryption (BS_ID) and the global public key $GPK_{enc}$ that are corresponding to the BS, to obtain the protection message.

57. The UE sends the protection message obtained through encryption in step 56 to the base station.

The protection message includes an indicator (such as an indicator 2) indicating whether the protection message is encrypted, or a protection manner of the protection message, for example, whether the message is encrypted by using the BS_ID.

58. The base station attempts to authenticate the protection message.

In a specific implementation, after receiving the protection message sent by the UE, the base station first determines the protection manner of the protection message based on the indicator (such as the indicator 2) carried in the protection message. If the protection message is encrypted by using the BS_ID and the $GPK_{enc}$, the base station may obtain the BS_ID, the private key $SK_{BS\_ID\_enc}$ corresponding to the BS_ID, and the global public key $GPK_{enc}$ from the prestored data of the base station. Then the base station may decrypt the received protection message by using the obtained parameters (the $SK_{BS\_ID\_enc}$ and the global public key $GPK_{enc}$).

If the message further includes the authentication code (the message authentication code or the signature), the base station needs to further check validity of the message. If integrity protection is performed on the message by using the symmetric key K1, the base station generates a symmetric key K2 by using the private key $SK_{BS\_ID\_enc}$, the global public key $GPK_{enc}$, and the UE_ID, and then calculates a message authentication code MAC 3 by using the K2, the UE_ID, and the transmission data obtained after the protection message is decrypted. The base station attempts to authenticate the protection message by comparing the MAC 3 and the MAC 2. If the UE signs the protection message, the base station uses the UE_ID carried in the message to attempt to authenticate the protection message with reference to the global public key $GPK_{sig}$ (other parameters such as the timestamp or the sequence number may be further included).

59. The base station sends a message obtained through decryption to a core network.

In a specific implementation, if the base station determines the integrity of the protection message by comparing the MAC 3 and the MAC 2 or through authentication of the Sig2, the base station may send the transmission data carried in the protection message to the core network. In a specific implementation, for more detailed implementations of the foregoing steps, refer to the related description of each step in the foregoing S201 to S206, and details are not described herein again.

Figure 6:
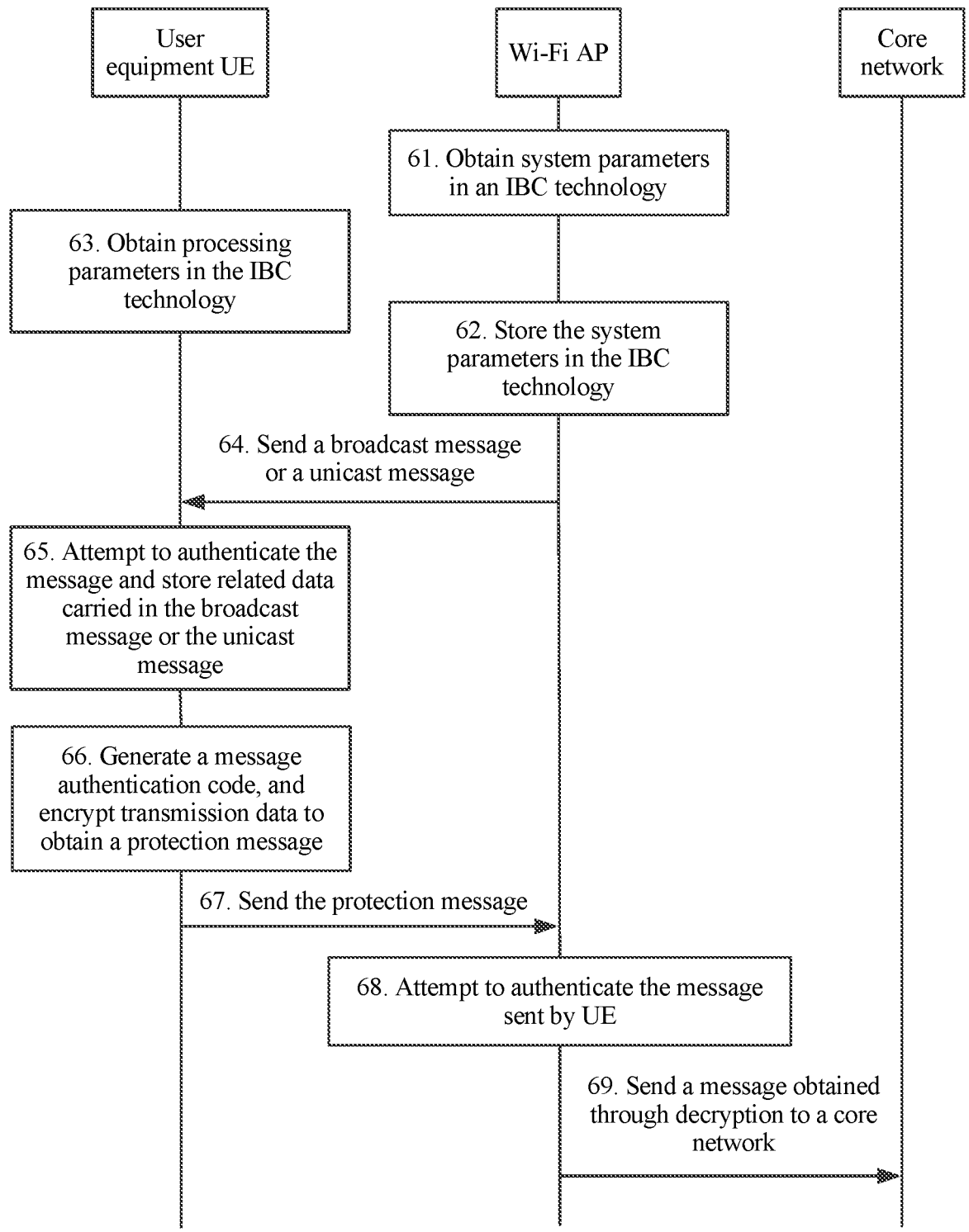
FIG. 6 is another schematic interaction diagram of a protection system in scenario 2 according to an embodiment of the present invention.

FIG. 6 is another schematic interaction diagram of a protection system in scenario 2 according to an embodiment of the present invention. The following describes a data interaction process, in scenario 2, of data transmit ends in the transmission data protection system according to this embodiment of the present invention with reference to FIG. 6. An access point is a Wi-Fi AP. When the access point is the Wi-Fi AP, a public key for encryption may be a MAC address or an SSID of the Wi-Fi AP. A private key $SK_{BS\_ID\_enc}$ and a private key $SK_{BS\_ID\_Sig}$ are specifically a private key for data encryption and a private key for data signature that are corresponding to the Wi-Fi AP.

In this application scenario, different from the implementation in the application scenario shown in FIG. 3, UE and a RAN use an IBE technology to perform encryption for transmission of uplink data from the UE to the RAN, and the UE provides authentication information for a message. Therefore, the RAN has an authentication capability for a user message. The RAN is a network to which the access point belongs, and the RAN can provide a function of the access point. In this application scenario, an example in which an RAN side is a Wi-Fi AP is used for description. A specific procedure in which a system including the UE and the Wi-Fi AP performs data transmission includes the following steps.

61. The Wi-Fi AP obtains system parameters in an IBC technology.

In a specific implementation, the Wi-Fi AP may obtain the system parameters from a network. The system parameters may include the public key for encryption (such as the MAC address or the SSID), a global public key GPK, and a key $SK_{BS\_ID}$ for encryption or signature corresponding to the Wi-Fi AP. When the Wi-Fi AP has both functions of encryption and signature, the system parameters that the Wi-Fi AP needs to obtain from the network include two global public keys, namely a $GPK_{enc}$ and a $GPK_{Sig}$, and two private keys, which are respectively the $SK_{BS\_ID\_enc}$ and the $SK_{BS\_ID\_Sig}$.

62. The Wi-Fi AP stores the system parameters in the IBC technology.

The system parameters include the MAC address or the SSID, the $GPK_{enc}$, the $GPK_{Sig}$, the $SK_{BS\_ID\_enc}$, the $SK_{BS\_ID\_Sig}$, and the like.

63. The UE obtains processing parameters in the IBC technology.

In a specific implementation, the UE obtains, from a network, a MAC address of the UE and an IBC technology-based public key GPK and private key. There may be two GPKs that are respectively corresponding to encryption and signature, such as a $GPK_{enc}$ and a $GPK_{Sig}$. There may also be two private keys that are respectively corresponding to encryption and signature, such as an $SK_{MAC\_enc}$ and an $SK_{MAC\_sig}$.

64. The Wi-Fi AP sends a broadcast message or a unicast message.

In a specific implementation, the broadcast message may be a beacon, and the unicast message may be a probe response. The broadcast message is used as an example for description in the following. The broadcast message includes an indicator, and the indicator (such as an indicator 1) may be used to indicate whether the message includes a public key in a PKI technology or a public key in the IBC technology, or may be used to indicate an identity (namely, the MAC address or the SSID) of the Wi-Fi AP, or may be used to indicate whether the Wi-Fi AP supports IBE technology-based encryption, whether the Wi-Fi AP has a signature capability, and so on. The broadcast message may further carry a timestamp or a message sequence number.

Further, the Wi-Fi AP may sign the message by using the MAC address or the SSID, and the private key $SK_{BS\_ID\_Sig}$, to obtain a Sig1.

65. The UE attempts to authenticate the message and stores related data carried in the broadcast message.

In a specific implementation, after receiving the broadcast message sent by the Wi-Fi AP, the UE first determines, based on the indicator 1 included in the broadcast message, whether the Wi-Fi AP supports public key-based encryption and a public key type. The public key type includes a PKI public key or an IBC public key. The IBC public key is described in this embodiment of the present invention, and the PKI public key is not limited. The UE may further determine whether the timestamp or the sequence number in the message is valid. The UE further determines whether the message carries a signature. If the broadcast message includes a signature (such as the foregoing Sig1), the UE further determines the global public key $GPK_{Sig}$ corresponding to the MAC address or the SSID based on the MAC address or the SSID of the Wi-Fi AP. The UE checks validity of the message by using identification information (such as the MAC address or the SSID) of the Wi-Fi AP and the $GPK_{Sig}$. If the message is valid, the public key for encryption (such as the MAC address or the SSID, where the MAC address or the SSID is also the identification information of the Wi-Fi AP), the timestamp, the sequence number, and the like that are included in the broadcast message are stored. Otherwise, the UE discards the message. In a specific implementation, for authentication of the foregoing signature and broadcast message, refer to the related description of each step in the foregoing S201 to S206, and details are not described herein again.

66. The UE generates an authentication code, and encrypts transmission data by using a public key for encryption and a global public key, to obtain a protection message.

In a specific implementation, when the UE needs to send signaling or connectionless small data to the RAN, the UE first obtains, from first prestored data based on the ID (such as the MAC address or the SSID) of the receiver, the public key for encryption (the public key for encryption may be specifically the MAC address, or the SSID, or a key including the MAC address or the SSID) corresponding to the MAC address or the SSID and system parameters (such as the timestamp, the sequence number, and the $GPK_{enc}$) corresponding to the MAC address or the SSID. Further, the UE may generate an authentication code for the message that needs to be sent. There may be two authentication code generation manners.

In a first manner, the UE generates a symmetric key (set to a K1) by using data such as the private key $SK_{MAC\_enc}$, the global public key $GPK_{enc}$, and the MAC address or the SSID of the UE. The UE inputs a message to be encrypted by a user (namely, the transmission data, such as signaling or connectionless small data, and may further include the K1 generated by using the foregoing method and a timestamp or a sequence number, where the timestamp or the sequence number may be a value recently received by the UE) into a system function to obtain a message authentication code (set to a MAC 2) with an authentication capability.

In a second manner, the UE directly uses the $GPK_{sig}$ and the $SK_{MAC\_sig}$ to sign the to-be-sent message (namely, the transmission data, such as signaling or connectionless small data, and may further include a timestamp, a sequence number, or the like) to obtain a signature Sig2.

The UE performs an encryption operation on the to-be-sent signaling (or connectionless small data) and the MAC 2 by using the public key for encryption (such as the MAC address or the SSID) and the global public key $GPK_{enc}$ that are corresponding to the Wi-Fi AP, to obtain the protection message. Further, the UE may also perform an encryption operation on the to-be-sent signaling (or connectionless small data) and the Sig2 by using the public key for encryption (the MAC address or the SSID) and the global public key $GPK_{enc}$ that are corresponding to the Wi-Fi AP, to obtain the protection message.

67. The UE sends the protection message obtained through encryption in step 56 to the Wi-Fi AP.

The protection message includes an indicator (such as an indicator 2) indicating whether the protection message is encrypted, or a protection manner of the protection message, for example, whether the message is encrypted by using the MAC address or the SSID of the Wi-Fi AP.

68. The Wi-Fi AP attempts to authenticate the message.

In a specific implementation, after receiving the protection message sent by the UE, the Wi-Fi AP first determines the protection manner of the protection message based on the indicator (such as the indicator 2) carried in the protection message. If the protection message is encrypted by using the $GPK_{enc}$ and the MAC address or the SSID of the Wi-Fi AP, the Wi-Fi AP may obtain the MAC address or the SSID of the Wi-Fi AP, the private key $SK_{BS\_ID\_enc}$ corresponding to the MAC address or the SSID, and the global public key $GPK_{enc}$ from the prestored data of the Wi-Fi AP. Then the Wi-Fi AP may decrypt the received protection message by using the obtained parameters (the $SK_{BS\_ID\_enc}$ and the global public key $GPK_{enc}$).

If the message further includes the authentication code (the message authentication code or the signature), the Wi-Fi AP needs to further check validity of the message. If integrity protection is performed on the message by using the symmetric key K1, the Wi-Fi AP generates a symmetric key K2 by using the public key for encryption (the MAC address or the SSID of the Wi-Fi AP), the private key $SK_{BS\_ID\_enc}$, the global public key $GPK_{enc}$, and the UE_ID, and then calculates a message authentication code MAC 3 by using the K2, the UE_ID, and the transmission data obtained after the protection message is decrypted. The Wi-Fi AP attempts to authenticate the protection message by comparing the MAC 3 and the MAC 2. If the UE signs the protection message, the Wi-Fi AP uses the UE_ID carried in the message to attempt to authenticate the protection message with reference to the global public key $GPK_{sig}$ (other parameters such as the timestamp or the sequence number may be further included).

69. The Wi-Fi AP sends a message obtained through decryption to a core network.

In a specific implementation, if the Wi-Fi AP determines the integrity of the protection message by comparing the MAC 3 and the MAC 2 or through authentication of the Sig2, the Wi-Fi AP may send the transmission data carried in the protection message to the core network. In a specific implementation, for more detailed implementations of the foregoing steps, refer to the related description of each step in the foregoing S201 to S206, and details are not described herein again.

Figure 7A:
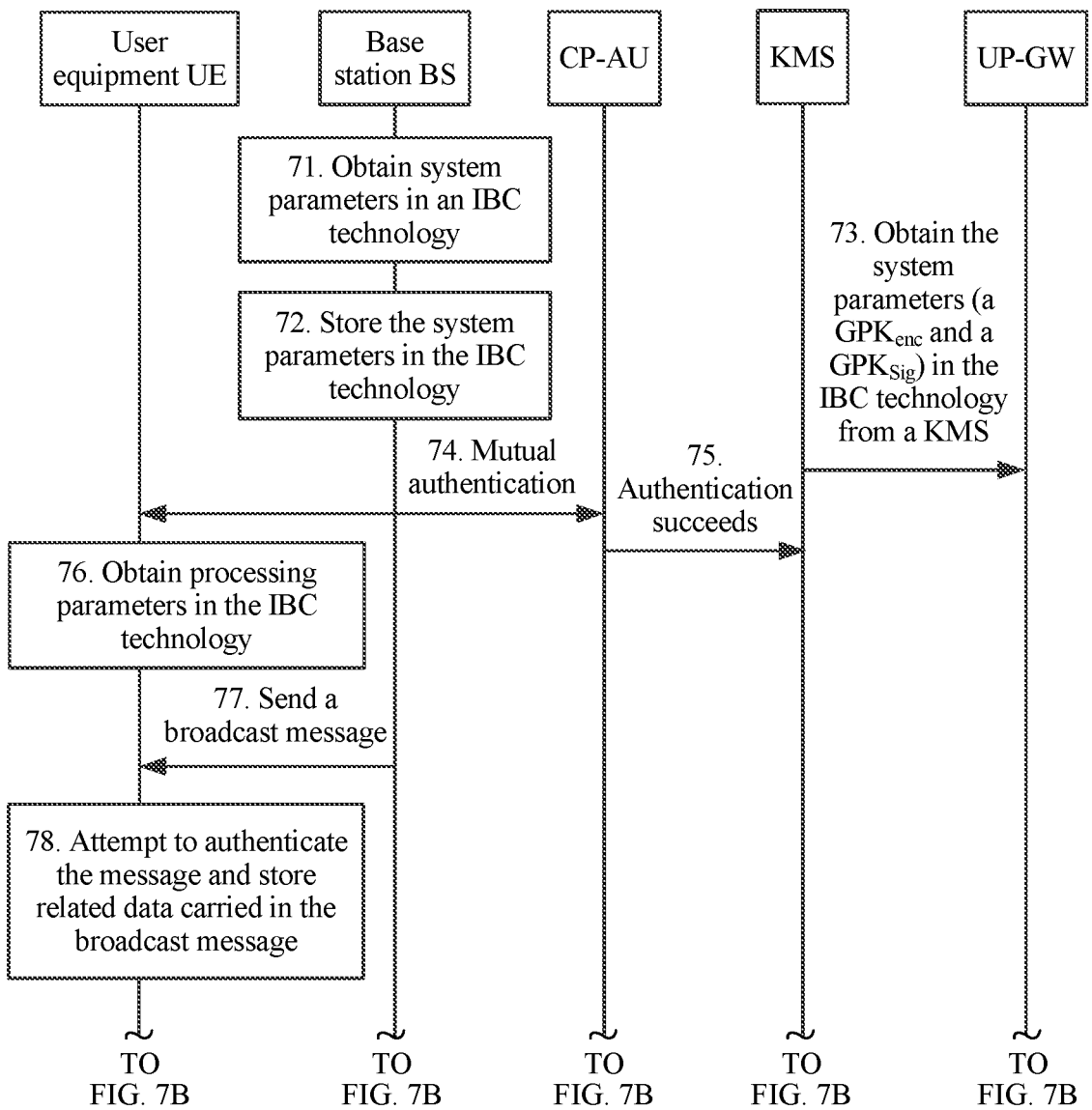
FIG. 7A and FIG. 7B are a schematic interaction diagram of a protection system in scenario 3 according to an embodiment of the present invention.
Figure 7B:
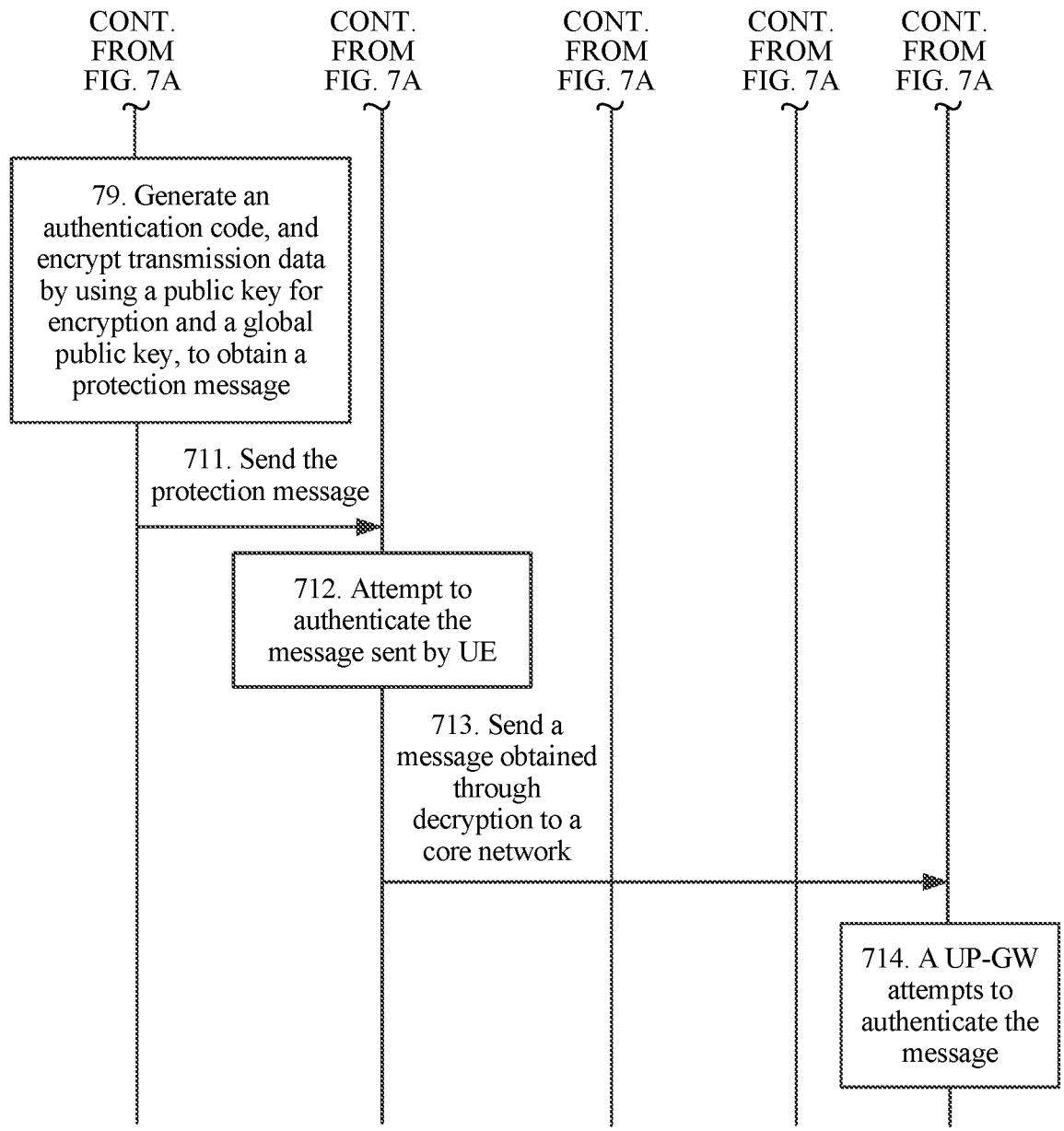

FIG. 7A and FIG. 7B are a schematic interaction diagram of a protection system in scenario 3 according to an embodiment of the present invention. The following describes a data interaction process, in scenario 3, of data transmit ends in the transmission data protection system according to this embodiment of the present invention with reference to FIG. 7A and FIG. 7B. An access point is a BS. When the access point is the BS, a public key for encryption may be a BS_ID, or a public key for encryption includes a BS_ID. A private key $SK_{BS\_ID\_enc}$ and a private key $SK_{BS\_ID\_Sig}$ are specifically a private key for data encryption and a private key for data signature that are corresponding to the BS.

In this application scenario, different from the implementation in the application scenario shown in FIG. 3, UE and a RAN use an IBE technology to perform encryption for transmission of uplink data from the UE to the RAN, and the UE provides authentication information for a message. Therefore, the RAN has an authentication capability for a user message. The RAN is a network to which the access point belongs, and the RAN can provide a function of the access point. In this application scenario, a system including the UE and the RAN may further perform data interaction with a network element in a core network. The network element in the core network includes a user plane gateway (UP-GW), a KMS, a control plane authentication unit (CP-AU), and the like. An example in which an RAN side is a base station is used for description in the following. A specific procedure in which a system including the UE and the base station performs data transmission includes the following steps.

71. The base station obtains system parameters in an IBC technology.

In a specific implementation, the base station may obtain the system parameters from the KMS. The system parameters may include the public key for encryption (such as the BS_ID), a global public key GPK, and a key $SK_{BS\_ID}$ for encryption or signature corresponding to the base station. When the base station has both functions of encryption and signature, the system parameters that the base station needs to obtain from the KMS include two global public keys, namely a $GPK_{enc}$ and a $GPK_{Sig}$, and two private keys, which are respectively the $SK_{BS\_ID\_enc}$ and the $SK_{BS\_ID\_Sig}$.

72. The base station stores the system parameters in the IBC technology.

The system parameters include the BS_ID, the $GPK_{enc}$, the $GPK_{Sig}$, the $SK_{BS\_ID\_enc}$, the $SK_{BS\_ID\_Sig}$, and the like.

73. The UP-GW obtains system parameters in the IBC technology from a KMS.

The system parameters obtained by the UP-GW from the KMS include the $GPK_{enc}$ and the $GPK_{Sig}$, which are respectively used for encryption and signature.

74. The UE and the core network perform mutual authentication.

When the UE and the core network perform mutual authentication, an authentication unit in the core network may be a CP-AU defined in 3GPP TR 23.799. For a specific authentication manner, refer to an implementation described in 3GPP TR 23.799, and details are not described herein.

75. The UE notifies the KMS in the core network that the authentication between the UE and the core network succeeds.

76. The UE obtains processing parameters in the IBC technology.

In a specific implementation, the UE obtains, from the KMS, an operator ID of an operator to which the UE belongs, and an IBC technology-based public key GPK and private key. There may be two GPKs that are respectively corresponding to encryption and signature, such as a $GPK_{enc}$ and a $GPK_{Sig}$. There may also be two private keys that are respectively corresponding to encryption and signature, such as an $SK_{UE\_ID\_enc}$ and an $SK_{UE\_ID\_sig}$.

77. The base station sends a broadcast message.

In a specific implementation, the broadcast message includes an indicator, and the indicator (such as an indicator 1) may be used to indicate whether the message includes a public key in a PKI technology or a public key in the IBC technology, or may be used to indicate an identity (namely, the BS_ID) of the base station, or may be used to indicate whether the base station supports IBE technology-based encryption, whether the base station has a signature capability, and so on. The broadcast message may further carry a timestamp or a message sequence number.

Further, the base station may sign the message by using the BS_ID and the private key $SK_{BS\_ID\_Sig}$, to obtain a Sig1.

78. The UE attempts to authenticate the message and stores related data carried in the broadcast message.

In a specific implementation, after receiving the broadcast message sent by the base station, the UE first determines, based on the indicator 1 included in the broadcast message, whether the base station supports public key-based encryption and a public key type. The public key type includes a PKI public key or an IBC public key. The IBC public key is described in this embodiment of the present invention, and the PKI public key is not limited. The UE may further determine whether the timestamp or the sequence number in the message is valid. The UE further determines whether the message carries a signature. If the broadcast message includes a signature (such as the foregoing Sig1), the UE obtains a corresponding operator ID (such as the foregoing operator ID2) based on an operator to which the base station belongs, and further determines a global public key $GPK_{Sig}$ corresponding to the operator ID2. The UE checks validity of the message by using identification information (such as the BS_ID) of the base station and the $GPK_{Sig}$. If the message is valid, the public key for encryption (such as the BS_ID, where the BS_ID is also the identification information of the base station), the timestamp, the sequence number, and the like that are included in the broadcast message are stored. Otherwise, the UE discards the message. In a specific implementation, for authentication of the foregoing signature and broadcast message, refer to the related description of each step in the foregoing S201 to S206, and details are not described herein again.

79. The UE generates an authentication code, and encrypts transmission data by using a public key for encryption and a global public key, to obtain a protection message.

In a specific implementation, when the UE needs to send signaling or connectionless small data to the RAN, the UE first obtains, from first prestored data based on the ID (such as the BS_ID) of the receiver, the public key for encryption (the public key for encryption may be specifically the BS_ID or a key including the BS_ID) corresponding to the BS_ID and system parameters (such as the timestamp, the sequence number, and the $GPK_{enc}$) corresponding to the BS_ID. Further, the UE may generate an authentication code for the message that needs to be sent. There may be two authentication code generation manners.

In a first manner, the UE generates a symmetric key (set to a K1) by using data such as the private key $SK_{UE\_ID}$, the global public key $GPK_{enc}$, and the public key for encryption (namely, the BS_ID). The UE inputs a message to be encrypted by a user (namely, the transmission data, such as signaling or connectionless small data, and may further include the K1 generated by using the foregoing method and a timestamp or a sequence number, where the timestamp or the sequence number may be a value recently received by the UE) into a system function to obtain a message authentication code (set to a MAC 2) with an authentication capability.

In a second manner, the UE directly uses the $GPK_{sig}$ and the $SK_{UE\_ID\_sig}$ to sign the to-be-sent message (namely, the transmission data, such as signaling or connectionless small data, and may further include a timestamp, a sequence number, or the like) to obtain a signature Sig2.

The UE performs an encryption operation on the to-be-sent signaling (or connectionless small data) and the MAC 2 by using the public key for encryption (BS_ID) and the global public key $GPK_{enc}$ that are corresponding to the BS, to obtain the protection message. Further, the UE may also perform an encryption operation on the to-be-sent signaling (or connectionless small data) and the Sig2 by using the public key for encryption (BS_ID) and the global public key $GPK_{enc}$ that are corresponding to the BS, to obtain the protection message.

710. The UE sends the protection message obtained through encryption in step 79 to the base station.

In a specific implementation, the protection message includes an indicator (such as an indicator 2) indicating whether the protection message is encrypted, or a protection manner of the protection message, for example, whether the message is encrypted by using the BS_ID, and whether the message is signed by using the UE_ID.

711. The base station attempts to authenticate the message sent by the UE.

In a specific implementation, after receiving the protection message sent by the UE, the base station first determines the protection manner of the protection message based on the indicator (such as the indicator 2) carried in the protection message. If the protection message is encrypted by using the BS_ID and the $GPK_{enc}$, the base station may obtain the BS_ID, the private key $SK_{BS\_ID\_enc}$ corresponding to the BS_ID, and the global public key $GPK_{enc}$ from the prestored data of the base station. Then the base station may decrypt the received protection message by using the obtained parameters (the $SK_{BS\_ID\_enc}$ and the global public key $GPK_{enc}$).

If the message further includes the authentication code (the message authentication code or the signature), the base station needs to further check validity of the message. If integrity protection is performed on the message by using the symmetric key K1, the base station generates a symmetric key K2 by using the public key for encryption (such as the BS_ID), the private key $SK_{BS\_ID\_enc}$, the global public key $GPK_{enc}$, and the UE_ID, and then calculates a message authentication code MAC 3 by using the K2, the UE_ID, and the transmission data obtained after the protection message is decrypted. The base station attempts to authenticate the protection message by comparing the MAC 3 and the MAC 2. If the UE signs the protection message, the base station uses the UE_ID carried in the message to attempt to authenticate the protection message with reference to the global public key $GPK_{sig}$ (other parameters such as the timestamp or the sequence number may be further included).

712. The base station sends a message obtained through decryption to a core network.

In a specific implementation, after the base station has authenticated the protection message, the base station may send the message obtained through decryption to the UP-GW of the core network. The message sent to the UP-GW includes information such as the UE_ID and the signature generated after the UE signs the message by using the $SK_{UE\_ID\_sig}$.

713. The UP-GW attempts to authenticate the message.

In a specific implementation, after receiving the message, the UP-GW may use the $GPK_{sig}$ and the UE_ID to attempt to authenticate the signature carried in the message. For a specific authentication manner, refer to the signature authentication manners in the foregoing application scenarios. Details are not described herein again. After the authentication succeeds, the message is further forwarded to another router or server.

In a specific implementation, for more detailed implementations of the foregoing steps, refer to the related description of each step in the foregoing S201 to S206, and details are not described herein again.

Figure 8:
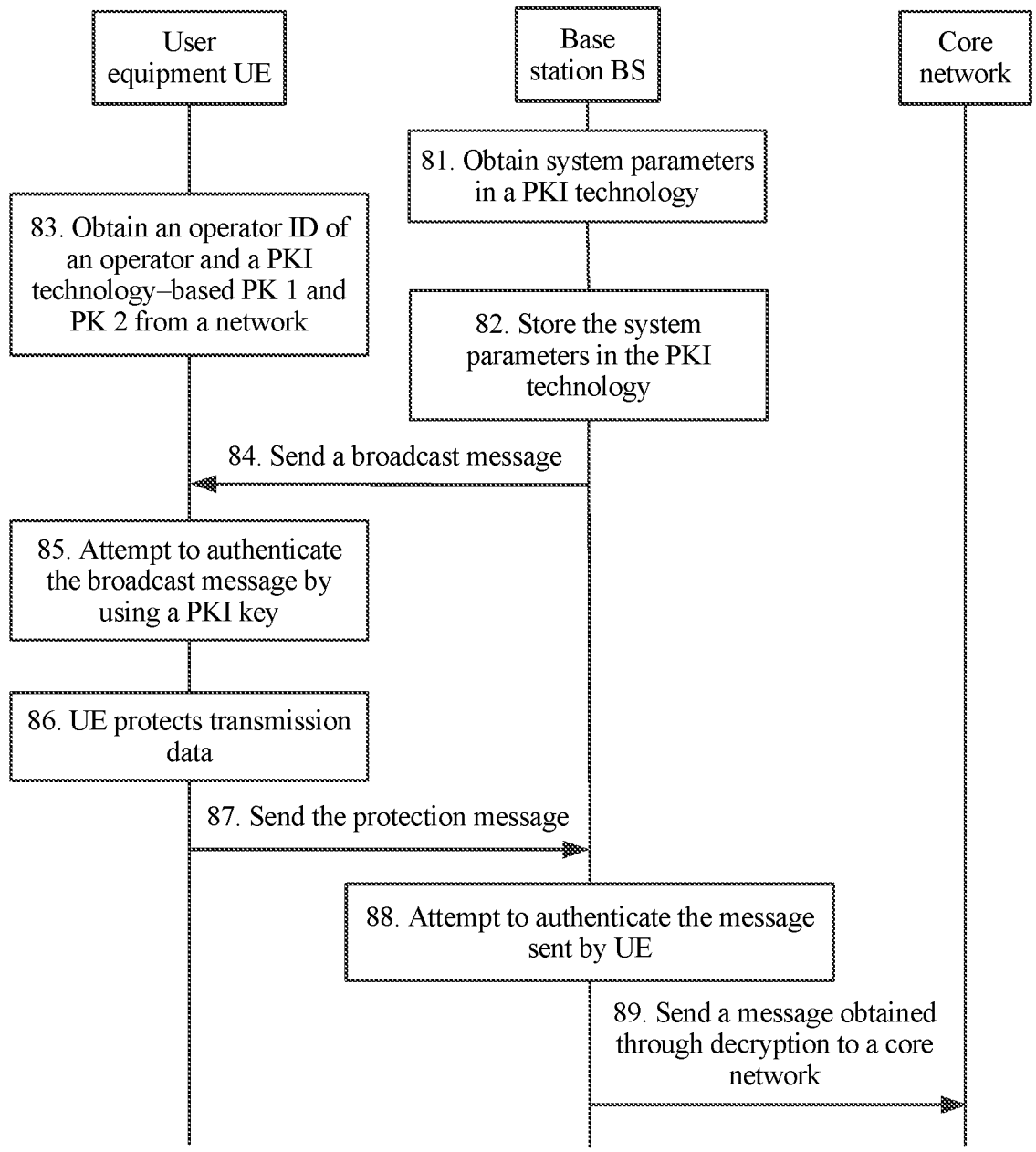
FIG. 8 is a schematic interaction diagram of a protection system in scenario 4 according to an embodiment of the present invention.

FIG. 8 is a schematic interaction diagram of a protection system in scenario 4 according to an embodiment of the present invention. The following describes a data interaction process, in scenario 4, of data transmit ends in the transmission data protection system according to this embodiment of the present invention with reference to FIG. 8. An access point is a BS.

In this application scenario, encryption and decryption of data are based on PKI, and keys are a PKI-based public key and private key. UE and a RAN can implement transmission data protection by using the PKI technology with reference to the foregoing implementation of the same principle using the IBC technology. In this application scenario, the UE and the RAN use the PKI technology to encrypt data from the UE to the RAN, but the UE does not provide authentication information for a message. Therefore, the RAN has no authentication capability for the user message. A specific procedure includes the following steps.

81. A base station obtains system parameters in the PKI technology.

In a specific implementation, the foregoing system parameters include an identity (such as a BS_ID) of the base station, a public key PK 1 used by the base station for encryption and a certificate thereof, a public key PK 2 for decryption and a certificate thereof, a private key SK 1 used for encryption, a private key SK 2 used for decryption, and the like.

82. The base station stores the system parameters in the PKI technology.

In a specific implementation, the system parameters include the BS_ID, the PK 1, the PK 2, the SK 1, the SK 2, and the like.

83. The UE obtains an operator ID of an operator and a PKI technology-based PK 1 and PK 2 from a network.

84. The base station sends a broadcast message.

In a specific implementation, the broadcast message includes an indicator (such as an indicator 3) indicating whether the message includes the PKI-based public keys PKs (including the PK 1 and the PK 2) and the certificates thereof.

85. The UE attempts to authenticate the broadcast message by using a PKI key.

In a specific implementation, after receiving the broadcast message sent by the base station, the UE first determines, based on the indicator 3 included in the broadcast message, whether the base station supports PKI public key-based encryption. The UE further determines whether a timestamp or a sequence number in the message is valid. The UE further determines whether the message carries a signature. If the broadcast message further includes a signature, the UE uses the PK 2 to check validity of the message. If the message is valid, the UE stores the BS_ID, the PK 1, and the PK 2, and may further store the timestamp, the sequence number, or the like. Otherwise, if the message is invalid, the UE discards the message.

86. The UE protects transmission data.

In a specific implementation, when the UE needs to send the transmission data (including signaling or connectionless small data) to a network side, the UE first obtains data such as the corresponding public key for encryption PK 1, the timestamp, and the sequence number based on the BS_ID of the base station, and inputs the obtained data into a system function to obtain a message authentication code (set to a MAC 8). The UE uses the BS_ID and the PK 1 to perform an encryption operation on the to-be-sent message and the MAC 8 thereof.

87. The UE sends a message obtained through encryption in step 86 to the base station.

In a specific implementation, the foregoing message includes an indicator (such as an indicator 4) indicating whether the message is encrypted, or whether the message is encrypted by using the PKI-based public key of the base station.

88. The base station attempts to authenticate the message.

In a specific implementation, after receiving the message sent by the UE, the base station first determines an encryption manner of the message based on the indicator carried in the message. If the message is encrypted by using the PKI public key PK 1, the base station obtains the private key SK 1 corresponding to the base station and decrypts the received message by using a parameter such as the obtained SK 1. If the message further includes the message authentication code, the base station further checks integrity of the message based on a parameter such as the SK 1.

89. The base station sends a message obtained through decryption to a core network.

In a specific implementation, for more detailed implementations of the foregoing steps, refer to the related descriptions of the steps in the foregoing IBS technology-based application scenarios, and details are not described herein again.

Figure 9:
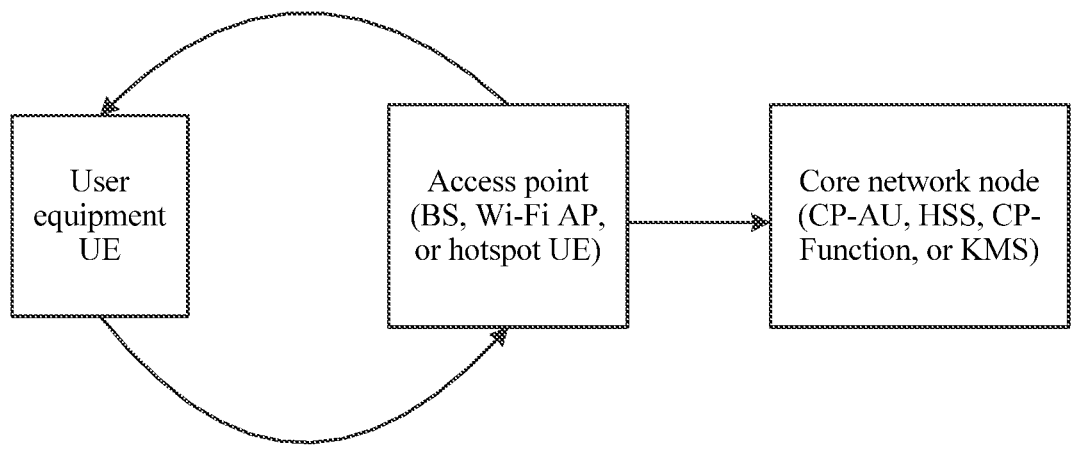
FIG. 9 is another transmission architecture diagram of data transmission according to an embodiment of the present invention.

FIG. 9 is another transmission architecture diagram of data transmission according to an embodiment of the present invention. The transmission architecture shown in FIG. 9 may include data transmit ends such as UE, an access point, and a core network node. The access point may include a BS, a Wi-Fi AP, or a hotspot UE serving as a network hotspot. The foregoing BS may be an NB in a 3G network, an eNB in a 4G network, or a base station in an earlier network era. No limitation is imposed herein. The BS is used as an example in this embodiment of the present invention for description.

The core network node may include a CP-AU, an HSS, a control plane function (CP-Function), a KMS, or the like.

Figure 10:
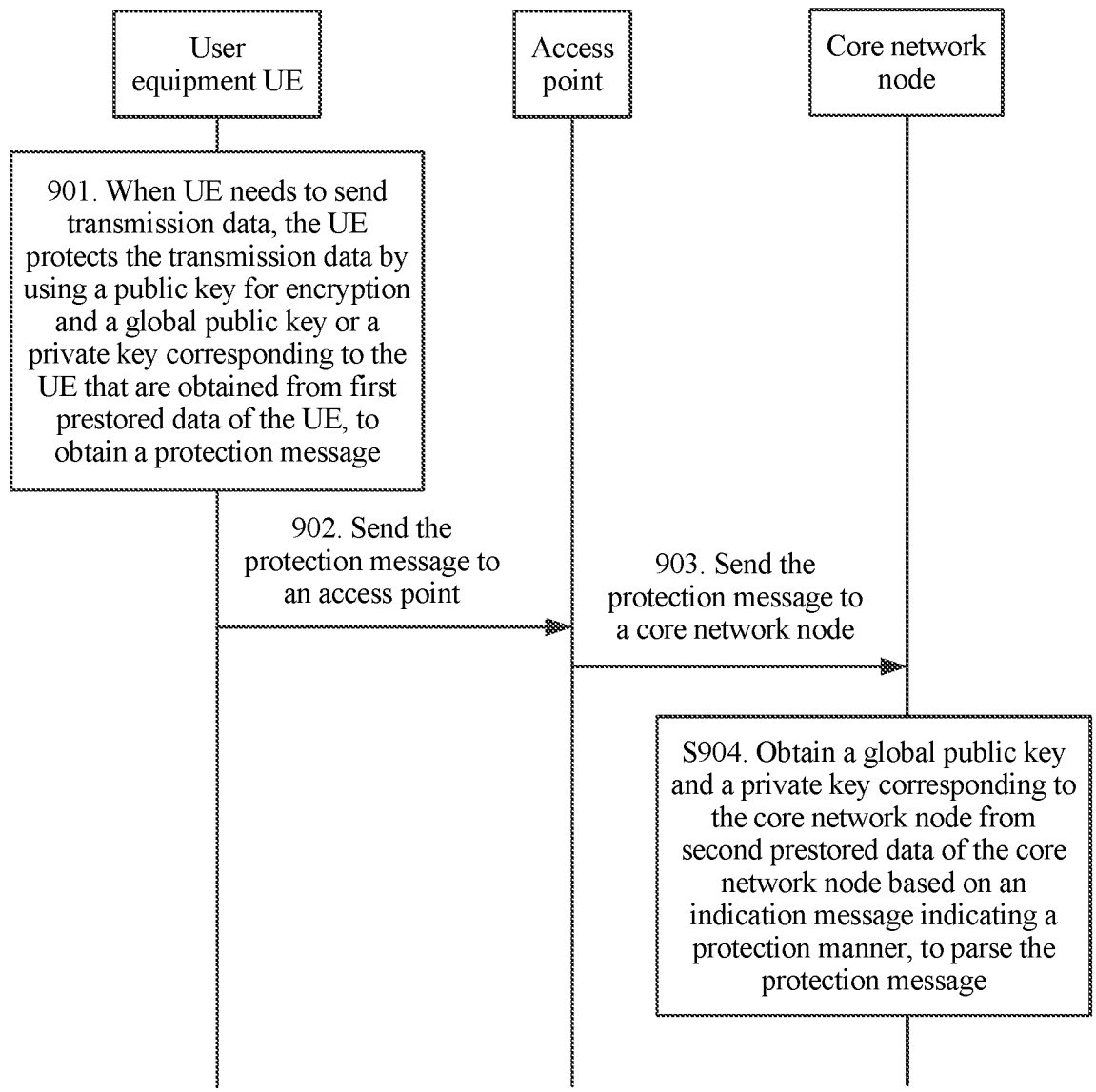
FIG. 10 is another schematic interaction diagram of data transmission performed in a transmission data protection system according to an embodiment of the present invention.

FIG. 10 is another schematic interaction diagram of data transmission performed in a transmission data protection system according to an embodiment of the present invention. A process in which data transmit ends in the protection system according to this embodiment of the present invention perform data transmission may include the following steps.

S901. When UE needs to send transmission data, the UE protects the transmission data by using a public key for encryption and a global public key or a private key corresponding to the UE that are obtained from first prestored data of the UE, to obtain a protection message.

S902. The UE sends the protection message to an access point.

S903. The access point sends the protection message to a core network node.

S904. After receiving the protection message, the core network node obtains a global public key and a private key corresponding to the core network node from second prestored data of the core network node based on an indication message indicating a protection manner, to parse the protection message.

In some feasible implementations, the UE may perform mutual authentication with a core network before sending the transmission data to the core network by using a BS. Specifically, the core network node may obtain system parameters from a KMS in advance, and store the obtained system parameters in specified storage space of the core network node, so that the obtained system parameters can be stored as prestored data of the core network node (set to the second prestored data). The system parameters obtained by the core network node from the KMS may include the public key for encryption, or a first global public key and a fifth private key, or a second global public key and a sixth private key, or the like. Information specifically included in the system parameters obtained by the core network node from the KMS may be determined based on a requirement of a data transmission operation performed by the core network node in an actual application scenario, and is not limited herein.

In a specific implementation, the public key for encryption may be an identifier of the core network node, such as an ID of the core network node; or the public key for encryption includes an ID of the core network node; or the like. If the core network node is a CP-AU in a specific application scenario, the public key for encryption may be an identity (namely, a CP_AU_ID) of the CP-AU, or the public key for encryption includes a CP_AU_ID. That the public key for encryption includes a CP_AU_ID means that the public key for encryption consists of the CP_AU_ID and other data, and the CP_AU_ID is only a part of data in a long string of the public key for encryption. Specific content of the public key for encryption may be determined based on a data form of the public key for encryption, and is not limited herein.

If the access point is an HSS in a specific application scenario, the public key for encryption may be an HSS_ID, or the public key for encryption includes an HSS_ID. In a specific implementation, when the access point is an HSS, a specific composition form of the public key for encryption may be determined based on an actual application scenario, and is not limited herein.

Further, in a specific implementation, the first global public key obtained by the access point from the KMS may be a global public key $GPK_{enc}$ for data encryption in an IBC technology. The fifth private key may be a private key $SK_{CP\_ID\_enc}$ for data encryption corresponding to the core network node that is generated based on the ID of the core network node and the foregoing $GPK_{enc}$ by using the IBC technology. The CP-AU and the HSS are both used as core network nodes in data transmission. The ID of the core network node used to generate the private key for data encryption includes the CP_AU_ID and the HSS_ID. Therefore, private keys for data encryption corresponding to the core network node are all represented as $SK_{CP\_ID\_enc}$. The second global public key is a global public key $GPK_{Sig}$ for data signature in the IBC technology. The sixth private key is a private key $SK_{CP\_ID\_Sig}$ for data signature corresponding to the core network node that is generated based on the ID of the core network node and the foregoing $GPK_{Sig}$ by using the IBC technology.

In some implementations, the UE may obtain, from the core network, the public key for encryption and core network processing parameters used for processing the transmission data, and store the public key for encryption and the core network processing parameters as the first prestored data of the UE. The core network processing parameters may include the global public key, the private key corresponding to the UE, or the like. The global public key includes a first global public key and a second global public key, and the private key includes a third private key and a fourth private key. The first global public key is a global public key $GPK_{enc}$ for data encryption that is the same as the first global public key obtained by the core network node. The second global public key is a global public key $GPK_{sig}$ for data signature that is the same as the second global public key obtained by the core network node. The third private key may be a private key $SK_{UE\_ID\_enc}$ for data encryption corresponding to the UE that is generated based on a UE_ID and the foregoing $GPK_{enc}$ by using the IBC technology. The fourth private key is a private key $SK_{UE\_ID\_Sig}$ for data signature corresponding to the UE that is generated based on the UE_ID and the foregoing $GPK_{sig}$ by using the IBC technology.

In some feasible implementations, when the UE needs to send the transmission data to the access point, the UE may obtain, from the first prestored data based on identification information such as the ID of the core network node, the public key for encryption and the $GPK_{enc}$ that are corresponding to the core network node. For example, if the core network node is the CP-AU, the public key for encryption may be obtained from the first prestored data based on the CP_AU_ID. The public key for encryption may be the CP_AU_ID, or the public key for encryption includes the CP_AU_ID. Further, the UE may encrypt the transmission data by using the public key for encryption and the $GPK_{enc}$, to obtain the protection message. The protection message may carry indication information indicating a protection manner of the transmission data. The protection manner of the transmission data is encrypting the transmission data by using the public key for encryption and the $GPK_{enc}$.

In a specific implementation, after the UE obtains the protection message by encrypting the transmission data, the UE may send the protection message to the access point. The protection message may include an indicator, and the indicator is used to transmit the foregoing indication information to notify the core network node of the protection manner of the transmission data. After receiving the protection message, the access point may forward the protection message, the indication information carried in the protection message, and the like to the core network node.

In some feasible implementations, after receiving the protection message, the core network node may first determine the protection manner of the transmission data based on the protection message, and then obtain related data from the second prestored data based on the protection manner to parse the transmission data. If the protection manner of the transmission data is encrypting the transmission data by using the public key for encryption and the $GPK_{enc}$, the core network node may obtain the $SK_{CP\_ID\_enc}$ and the $GPK_{enc}$ from the second prestored data, and decrypt the protection message by using the $SK_{CP\_ID\_enc}$ and the $GPK_{enc}$, to obtain a decrypted message.

Further, in some feasible implementations, when the UE needs to send the transmission data to the core network node, the UE may further sign the transmission data. Specifically, when the UE needs to send the transmission data to the core network node, the UE may obtain the public key for encryption, the $GPK_{enc}$, the $GPK_{sig}$, and the $SK_{UE\_ID\_Sig}$ from the first prestored data. Then the UE may sign the transmission data based on the $GPK_{sig}$ and the $SK_{UE\_ID\_Sig}$ to obtain a signature Sig3, and encrypt the transmission data, identification information of the UE, and the Sig3 by using the public key for encryption and the $GPK_{enc}$, to obtain the protection message. The protection message may carry indication information indicating a protection manner of the transmission data. The protection manner of the transmission data is encrypting the transmission data and the Sig3 by using the public key for encryption and the $GPK_{enc}$.

In a specific implementation, after the UE obtains the protection message by encrypting the transmission data, the UE may send the protection message to the access point. The access point may forward the protection message to the core network node. The protection message may include an indicator, and the indicator is used to transmit the foregoing indication information to notify the access point of the protection manner of the transmission data.

In some feasible implementations, after receiving the protection message, the core network node may first determine the protection manner of the transmission data based on the protection message, and then obtain related data from the second prestored data based on the protection manner to parse the transmission data. The protection manner of the transmission data is encrypting the transmission data and the Sig3 by using the public key for encryption and the $GPK_{enc}$. After determining, based on the indication message indicating the encryption manner, that the protection manner of the transmission data is encrypting the transmission data and the Sig3 by using the public key for encryption and the $GPK_{enc}$, the core network node may obtain the $GPK_{enc}$ and the $SK_{CP\_ID\_enc}$ from the second prestored data, and decrypt the protection message by using the $SK_{CP\_ID\_enc}$ and the $GPK_{enc}$, to obtain the transmission data. Further, the core network node may further obtain the identification information (such as the UE_ID) of the UE and the Sig3 from a decrypted message obtained by decrypting the protection message. In a specific implementation, when the UE sends the protection message to the core network node, the UE may add an identifier such as the UE_ID to the protection message, so that the core network node attempts to authenticate the signature in the protection message based on the identifier such as the UE_ID.

In a specific implementation, after determining, based on the indication message indicating the encryption manner, that the protection manner of the transmission data is encrypting the transmission data and the Sig3 by using the public key for encryption and the $GPK_{enc}$, the core network node may obtain the $GPK_{sig}$ from the second prestored data, and attempt to authenticate the Sig3 carried in the protection message by using the UE_ID and the $GPK_{sig}$. If the Sig3 in the protection message has been authenticated, the core network node may send the transmission data to a related network element in the core network.

Further, in some feasible implementations, when the UE needs to send the transmission data to the core network node, the UE may further generate a symmetric key K3 based on data such as the public key for encryption, the global public key, and the private key for data encryption corresponding to the UE, and then may protect the transmission data by using the symmetric key. Specifically, when the UE needs to send the transmission data to the core network node, the UE may obtain the public key for encryption, the $GPK_{enc}$, and the $SK_{UE\_ID\_enc}$ from the first prestored data. Further, the UE may generate the symmetric key (set to the K3) based on the public key for encryption, the $GPK_{enc}$, and the $SK_{UE\_ID\_enc}$, and input the transmission data and the K3 into a system function to obtain a message authentication code (set to a fourth message authentication code MAC 3). It should be noted that the system function described in this embodiment of the present invention may be specifically a hash function, or may be another system function that can implement generation of the message authentication code, and may be determined based on an actual application scenario. No limitation is imposed herein.

In a specific implementation, after the UE generates the K3 based on the public key for encryption, the $GPK_{enc}$, and the $SK_{UE\_ID\_enc}$, the UE may encrypt the transmission data, identification information such as the UE_ID of the UE, and the foregoing generated MAC 3 by using the public key for encryption and the $GPK_{enc}$, to obtain the protection message. Further, the UE may add, to the protection message, indication information indicating a protection manner of the transmission data. The indication information is used to indicate that the protection manner of the transmission data is encrypting the transmission data, the UE_ID, and the MAC 3 by using the public key for encryption and the $GPK_{enc}$.

In a specific implementation, after the UE obtains the protection message by encrypting the transmission data, the UE may send the protection message to the access point. The access point may send the protection message to the core network node. The protection message may include an indicator, and the indicator is used to transmit the foregoing indication information to notify the access point of the protection manner of the transmission data.

In some feasible implementations, after receiving the protection message, the core network node may first determine the protection manner of the transmission data based on the protection message, and then obtain related data from the second prestored data based on the protection manner to parse the transmission data. The protection manner of the transmission data is encrypting the transmission data, the UE_ID, and the MAC 3 by using the public key for encryption and the $GPK_{enc}$. The core network node may determine, based on the indication message indicating the protection manner, that the protection manner of the transmission data is encrypting the transmission data, the UE_ID, and the MAC 3 by using the public key for encryption and the $GPK_{enc}$, then obtain the $GPK_{enc}$ and the $SK_{CP\_ID\_enc}$ from the second prestored data, and decrypt the protection message by using the $SK_{CP\_ID\_enc}$ and the $GPK_{enc}$, to obtain a decrypted message. Further, the core network node may obtain, from the decrypted message, the MAC 3, the UE_ID, and the transmission data that are carried in the protection message, and generate a symmetric key K4 by using the public key for encryption, the UE_ID, the $GPK_{enc}$, and the $SK_{CP\_ID\_enc}$. After the core network node generates the K4, the core network node may calculate a message authentication code (set to a fifth message authentication code MAC 4) by using the K4, the UE_ID, and the transmission data obtained through decryption. If the MAC 4 matches the MAC 3 carried in the protection message, the core network node may send, to a related network element in the core network, the transmission data sent by the UE that is carried in the protection message.

It should be noted that, in this embodiment of the present invention, in a same application scenario, the public key for encryption used by the UE for data encryption is the same as the public key for encryption used by the core network node for data decryption or authentication, so that encrypted data can be correctly decrypted by a receiver. The public key for encryption is transmitted from the core network to the UE in a manner such as KMS delivery, and the transmission data sender uses the public key provided by the transmission data receiver to protect data, so as to avoid information leakage caused by carrying information such as a data encryption key during data transmission and improve network security.

In this embodiment of the present invention, when the UE sends uplink data to the core network node, the UE may use information such as the identity of the core network node as the public key for encryption, and encrypt the to-be-uploaded transmission data by using the global public key in the IBC technology and the private key corresponding to the core network node, so as to effectively protect air interface signaling and data in a 5G network and avoid leakage of user privacy and signaling content. The core network node decrypts, signs, and attempts to authenticate, by using a message authentication code, the message sent by the UE, to filter out invalid signaling and data and protect security of the core network.

Figure 11:
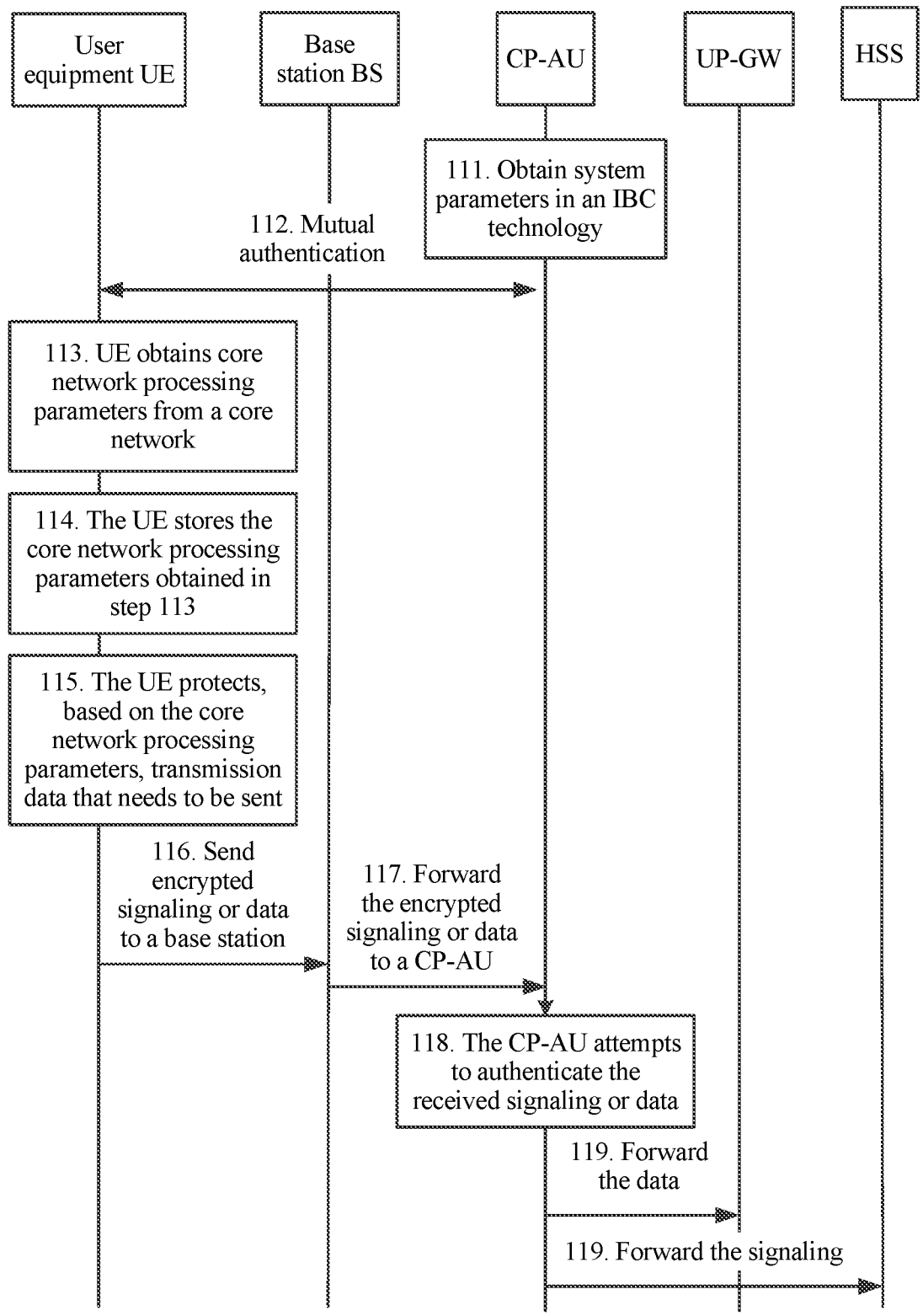
FIG. 11 is a schematic interaction diagram of a protection system in scenario 5 according to an embodiment of the present invention.

FIG. 11 is a schematic interaction diagram of a protection system in scenario 5 according to an embodiment of the present invention. The following describes a data interaction process, in scenario 5, of data transmit ends in the transmission data protection system according to this embodiment of the present invention with reference to FIG. 11. The foregoing core network node may be specifically a CP-AU, and a corresponding public key for encryption is a CP_AU_ID or includes a CP_AU_ID.

In this application scenario, UE and the CP-AU use an IBC-based technology to encrypt signaling and data from the UE to a core network. A specific procedure includes the following steps.

111. The CP-AU obtains IBC-based system parameters.

In a specific implementation, the CP-AU may obtain the system parameters from a KMS. The system parameters include the CP_AU_ID, a $GPK_{enc}$, a $GPK_{sig}$, an $SK_{CP\_AU\_ID\_enc}$, an $SK_{CP\_AU\_ID\_sig}$, and the like. After obtaining the system parameters, the CP-AU may store the system parameters as prestored data of the CP-AU.

112. The UE and the CP-AU complete mutual authentication.

After the authentication between the UE and CP-AU is completed, the UE notifies the CP-AU that the UE supports an IBC-based encryption capability.

113. The UE obtains core network processing parameters from the core network.

The core network processing parameters include the CP_AU_ID, the $GPK_{sig}$, and the $GPK_{enc}$, or further include a UE_ID, an $SK_{UE\_ID\_enc}$, and an $SK_{UE\_ID\_sig}$.

114. The UE stores the core network processing parameters obtained in step 113.

Further, the UE may store the core network processing parameters as prestored data of the UE.

115. The UE protects, based on the core network processing parameters, transmission data that needs to be sent.

In a specific implementation, the UE receives signaling or data that an application needs to send, and obtains parameters such as the CP_AU_ID, the $GPK_{sig}$, and the $GPK_{enc}$ from the first prestored data; the UE uses the $GPK_{sig}$ and the $SK_{UE\_ID\_sig}$ to sign the signaling or data; and the UE may further use the CP_AU_ID and the $GPK_{enc}$ to encrypt the data or signaling to obtain a protection message.

116. The UE sends encrypted signaling or data to a base station.

117. The base station forwards the encrypted signaling or data to the CP-AU.

118. The CP-AU attempts to authenticate the received signaling or data.

The CP-AU uses the $GPK_{enc}$ and the $SK_{SP\_AU\_ID\_enc}$ to decrypt the data or signaling. Further, the CP-AU may use the UE_ID and the $GPK_{sig}$ to attempt to authenticate a signature carried in the protection message. In a specific implementation, for a specific implementation in which the CP-AU decrypts the encrypted data in the protection message and attempts to authenticate the signature in the protection message, refer to the implementations described in the steps in the foregoing application scenarios. Details are not described herein again.

119. The CP-AU forwards the data.

In a specific implementation, after the CP-AU decrypts and authenticates the protection message, if it is determined that the received message is a user plane data packet, the CP-AU may forward the data to a corresponding core network data gateway (such as a UP_GW) based on address information included in the decrypted data packet. If it is determined that the received message is a signaling message, the CP-AU may process the signaling message by the CP-AU based on information included in the decrypted data packet or send signaling to a corresponding core network node (such as an HSS) based on information included in the decrypted data packet.

In a specific implementation, for more detailed implementations of the foregoing steps, refer to the related description of each step in the foregoing S901 to S904, and details are not described herein again.

Figure 12:
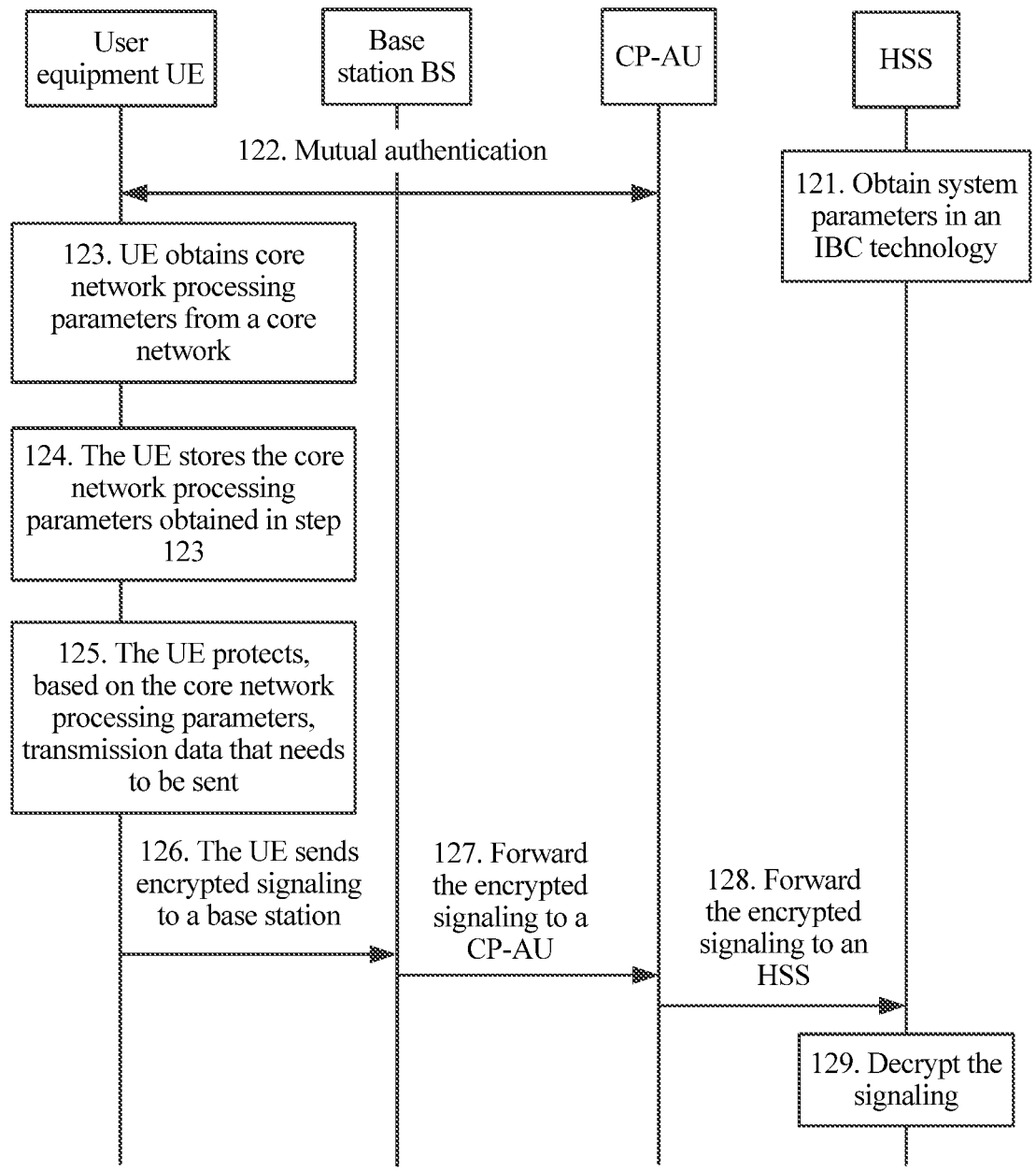
FIG. 12 is another schematic interaction diagram of a protection system in scenario 5 according to an embodiment of the present invention.

FIG. 12 is another schematic interaction diagram of a protection system in scenario 5 according to an embodiment of the present invention. The following describes a data interaction process, in scenario 5, of data transmit ends in the transmission data protection system according to this embodiment of the present invention with reference to FIG. 12. The foregoing core network node may be specifically an HSS, and a corresponding public key for encryption is an HSS_ID or includes an HSS_ID.

In this application scenario, UE and the HSS use an IBC-based technology to encrypt signaling and data from the UE to a core network. A specific procedure includes the following steps.

121. The HSS obtains IBC-based system parameters.

In a specific implementation, the HSS may obtain system parameters from a KMS. The system parameters may include the HSS_ID, a $GPK_{enc}$, a $GPK_{sig}$, an $SK_{HSS\_ID\_enc}$, and an $SK_{HSS\_ID\_sig}$. The HSS may store the system parameters as prestored data of the HSS.

122. The UE and a CP-AU complete mutual authentication.

In a specific implementation, after the mutual authentication between the UE and the CP-AU is completed, the UE may further notify the CP-AU that the UE supports a capability such as IBC-based encryption or authentication.

123. The UE obtains core network processing parameters from the core network.

The core network processing parameters may include the HSS_ID, the $GPK_{sig}$, the $GPK_{enc}$, and the like.

124. The UE stores the core network processing parameters obtained in step 123.

Further, the UE may store the obtained core network processing parameters as prestored data of the UE.

125. The UE protects, based on the core network processing parameters, transmission data that needs to be sent.

In a specific implementation, when receiving signaling (such as an attach message) that an application needs to send, the UE may obtain parameters such as the HSS_ID, the $GPK_{sig}$, and the $GPK_{enc}$ from the first prestored data, and encrypt the signaling by using the HSS_ID and the $GPK_{enc}$ to obtain a protection message.

126. The UE sends encrypted signaling to a base station. The encrypted signaling carries the HSS_ID.

127. The base station forwards the encrypted signaling to the CP-AU.

128. The CP-AU forwards the encrypted signaling to the HSS.

129. The HSS decrypts the signaling.

In a specific implementation, the HSS decrypts the signaling by using parameters such as the HSS_ID, the $GPK_{enc}$, and the $SK_{HSS\_ID\_enc}$, and performs subsequent signaling interaction with the UE.

In a specific implementation, for more detailed implementations of the foregoing steps, refer to the related description of each step in the foregoing S901 to S904, and details are not described herein again.

Figure 13:
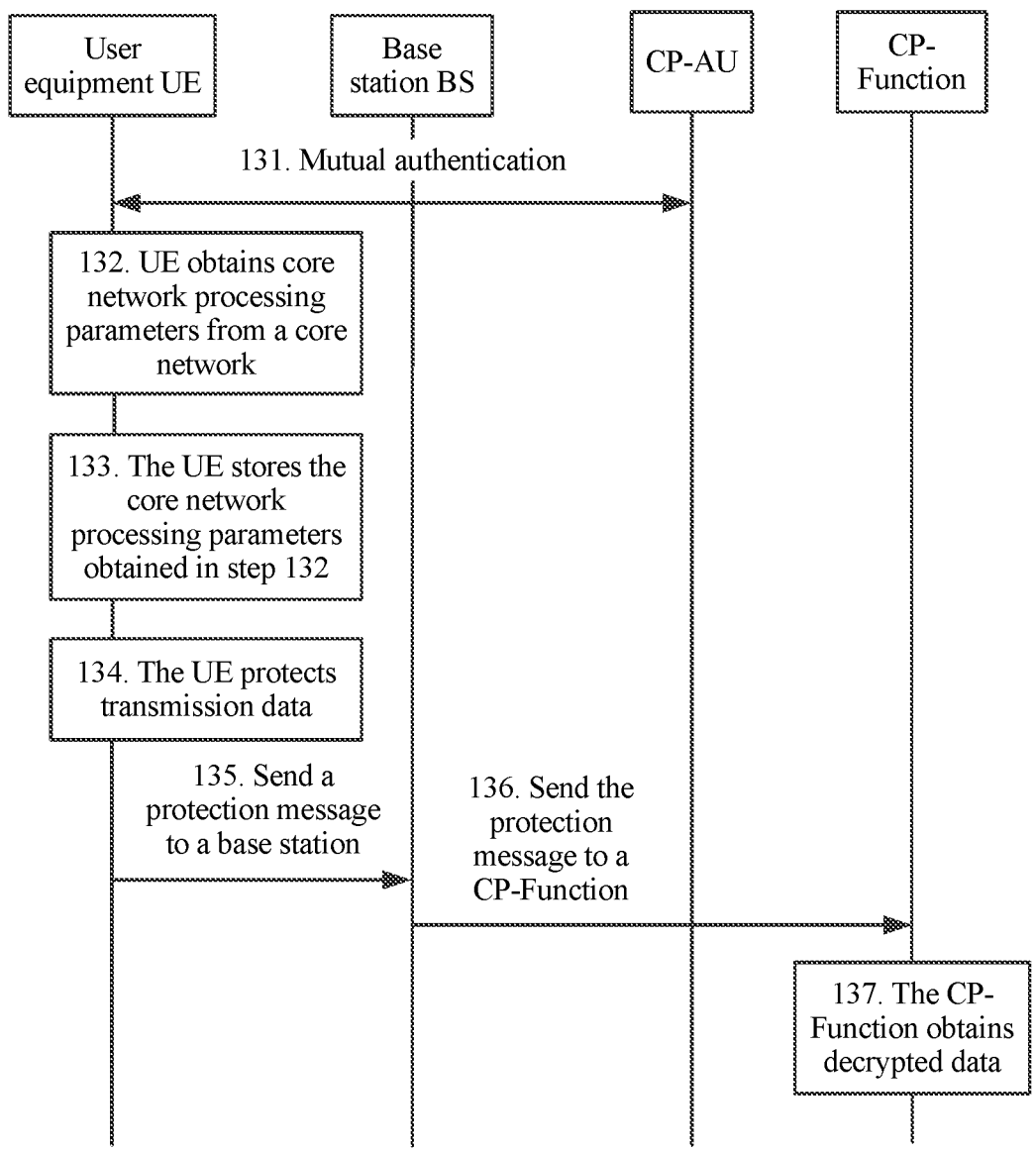
FIG. 13 is another schematic interaction diagram of a protection system in scenario 5 according to an embodiment of the present invention.

FIG. 13 is another schematic interaction diagram of a protection system in scenario 5 according to an embodiment of the present invention. The following describes a data interaction process, in scenario 5, of data transmit ends in the transmission data protection system according to this embodiment of the present invention with reference to FIG. 13. The foregoing core network node may be specifically a CP-AU and a CP-Function, and a corresponding public key for encryption is a CP_AU_ID or includes a CP_AU_ID.

In this application scenario, UE and the CP-AU use an IBC-based technology to encrypt signaling and data from the UE to a core network. A specific procedure includes the following steps.

131. The UE and the CP-AU perform mutual authentication.

In a specific implementation, after the mutual authentication between the UE and the CP-AU succeeds, the UE may notify the CP-AU that the UE supports a capability such as IBC-based encryption and authentication.

132. The UE obtains core network processing parameters from the core network.

In a specific implementation, the core network processing parameters may include the CP_AU_ID, a $GPK_{sig}$, a $GPK_{enc}$, an $SK_{UE\_ID}$, and the like.

133. The UE stores the core network processing parameters obtained in step 132.

In a specific implementation, the UE may store the obtained core network processing parameters as prestored data of the UE.

134. The UE protects transmission data.

In a specific implementation, after receiving the transmission data that an application needs to send, the UE may obtain parameters such as the CP_AU_ID, the $GPK_{sig}$, and the $GPK_{enc}$ from the prestored data of the UE, and the UE generates a symmetric key K3 by using parameters such as the CP_AU_ID, the $SK_{UE\_ID}$, the $GPK_{sig}$, and the $GPK_{enc}$, encrypts the data by using the K3, and provides a message authentication code MAC 3 to obtain a protection message.

135. The UE sends a protection message to a base station. The protection message carries a UE_ID, the transmission data, the MAC 3, and the like, and the UE_ID may be specifically a globally unique temporary UE identity (GUTI).

136. The base station forwards the data to the CP-Function in the core network.

The CP-Function is a node, in the core network, that specializes in processing small data.

137. The CP-Function obtains decrypted data.

The CP-Function may obtain the UE_ID by using the GUTI, and generate a symmetric key K4 by using the UE_ID, an $SK_{CP\_AU\_ID}$, and the $GPK_{enc}$ or the $GPK_{sig}$. Further, authentication may be performed on the MAC 3 included in the message based on the K4, the UE_ID, and the protection message, and the transmission data is obtained.

In a specific implementation, for more detailed implementations of the foregoing steps, refer to the related description of each step in the foregoing S901 to S904, and details are not described herein again.

Figure 14:
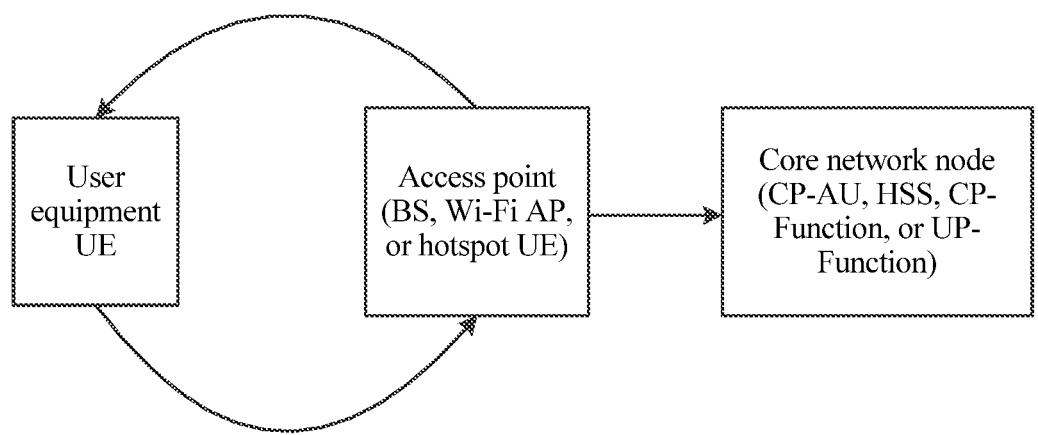
FIG. 14 is another transmission architecture diagram of data transmission according to an embodiment of the present invention.

FIG. 14 is another transmission architecture diagram of data transmission according to an embodiment of the present invention. The transmission architecture shown in FIG. 14 may include data transmit ends such as UE, an access point, and a core network node. The access point may include a base station (BS), an access point (AP) in a Wi-Fi, or hotspot UE serving as a network hotspot. The foregoing BS may be a NodeB (NB) in a 3G network, an evolved NodeB (eNB) in a 4G network, or a base station in an earlier network era. No limitation is imposed herein. The BS is used as an example in this embodiment of the present invention for description.

The foregoing core network node may include a core network authentication node CP-AU, an HSS, a CP-Function, a UP-Function, or the like.

Figure 15:
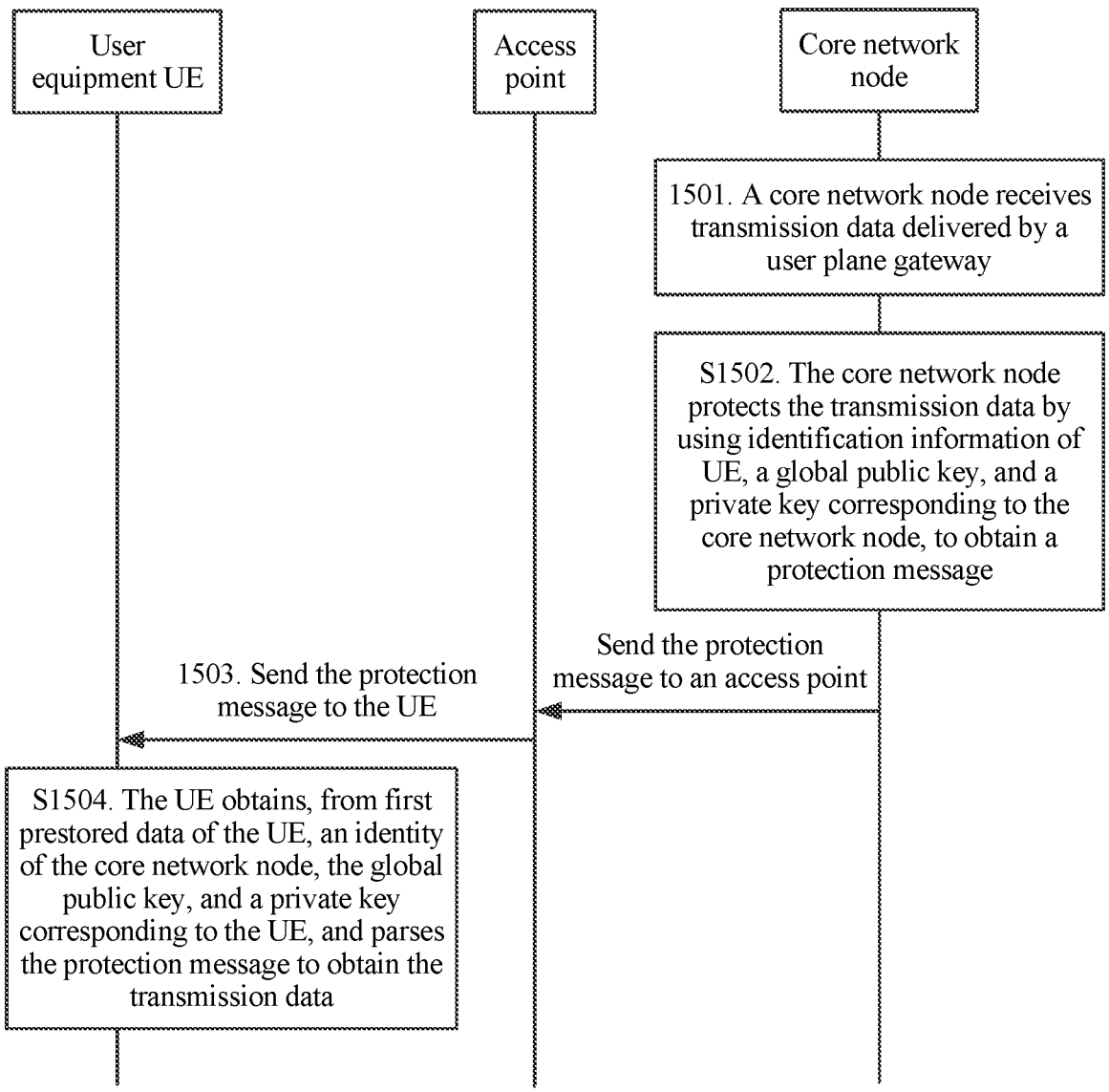
FIG. 15 is a schematic interaction diagram of downlink data transmission performed in a transmission data protection system according to an embodiment of the present invention.

FIG. 15 is a schematic interaction diagram of downlink data transmission performed in a transmission data protection system according to an embodiment of the present invention. A process in which data transmit ends in the protection system according to this embodiment of the present invention perform data transmission may include the following steps.

S1501. A core network node receives transmission data delivered by a user plane gateway.

Further, the core network node may obtain, from second prestored data of the core network node, data such as identification information of UE, a global public key in an identity based cryptography IBC technology, and a private key corresponding to the core network node.

S1502. The core network node protects the transmission data by using identification information of UE, a global public key, and a private key corresponding to the core network node, to obtain a protection message, and sends the protection message to an access point.

S1503. The access point sends the protection message to the UE.

S1504. The UE obtains, from first prestored data of the UE, an identity of the core network node, the global public key, and a private key corresponding to the UE, and parses the protection message to obtain the transmission data.

In some feasible implementations, the global public key includes a first global public key and a second global public key, and the private key corresponding to the core network node includes a fifth private key and a sixth private key. The core network node may obtain core network system parameters from a network or a KMS, and store the core network system parameters as the second prestored data of the core network access point. The core network system parameters include a public key for encryption and at least one of the following two groups of data, including the first global public key and the fifth private key, or the second global public key and the sixth private key. The first global public key is a $GPK_{enc}$; the fifth private key is a private key $SK_{CP\_ID\_enc}$ for data encryption corresponding to the core network node in the IBC technology; the second global public key is a global public key $GPK_{Sig}$ for data signature in the IBC technology; and the sixth private key is a private key $SK_{CP\_ID\_Sig}$ for data signature corresponding to the core network node in the IBC technology.

In a specific implementation, the UE may obtain the identification information of the UE and core network processing parameters from a core network, and store the identification information and the core network processing parameters as the first prestored data of the UE. The core network processing parameters include the $GPK_{enc}$, an $SK_{UE\_ID\_enc}$, the $GPK_{Sig}$, an $SK_{UE\_ID\_Sig}$, and the like. For definitions of the foregoing parameters, refer to the implementations described in the steps in the foregoing application scenarios. Details are not described herein again.

In some feasible implementations, the core network node may receive downlink transmission data (transmission data for short) sent by the user plane gateway, obtain parameters such as the identification information (such as a UE_ID) of the UE, the $GPK_{enc}$, and the $SK_{CP\_ID\_enc}$ from the second prestored data after receiving the transmission data, generate a symmetric key K5 based on the identification information of the UE, the $GPK_{enc}$, and the $SK_{CP\_ID\_enc}$, and then input the transmission data and the K5 into a system function to obtain a sixth message authentication code MAC 5. Further, the core network node may encrypt the transmission data and the MAC 5 by using the K5, to obtain the protection message.

The core network node sends the protection message to a base station, and the base station sends the protection message to the UE. After receiving the message, the UE may determine, based on information carried in the protection message, that the message is sent to the UE, and then decrypt the message.

In a specific implementation, when the UE decrypts the message, the UE may obtain the $GPK_{enc}$ and the $SK_{UE\_ID\_enc}$ from the first prestored data of the UE, and decrypt the protection message by using the $GPK_{enc}$ and the $SK_{UE\_ID\_enc}$, to obtain a decrypted message. Further, the UE may generate a symmetric key K6 by using the identification information of the UE, the $GPK_{enc}$, and the $SK_{UE\_ID\_enc}$, generate a seventh message authentication code MAC 6 by using the K6, the identification information of the UE, and the decrypted message, and obtain the transmission data when the MAC 6 matches the MAC 5 carried in the decrypted message.

In this embodiment of the present invention, the UE and the core network node may use the IBC-based technology to encrypt and protect, through authentication, the downlink data, thereby improving security of the network transmission data. In a specific implementation, for a specific manner in which the UE and the core network node encrypt and protect, through authentication, the downlink data, refer to the foregoing implementation in which the UE and the access point or the core network node encrypt and protect, through authentication, the uplink data in uplink data transmission. Details are not described herein again.

Figure 16:
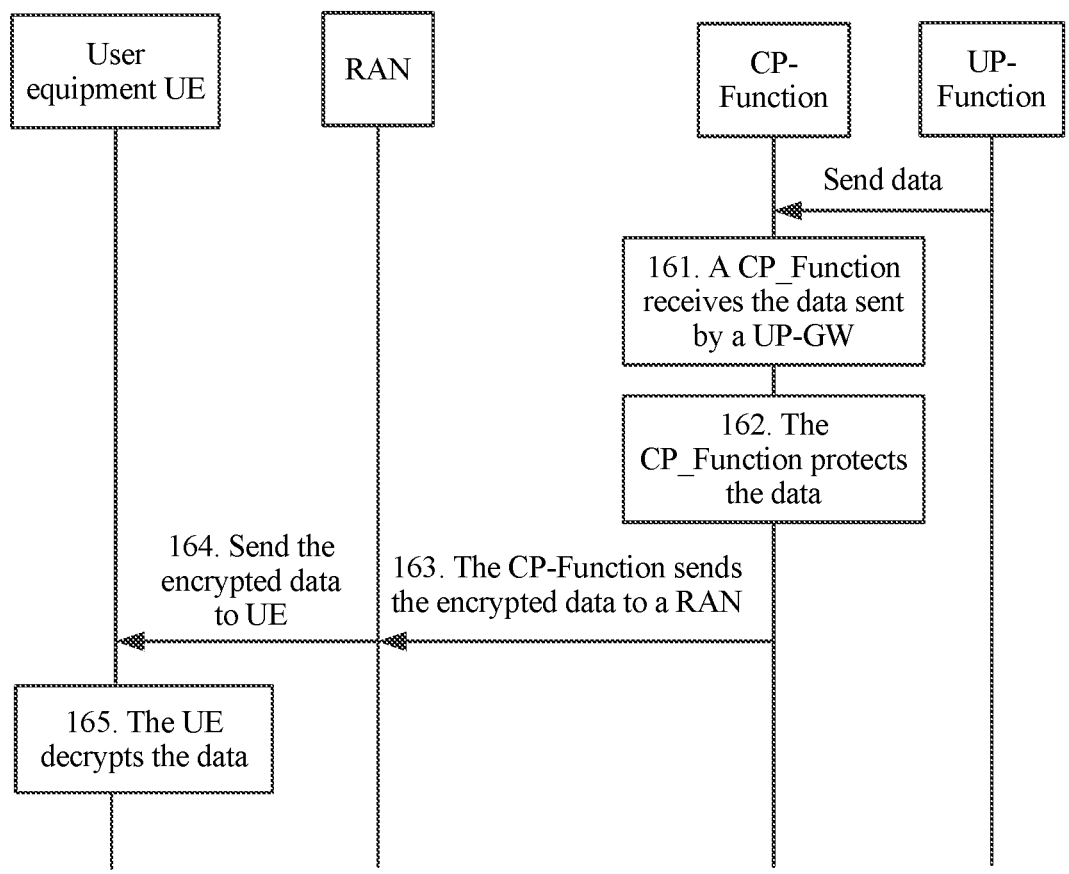
FIG. 16 is a schematic interaction diagram of a protection system in scenario 6 according to an embodiment of the present invention.

FIG. 16 is a schematic interaction diagram of a protection system in scenario 6 according to an embodiment of the present invention. The following describes a data interaction process, in scenario 6, of data transmit ends in the transmission data protection system according to this embodiment of the present invention with reference to FIG. 16. The foregoing core network node may be specifically a UP-GW, a UP-Function, and a CP-Function, and a corresponding public key for encryption is a CP_Function_ID (CP_ID for short) or includes a CP_Function_ID.

In this application scenario, UE and the CP-Function use an IBC-based technology to encrypt signaling and data from a core network to the UE. A specific procedure includes the following steps.

161. The core network node CP_Function receives data sent by the UP-GW.

162. The CP_Function protects the data.

In a specific implementation, the CP_Function may generate a symmetric key K5 by using a UE_ID, an $SK_{IP}$ ID, and a $GPK_{enc}$, encrypt the data by using the symmetric key K5, and generate a message authentication code MAC 5 based on the transmission data and the K5, so as to provide integrity protection for the encrypted data.

163. The CP-Function sends the encrypted data to a RAN.

The data sent by the CP-Function to the RAN includes a GUTI of the UE, the encrypted data, and the MAC 5.

164. The RAN sends the data to the UE.

The data sent by the RAN to the UE includes the GUTI, the encrypted data, and the MAC 5.

165. The UE decrypts the data.

In a specific implementation, the UE may determine, based on the GUTI, that the message is the UE, and obtain the UE_ID from prestored data of the UE, generate a symmetric key K6 by using the CP_ID, an $SK_{UE\_ID}$, and the $GPK_{enc}$, and use the K6 to attempt to authenticate a signature and decrypt the data.

In a specific implementation, for more detailed implementations of the foregoing steps, refer to the related description of each step in the foregoing S1501 to S1504, and details are not described herein again.

Figure 17:
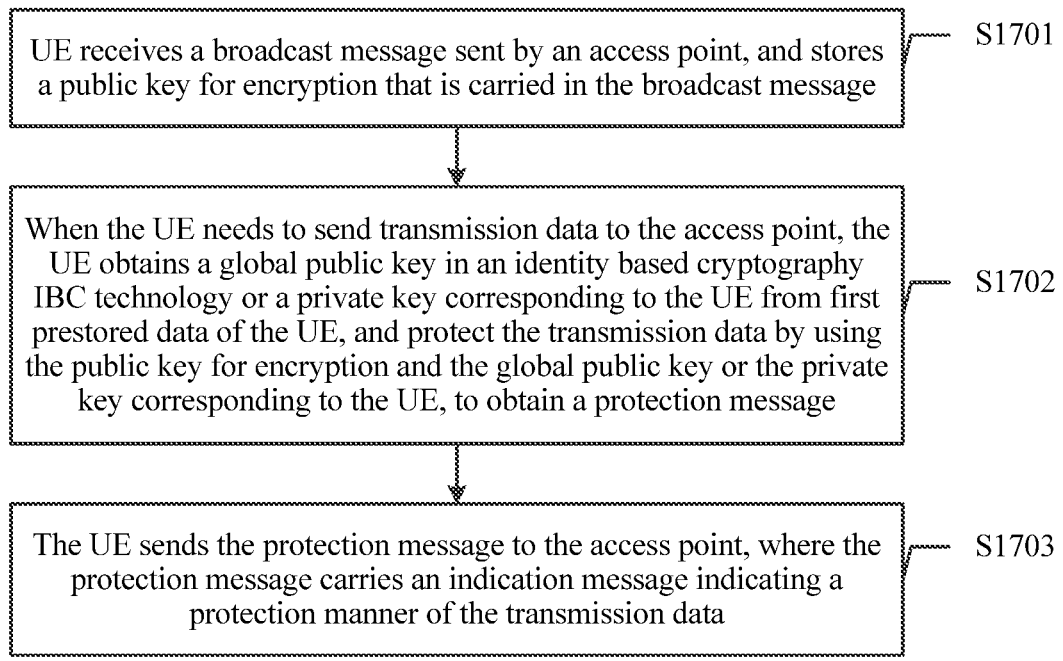
FIG. 17 is a schematic flowchart of a transmission data protection method according to an embodiment of the present invention.

FIG. 17 is a schematic flowchart of a transmission data protection method according to an embodiment of the present invention. The method provided in this embodiment of the present invention includes the following steps.

S1701. UE receives a broadcast message sent by an access point, and stores a public key for encryption that is carried in the broadcast message.

S1702. When the UE needs to send transmission data to the access point, the UE obtains a global public key in an identity based cryptography IBC technology or a private key corresponding to the UE from first prestored data of the UE, and protects the transmission data by using the public key for encryption and the global public key or the private key corresponding to the UE, to obtain a protection message.

S1703. The UE sends the protection message to the access point, where the protection message carries an indication message indicating a protection manner of the transmission data.

In some feasible implementations, the global public key includes a first global public key and a second global public key, and the private key corresponding to the UE includes a third private key and a fourth private key, and before the UE receives the broadcast message of the access point, the method further includes obtaining, by the UE from a network or a KMS, processing parameters used by the UE to process the transmission data, and storing the processing parameters as the first prestored data of the UE, where the processing parameters include an identity (operator ID1) of an operator to which the UE belongs, and at least one of the following three groups of data, including the first global public key, or the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

In some feasible implementations, the first prestored data includes the operator ID1 and the $GPK_{Sig}$, and before the UE stores the public key for encryption that is carried in the broadcast message, the method further includes determining, by the UE based on indication information carried in the received broadcast message, that the access point has a data signature function, and determining, based on identification information of the access point corresponding to the broadcast message, an identity (operator ID2) of an operator to which the access point belongs, matching the operator ID2 with the operator ID1, and searching the first prestored data for a third global public key $GPK_{Sig}1$ corresponding to the access point, when the broadcast message carries a signature Sig1, attempting to authenticate the broadcast message by using the $GPK_{Sig}1$ and the identification information of the access point, and when the broadcast message has been authenticated, determining to add, to the first prestored data, the public key for encryption that is carried in the broadcast message.

In some feasible implementations, the first prestored data includes the $GPK_{enc}$, and that when the UE needs to send transmission data to the access point, the UE obtains a global public key in an identity based cryptography IBC technology from first prestored data of the UE, and protects the transmission data by using the public key for encryption and the global public key includes when the UE needs to send the transmission data to the access point, obtaining, by the UE, the public key for encryption and the $GPK_{enc}$ from the first prestored data, and encrypting the transmission data by using the public key for encryption and the $GPK_{enc}$, to obtain the protection message, where the protection manner of the transmission data is encrypting the transmission data by using the public key for encryption and the $GPK_{enc}$.

In some feasible implementations, the first prestored data includes the $GPK_{enc}$ and the $SK_{UE\_ID\_enc}$, and that when the UE needs to send transmission data to the access point, the UE obtains a global public key in an identity based cryptography IBC technology or a private key corresponding to the UE from first prestored data of the UE, and protects the transmission data by using the public key for encryption and the global public key or the private key corresponding to the UE includes when the UE needs to send the transmission data to the access point, obtaining, by the UE, the public key for encryption, the $GPK_{enc}$, and the $SK_{UE\_ID\_enc}$ from the first prestored data, generating a first symmetric key K1 based on the public key for encryption, the $GPK_{enc}$, and the $SK_{UE\_ID\_enc}$, and inputting the transmission data and the K1 into a system function to obtain a third message authentication code MAC 2, and encrypting the transmission data, identification information of the UE, and the MAC 2 by using the public key for encryption and the $GPK_{enc}$, to obtain the protection message, where the protection manner of the transmission data is encrypting the transmission data, the identification information of the UE, and the MAC 2 by using the public key for encryption and the $GPK_{enc}$.

In some feasible implementations, the first prestored data includes the $GPK_{enc}$ and the $SK_{UE\_ID\_Sig}$, and that when the UE needs to send transmission data to the access point, the UE obtains a global public key in an identity based cryptography IBC technology or a private key corresponding to the UE from first prestored data of the UE, and protects the transmission data by using the public key for encryption and the global public key or the private key corresponding to the UE, to obtain a protection message includes when the UE needs to send the transmission data to the access point, obtaining, by the UE, the public key for encryption, the $GPK_{enc}$, the $GPK_{sig}$, and the $SK_{UE\_ID\_Sig}$ from the first prestored data, and signing the transmission data based on the $GPK_{sig}$ and the $SK_{UE\_ID\_Sig}$ to obtain a signature Sig2, and encrypting the transmission data, identification information of the UE, and the Sig2 by using the public key for encryption and the $GPK_{enc}$, to obtain the protection message, where the protection manner of the transmission data is encrypting the transmission data and the Sig2 by using the public key for encryption and the $GPK_{enc}$.

In a specific implementation, for implementations described in the steps of the transmission data protection method provided in this embodiment of the present invention, refer to related descriptions in the foregoing systems. Details are not described herein again.

Figure 18:
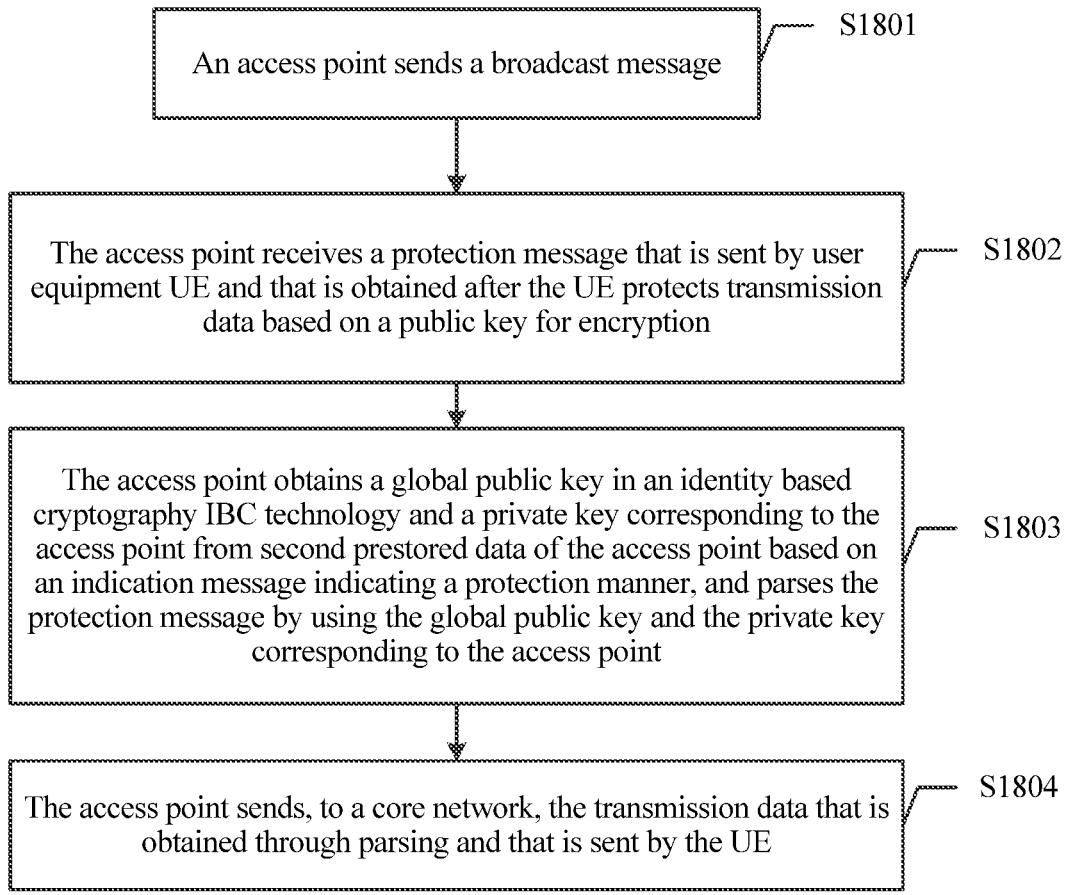
FIG. 18 is another schematic flowchart of a transmission data protection method according to an embodiment of the present invention.

FIG. 18 is another schematic flowchart of a transmission data protection method according to an embodiment of the present invention. The method provided in this embodiment of the present invention includes the following steps.

S1801. An access point sends a broadcast message.

The broadcast message carries a public key for encryption.

S1802. The access point receives a protection message that is sent by user equipment UE and that is obtained after the UE protects transmission data based on a public key for encryption.

The protection message carries an indication message indicating a protection manner of the transmission data.

S1803. The access point obtains a global public key in an identity based cryptography IBC technology and a private key corresponding to the access point from second prestored data of the access point based on the indication message indicating the protection manner, and parses the protection message by using the global public key and the private key corresponding to the access point, to obtain the transmission data sent by the UE.

S1804. The access point sends, to a core network, the transmission data that is obtained through parsing and that is sent by the UE.

In some feasible implementations, the global public key includes a first global public key and a second global public key, and the private key corresponding to the access point includes a first private key and a second private key, and before the access point sends the broadcast message, the method further includes obtaining, by the access point, system parameters from a network or a key management system KMS, and storing the system parameters as the second prestored data of the access point, where the system parameters include the public key for encryption and at least one of the following two groups of data, including the first global public key and the first private key, or the second global public key and the second private key, where the first global public key is a global public key $GPK_{enc}$ for data encryption in the IBC technology, the first private key is a private key $SK_{BS\_ID\_enc}$ for data encryption corresponding to the access point in the IBC technology, the second global public key is a global public key $GPK_{Sig}$ for data signature in the IBC technology, and the second private key is a private key $SK_{BS\_ID\_Sig}$ for data signature corresponding to the access point in the IBC technology.

In some feasible implementations, the public key for encryption is a base station BS identity BS_ID, or the public key for encryption includes a BS_ID, or the public key for encryption includes a media access control MAC address of a Wireless Fidelity Wi-Fi access point AP or a service set identifier SSID of a Wi-Fi AP, or the public key for encryption includes a hotspot UE identity UE_ID or an international mobile subscriber identity IMSI of hotspot UE.

In some feasible implementations, the second prestored data includes the $GPK_{Sig}$ and the $SK_{BS\_ID\_Sig}$, and before the access point sends the broadcast message, the method further includes signing, by the access point, the broadcast message by using the $GPK_{Sig}$ and the $SK_{BS\_ID\_Sig}$, to obtain a signature Sig1 of the broadcast message, and adding indication information indicating that the access point has a data signature function or the signature Sig1 of the broadcast message to the broadcast message.

In some feasible implementations, the second prestored data includes the $GPK_{enc}$, the $SK_{BS\_ID\_enc}$, the $GPK_{Sig}$, and the $SK_{BS\_ID\_Sig}$, and that the access point obtains a global public key in an identity based cryptography IBC technology and a private key corresponding to the access point from second prestored data of the access point based on the indication message indicating the protection manner, and parses the protection message by using the global public key and the private key corresponding to the access point includes determining, by the access point, the protection manner of the transmission data based on the indication message indicating the protection manner, obtaining the $SK_{BS\_ID\_enc}$ and the $GPK_{enc}$ from the second prestored data, and decrypting the protection message by using the $SK_{BS\_ID\_enc}$ and the $GPK_{enc}$, to obtain a decrypted message.

In some feasible implementations, the second prestored data includes the public key for encryption, the $GPK_{enc}$, and the $SK_{BS\_ID\_enc}$, and that the access point obtains a global public key in an identity based cryptography IBC technology and a private key corresponding to the access point from second prestored data of the access point based on the indication message indicating the protection manner, and parses the protection message by using the global public key and the private key corresponding to the access point includes determining, by the access point, the protection manner of the transmission data based on the indication message indicating the protection manner, obtaining the $GPK_{enc}$ and the $SK_{BS\_ID\_enc}$ from the second prestored data, and decrypting the protection message by using the $SK_{BS\_ID\_enc}$ and the $GPK_{enc}$, to obtain a decrypted message, and that the access point sends, to a core network, the transmission data that is obtained through parsing and that is sent by the UE includes obtaining, by the access point, a third message authentication code MAC 2, identification information of the UE, and the transmission data that are carried in the protection message from the decrypted message, generating a symmetric key K2 by using the identification information of the UE, the $GPK_{enc}$, and the $SK_{BS\_ID\_enc}$, and calculating a fourth message authentication code MAC 3 by using the symmetric key K2, the identification information of the UE, and the transmission data obtained through decryption, and when the MAC 3 matches the MAC 2, sending, to the core network, the transmission data sent by the UE.

In some feasible implementations, the second prestored data includes the $GPK_{enc}$, the $SK_{BS\_ID\_enc}$, and the $GPK_{Sig}$, and that the access point obtains a global public key in an identity based cryptography IBC technology and a private key corresponding to the access point from second prestored data of the access point based on the indication message indicating the protection manner, and parses the protection message by using the global public key and the private key corresponding to the access point includes determining the protection manner of the transmission data based on the indication message indicating the encryption manner, obtaining the $GPK_{enc}$ and the $SK_{BS\_ID\_enc}$ from the second prestored data, and decrypting the protection message by using the $SK_{BS\_ID\_enc}$ and the $GPK_{enc}$, to obtain the transmission data, and that the access point sends, to a core network, the transmission data that is obtained through parsing and that is sent by the UE includes obtaining identification information of the UE and the signature Sig2 from a decrypted message obtained by decrypting the protection message, determining the protection manner of the transmission data based on the indication message indicating the protection manner, and obtaining the $GPK_{sig}$ from the second prestored data, and attempting to authenticate the protection message by using the identification information of the UE and the $GPK_{sig}$, and when the protection message has been authenticated, sending, to the core network, the transmission data sent by the UE.

In a specific implementation, for implementations described in the steps of the transmission data protection method provided in this embodiment of the present invention, refer to related descriptions in the foregoing systems. Details are not described herein again.

Figure 19:
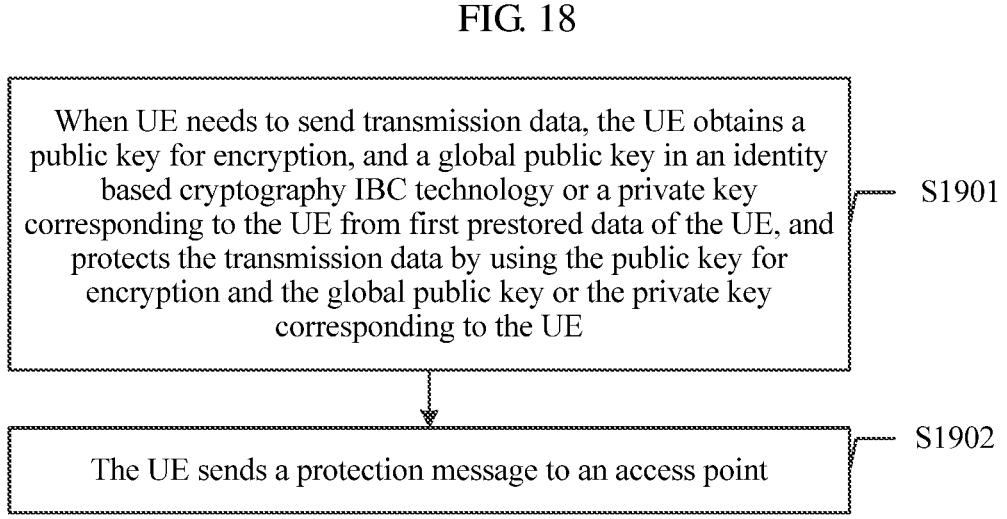
FIG. 19 is another schematic flowchart of a transmission data protection method according to an embodiment of the present invention.

FIG. 19 is another schematic flowchart of a transmission data protection method according to an embodiment of the present invention. The method provided in this embodiment of the present invention includes the following steps.

S1901. When user equipment UE needs to send transmission data, the UE obtains a public key for encryption, and a global public key in an identity based cryptography IBC technology or a private key corresponding to the UE from first prestored data of the UE, and protects the transmission data by using the public key for encryption and the global public key or the private key corresponding to the UE, to obtain a protection message.

S1902. The UE sends the protection message to an access point, so that the access point sends the protection message to a core network node.

The protection message carries an indication message indicating a protection manner of the transmission data.

In some feasible implementations, the global public key includes a first global public key and a second global public key, and the private key corresponding to the UE includes a third private key and a fourth private key, and before the UE sends the transmission data, the method further includes obtaining, by the UE from a core network, the public key for encryption and core network processing parameters used by the UE to process the transmission data, and storing the public key for encryption and the core network processing parameters as the first prestored data of the UE, where the core network processing parameters include at least one of the following three groups of data, including the first global public key, or the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

In some feasible implementations, the first prestored data includes the public key for encryption and the $GPK_{enc}$, and that the UE obtains a public key for encryption and a global public key in an identity based cryptography IBC technology from first prestored data of the UE, and protects the transmission data by using the public key for encryption and the global public key includes when the UE needs to send the transmission data to the access point, obtaining, by the UE, the public key for encryption and the $GPK_{enc}$ from the first prestored data, and encrypting the transmission data by using the public key for encryption and the $GPK_{enc}$, to obtain the protection message, where the protection manner of the transmission data is encrypting the transmission data by using the public key for encryption and the $GPK_{enc}$.

In some feasible implementations, the first prestored data includes the public key for encryption, the $GPK_{enc}$, and the $SK_{UE\_ID\_enc}$, and that the UE obtains a public key for encryption, and a global public key in an identity based cryptography IBC technology or a private key corresponding to the UE from first prestored data of the UE, and protects the transmission data by using the public key for encryption and the global public key or the private key corresponding to the UE includes when the UE needs to send the transmission data to the access point, obtaining, by the UE, the public key for encryption, the $GPK_{enc}$, and the $SK_{UE\_ID\_enc}$ from the first prestored data, generating a symmetric key K3 based on the public key for encryption, the $GPK_{enc}$, and the $SK_{UE\_ID\_enc}$, and inputting the transmission data and the K3 into a system function to obtain a fourth message authentication code MAC 3, and encrypting the transmission data and the MAC 3 by using the public key for encryption and the $GPK_{enc}$, to obtain the protection message, where the protection manner of the transmission data is encrypting the transmission data and the MAC 3 by using the public key for encryption and the $GPK_{enc}$.

In some feasible implementations, the first prestored data includes the public key for encryption, the $GPK_{enc}$, and the $SK_{UE\_ID\_Sig}$, and that the UE obtains a public key for encryption, and a global public key in an identity based cryptography IBC technology or a private key corresponding to the UE from first prestored data of the UE, and protects the transmission data by using the public key for encryption and the global public key or the private key corresponding to the UE includes when the UE needs to send the transmission data to the access point, obtaining, by the UE, the public key for encryption, the $GPK_{enc}$, the $GPK_{sig}$, and the $SK_{UE\_ID\_Sig}$ from the first prestored data, and signing the transmission data based on the $GPK_{sig}$ and the $SK_{UE\_ID\_Sig}$ to obtain a signature Sig3, and encrypting the transmission data and the signature Sig2 by using the public key for encryption and the $GPK_{enc}$, to obtain the protection message, where the protection manner of the transmission data is encrypting the transmission data and the signature by using the public key for encryption and the $GPK_{enc}$.

In a specific implementation, for implementations described in the steps of the transmission data protection method provided in this embodiment of the present invention, refer to related descriptions in the foregoing systems. Details are not described herein again.

Figure 20:
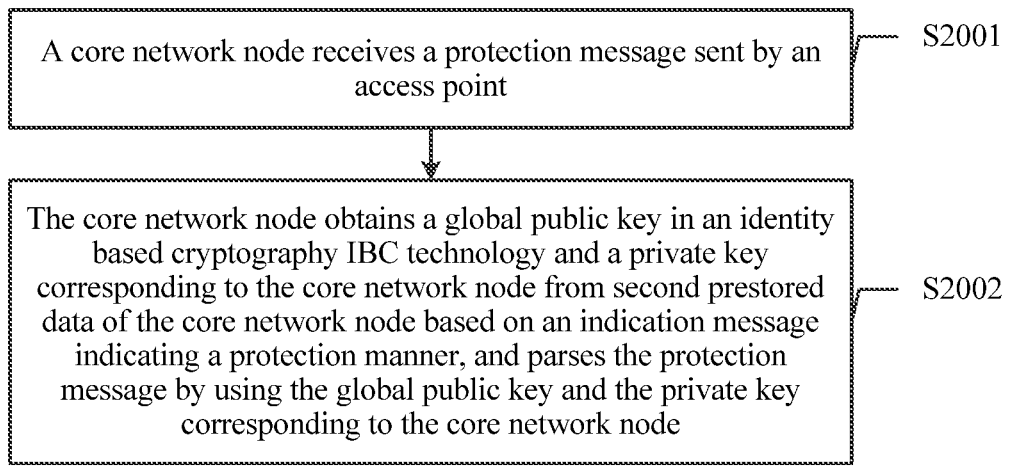
FIG. 20 is another schematic flowchart of a transmission data protection method according to an embodiment of the present invention.

FIG. 20 is another schematic flowchart of a transmission data protection method according to an embodiment of the present invention. The method provided in this embodiment of the present invention includes the following steps.

S2001. A core network node receives a protection message sent by an access point.

The protection message carries an indication message indicating a protection manner of the transmission data sent by user equipment UE.

S2002. The core network node obtains a global public key in an identity based cryptography IBC technology and a private key corresponding to the core network node from second prestored data of the core network node based on the indication message indicating the protection manner, and parses the protection message by using the global public key and the private key corresponding to the core network node, to obtain the transmission data sent by the UE.

In some feasible implementations, the global public key includes a first global public key and a second global public key, and the private key corresponding to the core network node includes a fifth private key and a sixth private key, and before the core network node receives the protection message sent by the access point, the method further includes obtaining, by the core network node, core network system parameters from a key management system KMS, and storing the core network system parameters as the second prestored data of the core network access point, where the core network system parameters include a public key for encryption and at least one of the following two groups of data, including the first global public key and the fifth private key, or the second global public key and the sixth private key, where the first global public key is a global public key $GPK_{enc}$ for data encryption in the IBC technology, the fifth private key is a private key $SK_{CP\_ID\_enc}$ for data encryption corresponding to the core network node in the IBC technology, the second global public key is a global public key $GPK_{Sig}$ for data signature in the IBC technology, and the sixth private key is a private key $SK_{CP\_ID\_Sig}$ for data signature corresponding to the core network node in the IBC technology.

In some feasible implementations, the public key for encryption is an identity of the core network authentication node, or the public key for encryption includes an identity of the core network node.

In some feasible implementations, the second prestored data includes the $GPK_{enc}$ and the $SK_{CP\_ID\_enc}$, and that the core network node obtains a global public key in an identity based cryptography IBC technology and a private key corresponding to the core network node from second prestored data of the core network node based on the indication message indicating the protection manner, and parses the protection message by using the global public key and the private key corresponding to the core network node includes determining, by the core network node, the protection manner of the transmission data based on the indication message indicating the protection manner, obtaining the $SK_{CP\_ID\_enc}$ and the $GPK_{enc}$ from the second prestored data, and decrypting the protection message by using the $SK_{CP\_ID\_enc}$ and the $GPK_{enc}$, to obtain the transmission data of the UE.

In some feasible implementations, the second prestored data includes the $GPK_{enc}$ and the $SK_{CP\_ID\_enc}$, and that the core network node obtains a global public key in an identity based cryptography IBC technology and a private key corresponding to the core network node from second prestored data of the core network node based on the indication message indicating the protection manner, and parses the protection message by using the global public key and the private key corresponding to the core network node includes determining, by the core network node, the protection manner of the transmission data based on the indication message indicating the protection manner, obtaining the $GPK_{enc}$ and the $SK_{CP\_ID\_enc}$ from the second prestored data, and decrypting the protection message to obtain a decrypted message, obtaining a fourth message authentication code MAC 3 carried in the decrypted message, and generating a symmetric key K4 by using identification information of the UE, the $GPK_{enc}$, and the $SK_{CP\_ID\_enc}$, and generating a fifth message authentication code MAC 4 by using the K4, the identification information of the UE, and the decrypted message, and obtaining the transmission data when the MAC 4 matches the MAC 3.

In some feasible implementations, the second prestored data includes the public key for encryption, the $GPK_{enc}$, the $SK_{CP\_ID\_enc}$, and the $GPK_{Sig}$, and that the core network node obtains a global public key in an identity based cryptography IBC technology and a private key corresponding to the core network node from second prestored data of the core network node based on the indication message indicating the protection manner, and parses the protection message by using the global public key and the private key corresponding to the core network node includes determining, by the core network node, the protection manner of the transmission data based on the indication message indicating the encryption manner, and decrypting the protection message by using the $GPK_{enc}$, the public key for encryption, and the $SK_{CP\_ID\_enc}$ that are obtained from the second prestored data, and obtaining the signature Sig3 from a decrypted message obtained by decrypting the protection message, attempting to authenticate the protection message by using identification information of the UE and the $GPK_{sig}$, and obtaining the transmission data when the protection message has been authenticated.

In a specific implementation, for implementations described in the steps of the transmission data protection method provided in this embodiment of the present invention, refer to related descriptions in the foregoing systems. Details are not described herein again.

Figure 21:
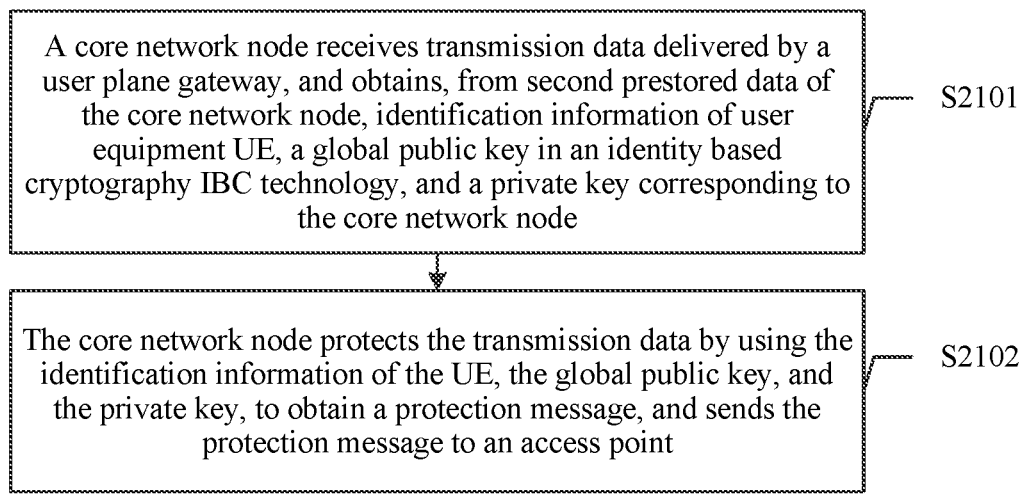
FIG. 21 is another schematic flowchart of a transmission data protection method according to an embodiment of the present invention.

FIG. 21 is another schematic flowchart of a transmission data protection method according to an embodiment of the present invention. The method provided in this embodiment of the present invention includes the following steps.

S2101. A core network node receives transmission data delivered by a user plane gateway, and obtains, from second prestored data of the core network node, identification information of user equipment UE, a global public key in an identity based cryptography IBC technology, and a private key corresponding to the core network node.

S2102. The core network node protects the transmission data by using the identification information of the UE, the global public key, and the private key, to obtain a protection message, and sends the protection message to an access point.

In some feasible implementations, the global public key includes a first global public key and a second global public key, and the private key corresponding to the core network node includes a fifth private key and a sixth private key, and before the core network node receives the transmission data delivered by the user plane gateway, the method further includes obtaining, by the core network node, core network system parameters from a network or a key management system KMS, and storing the core network system parameters as the second prestored data of the core network access point, where the core network system parameters include a public key for encryption and at least one of the following two groups of data, including the first global public key and the fifth private key, or the second global public key and the sixth private key, where the first global public key is a global public key $GPK_{enc}$ for data encryption in the IBC technology, the fifth private key is a private key $SK_{CP\_ID\_enc}$ for data encryption corresponding to the core network node in the IBC technology, the second global public key is a global public key $GPK_{Sig}$ for data signature in the IBC technology, and the sixth private key is a private key $SK_{CP\_ID\_Sig}$ for data signature corresponding to the core network node in the IBC technology.

In some feasible implementations, the second prestored data includes the $GPK_{enc}$ and the $SK_{CP\_ID\_enc}$, and that a core network node obtains, from second prestored data of the core network node, identification information of user equipment UE, a global public key in an identity based cryptography IBC technology, and a private key corresponding to the core network node includes obtaining, by the core network node, the identification information of the UE, the $GPK_{enc}$, and the $SK_{CP\_ID\_enc}$ from the second prestored data, and that the core network node protects the transmission data by using the identification information of the UE, the global public key, and the private key, to obtain a protection message includes generating, by the core network node, a symmetric key K5 based on the identification information of the UE, the $GPK_{enc}$, and the $SK_{CP\_ID\_enc}$, and inputting the transmission data and the K5 into a system function to obtain a sixth message authentication code MAC 5, and encrypting the transmission data by using the K5, to obtain the protection message.

In a specific implementation, for implementations described in the steps of the transmission data protection method provided in this embodiment of the present invention, refer to related descriptions in the foregoing systems. Details are not described herein again.

Figure 22:
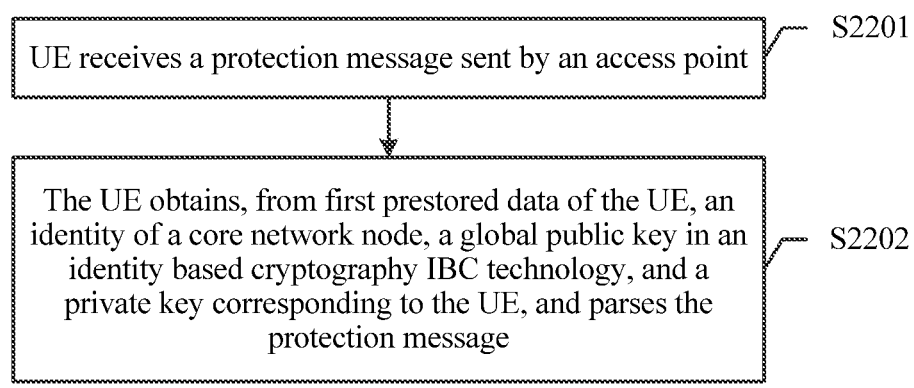
FIG. 22 is another schematic flowchart of a transmission data protection method according to an embodiment of the present invention.

FIG. 22 is another schematic flowchart of a transmission data protection method according to an embodiment of the present invention. The method provided in this embodiment of the present invention includes the following steps.

S2201. User equipment UE receives a protection message sent by an access point.

S2202. The UE obtains, from first prestored data of the UE, an identity of a core network node, a global public key in an identity based cryptography IBC technology, and a private key corresponding to the UE, and parses the protection message to obtain the transmission data.

In some feasible implementations, the global public key includes a first global public key and a second global public key, and the private key corresponding to the UE includes a third private key and a fourth private key, and before the UE receives the protection message sent by the access point, the method further includes obtaining, by the UE from a core network, identification information of the UE and core network processing parameters used by the UE to process the transmission data, and storing the identification information and the core network processing parameters as the first prestored data of the UE, where the core network processing parameters include at least one of the following two groups of data, including the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

In some feasible implementations, the first prestored data includes the identification information of the UE, the identity of the core network node, the $GPK_{enc}$, and the $SK_{UE\_ID\_enc}$, and that the UE obtains, from first prestored data of the UE, an identity of a core network node, a global public key in an identity based cryptography IBC technology, and a private key corresponding to the UE, and parses the protection message to obtain the transmission data includes obtaining, by the UE, the $GPK_{enc}$ and the $SK_{UE\_ID\_enc}$ from the first prestored data, and decrypting the protection message by using the $GPK_{enc}$ and the $SK_{UE\_ID\_enc}$, to obtain a decrypted message, generating a symmetric key K6 by using identification information of the core network node, the $GPK_{enc}$, and the $SK_{UE\_ID\_enc}$, decrypting the protection message by using the K6, to obtain a decrypted message, and generating a seventh message authentication code MAC 6 by using the K6 and the decrypted message, and obtaining the transmission data when the MAC 6 matches a sixth message authentication code MAC 5 carried in the decrypted message.

In a specific implementation, for implementations described in the steps of the transmission data protection method provided in this embodiment of the present invention, refer to related descriptions in the foregoing systems. Details are not described herein again.

Figure 23:
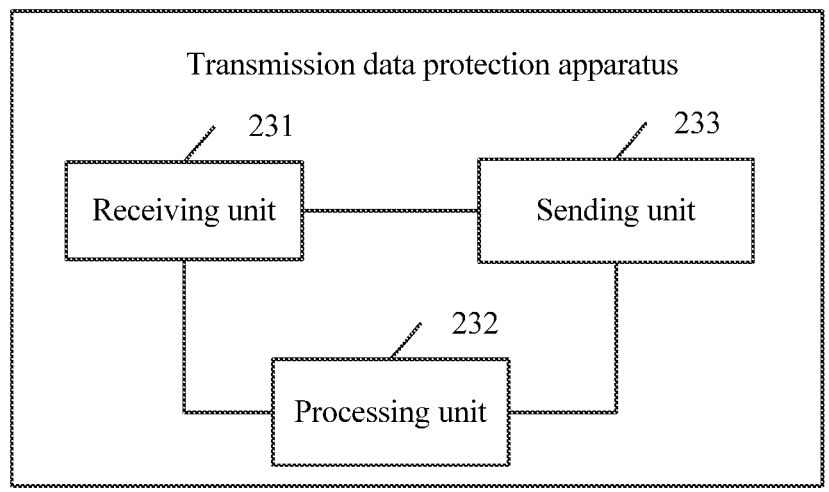
FIG. 23 is a schematic structural diagram of a transmission data protection apparatus according to an embodiment of the present invention.

FIG. 23 is a schematic structural diagram of a transmission data protection apparatus according to an embodiment of the present invention. The protection apparatus provided in this embodiment of the present invention includes a receiving unit 231, configured to receive a broadcast message sent by an access point, and store a public key for encryption that is carried in the broadcast message, a processing unit 232, configured to, when transmission data needs to be sent to the access point, obtain a global public key in an identity based cryptography IBC technology or a private key corresponding to user equipment UE from first prestored data of the UE, and protect the transmission data by using the public key for encryption and the global public key or the private key corresponding to the UE that are received by the receiving unit, to obtain a protection message, and a sending unit 233, configured to send the protection message processed by the processing unit to the access point, where the protection message carries an indication message indicating a protection manner of the transmission data.

In some feasible implementations, the global public key includes a first global public key and a second global public key, and the private key corresponding to the UE includes a third private key and a fourth private key, and the processing unit 232 is further configured to obtain, from a network or a KMS, processing parameters used by the UE to process the transmission data, and store the processing parameters as the first prestored data of the UE, where the processing parameters include an identity (operator ID1) of an operator to which the UE belongs, and at least one of the following three groups of data, including the first global public key, or the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

In some feasible implementations, the first prestored data includes the operator ID1 and the $GPK_{Sig}$, and the receiving unit 231 is specifically configured to determine, based on indication information carried in the received broadcast message, that the access point has a data signature function, and determine, based on identification information of the access point corresponding to the broadcast message, an identity (operator ID2) of an operator to which the access point belongs, match the operator ID2 with the operator ID1, and search the first prestored data for a third global public key $GPK_{Sig}1$ corresponding to the access point, when the broadcast message carries a signature Sig1, attempt to authenticate the broadcast message by using the $GPK_{Sig}1$ and the identification information of the access point, and when the broadcast message has been authenticated, determine to add, to the first prestored data, the public key for encryption that is carried in the broadcast message.

In some feasible implementations, the first prestored data includes the $GPK_{enc}$, and the processing unit 232 is specifically configured to, when the transmission data needs to be sent to the access point, obtain the public key for encryption and the $GPK_{enc}$ from the first prestored data, and encrypt the transmission data by using the public key for encryption and the $GPK_{enc}$, to obtain the protection message, where the protection manner of the transmission data is encrypting the transmission data by using the public key for encryption and the $GPK_{enc}$.

In some feasible implementations, the first prestored data includes the $GPK_{enc}$ and the $SK_{UE\_ID\_enc}$, and the processing unit 232 is specifically configured to, when the transmission data needs to be sent to the access point, obtain the public key for encryption, the $GPK_{enc}$, and the $SK_{UE\_ID\_enc}$ from the first prestored data, generate a first symmetric key K1 based on the public key for encryption, the $GPK_{enc}$, and the $SK_{UE\_ID\_enc}$, and input the transmission data and the K1 into a system function to obtain a third message authentication code MAC 2, and encrypt the transmission data, identification information of the UE, and the MAC 2 by using the public key for encryption and the $GPK_{enc}$, to obtain the protection message, where the protection manner of the transmission data is encrypting the transmission data, the identification information of the UE, and the MAC 2 by using the public key for encryption and the $GPK_{enc}$.

In some feasible implementations, the first prestored data includes the $GPK_{enc}$ and the $SK_{UE\_ID\_Sig}$, and the processing unit 232 is specifically configured to, when the transmission data needs to be sent to the access point, obtain the public key for encryption, the $GPK_{enc}$, the $GPK_{sig}$, and the $SK_{UE\_ID\_Sig}$ from the first prestored data, and sign the transmission data based on the $GPK_{sig}$ and the $SK_{UE\_ID\_Sig}$ to obtain a signature Sig2, and encrypt the transmission data, identification information of the UE, and the Sig2 by using the public key for encryption and the $GPK_{enc}$, to obtain the protection message, where the protection manner of the transmission data is encrypting the transmission data and the Sig2 by using the public key for encryption and the $GPK_{enc}$.

In a specific implementation, for implementations performed by the units in the transmission data protection apparatus provided in this embodiment of the present invention, refer to corresponding implementations in related data transmission in the foregoing systems. Details are not described herein again.

Figure 24:
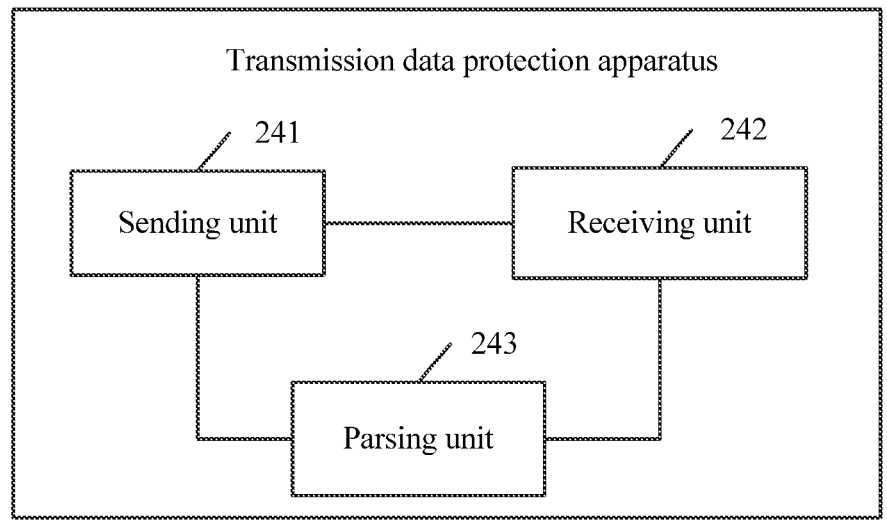
FIG. 24 is another schematic structural diagram of a transmission data protection apparatus according to an embodiment of the present invention.

FIG. 24 is another schematic structural diagram of a transmission data protection apparatus according to an embodiment of the present invention. The protection apparatus provided in this embodiment of the present invention includes a sending unit 241, configured to send a broadcast message, where the broadcast message carries a public key for encryption, a receiving unit 242, configured to receive a protection message that is sent by user equipment UE and that is obtained after the UE protects transmission data based on the public key for encryption sent by the sending unit, where the protection message carries an indication message indicating a protection manner of the transmission data sent by the UE, and a parsing unit 243, configured to obtain a global public key in an identity based cryptography IBC technology and a private key corresponding to the access point from second prestored data of the access point based on the indication message indicating the protection manner that is received by the receiving unit, and parse the protection message by using the global public key and the private key corresponding to the access point, to obtain the transmission data sent by the UE; where the sending unit 241 is further configured to send, to a core network, the transmission data that is obtained by the parsing unit through parsing and that is sent by the UE.

In some feasible implementations, the global public key includes a first global public key and a second global public key, and the private key corresponding to the access point includes a first private key and a second private key, and the parsing unit 243 is further configured to obtain system parameters from a network or a key management system KMS, and store the system parameters as the second prestored data of the access point, where the system parameters include the public key for encryption and at least one of the following two groups of data, including the first global public key and the first private key, or the second global public key and the second private key, where the first global public key is a global public key $GPK_{enc}$ for data encryption in the IBC technology, the first private key is a private key $SK_{BS\_ID\_enc}$ for data encryption corresponding to the access point in the IBC technology, the second global public key is a global public key $GPK_{Sig}$ for data signature in the IBC technology, and the second private key is a private key $SK_{BS\_ID\_Sig}$ for data signature corresponding to the access point in the IBC technology.

In some feasible implementations, the public key for encryption is a base station BS identity BS_ID, or the public key for encryption includes a BS_ID, or the public key for encryption includes a media access control MAC address of a Wireless Fidelity Wi-Fi access point AP or a service set identifier SSID of a Wi-Fi AP, or the public key for encryption includes a hotspot UE identity UE_ID or an international mobile subscriber identity IMSI of hotspot UE.

In some feasible implementations, the second prestored data includes the $GPK_{Sig}$ and the $SK_{BS\_ID\_Sig}$, and the sending unit 241 is specifically configured to sign the broadcast message by using the $GPK_{Sig}$ and the $SK_{BS\_ID\_Sig}$, to obtain a signature Sig1 of the broadcast message, and add indication information indicating that the access point has a data signature function or the signature Sig1 of the broadcast message to the broadcast message.

In some feasible implementations, the second prestored data includes the $GPK_{enc}$, the $SK_{BS\_ID\_enc}$, the $GPK_{Sig}$, and the $SK_{BS\_ID\_Sig}$, and the parsing unit 243 is specifically configured to determine the protection manner of the transmission data based on the indication message indicating the protection manner, obtain the $SK_{BS\_ID\_enc}$ and the $GPK_{enc}$ from the second prestored data, and decrypt the protection message by using the $SK_{BS\_ID\_enc}$ and the $GPK_{enc}$, to obtain a decrypted message.

In some feasible implementations, the second prestored data includes the public key for encryption, the $GPK_{enc}$, and the $SK_{BS\_ID\_enc}$, and the parsing unit 243 is specifically configured to determine the protection manner of the transmission data based on the indication message indicating the protection manner, obtain the $GPK_{enc}$ and the $SKB_{BS\_ID\_enc}$ from the second prestored data, and decrypt the protection message by using the $SK_{BS\_ID\_enc}$ and the $GPK_{enc}$, to obtain a decrypted message, and the sending unit 241 is specifically configured to obtain a third message authentication code MAC 2, identification information of the UE, and the transmission data that are carried in the protection message from the decrypted message obtained by the parsing unit through parsing, generate a symmetric key K2 by using the identification information of the UE, the $GPK_{enc}$, and the $SK_{BS\_ID\_enc}$, and calculate a fourth message authentication code MAC 3 by using the symmetric key K2, the identification information of the UE, and the transmission data obtained through decryption, and when the MAC 3 matches the MAC 2, send, to the core network, the transmission data sent by the UE.

In some feasible implementations, the second prestored data includes the $GPK_{enc}$, the $SK_{BS\_ID\_enc}$, and the $GPK_{Sig}$, and the parsing unit 243 is specifically configured to determine the protection manner of the transmission data based on the indication message indicating the encryption manner, obtain the $GPK_{enc}$ and the $SK_{BS\_ID\_enc}$ from the second prestored data, and decrypt the protection message by using the $SK_{BS\_ID\_enc}$ and the $GPK_{enc}$, to obtain the transmission data, and the sending unit 241 is specifically configured to obtain identification information of the UE and the signature Sig2 from a decrypted message obtained by decrypting the protection message, determine the protection manner of the transmission data based on the indication message indicating the protection manner, and obtain the $GPK_{Sig}$ from the second prestored data, and attempt to authenticate the protection message by using the identification information of the UE and the $GPK_{Sig}$, and when the protection message has been authenticated, send, to the core network, the transmission data sent by the UE.

In a specific implementation, for implementations performed by the units in the transmission data protection apparatus provided in this embodiment of the present invention, refer to corresponding implementations in related data transmission in the foregoing systems. Details are not described herein again.

Figure 25:
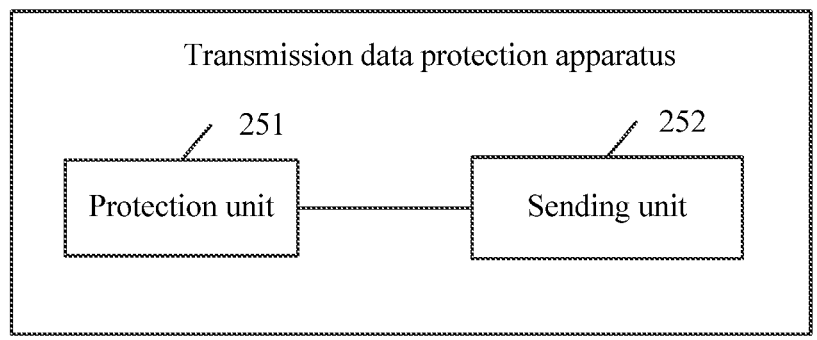
FIG. 25 is another schematic structural diagram of a transmission data protection apparatus according to an embodiment of the present invention.

FIG. 25 is another schematic structural diagram of a transmission data protection apparatus according to an embodiment of the present invention. The protection apparatus provided in this embodiment of the present invention includes a protection unit 251, configured to, when transmission data needs to be sent, obtain a public key for encryption, and a global public key in an identity based cryptography IBC technology or a private key corresponding to user equipment from first prestored data of the UE, and protect the transmission data by using the public key for encryption and the global public key or the private key corresponding to the UE, to obtain a protection message, and a sending unit 252, configured to send, to an access point, the protection message obtained by the protection unit through processing, so that the access point sends the protection message to a core network node, where the protection message carries an indication message indicating a protection manner of the transmission data.

In some feasible implementations, the global public key includes a first global public key and a second global public key, and the private key corresponding to the UE includes a third private key and a fourth private key, and the protection unit 251 is further configured to obtain, from a core network, the public key for encryption and core network processing parameters used by the UE to process the transmission data, and store the public key for encryption and the core network processing parameters as the first prestored data of the UE, where the core network processing parameters include at least one of the following three groups of data, including the first global public key, or the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

In some feasible implementations, the first prestored data includes the public key for encryption and the $GPK_{enc}$, and the protection unit 251 is specifically configured to, when the transmission data needs to be sent to the access point, obtain the public key for encryption and the $GPK_{enc}$ from the first prestored data, and encrypt the transmission data by using the public key for encryption and the $GPK_{enc}$, to obtain the protection message, where the protection manner of the transmission data is encrypting the transmission data by using the public key for encryption and the $GPK_{enc}$.

In some feasible implementations, the first prestored data includes the public key for encryption, the $GPK_{enc}$, and the $SK_{UE\_ID\_enc}$, and the protection unit 251 is specifically configured to, when the transmission data needs to be sent to the access point, obtain the public key for encryption, the $GPK_{enc}$, and the $SK_{UE\_ID\_enc}$ from the first prestored data, generate a symmetric key K3 based on the public key for encryption, the $GPK_{enc}$, and the $SK_{UE\_ID\_enc}$, and input the transmission data and the K3 into a system function to obtain a fourth message authentication code MAC 3, and encrypt the transmission data and the MAC 3 by using the public key for encryption and the $GPK_{enc}$, to obtain the protection message, where the protection manner of the transmission data is encrypting the transmission data and the MAC 3 by using the public key for encryption and the $GPK_{enc}$.

In some feasible implementations, the first prestored data includes the public key for encryption, the $GPK_{enc}$, and the $SK_{UE\_ID\_sig}$ and the protection unit 251 is specifically configured to, when the transmission data needs to be sent to the access point, obtain the public key for encryption, the $GPK_{enc}$, the $GPK_{sig}$, and the $SK_{UE\_ID\_Sig}$ from the first prestored data, and sign the transmission data based on the $GPK_{sig}$ and the $SK_{UE\_ID\_Sig}$ to obtain a signature Sig3, and encrypt the transmission data and the signature Sig2 by using the public key for encryption and the $GPK_{enc}$, to obtain the protection message, where the protection manner of the transmission data is encrypting the transmission data and the signature by using the public key for encryption and the $GPK_{enc}$.

In a specific implementation, for implementations performed by the units in the transmission data protection apparatus provided in this embodiment of the present invention, refer to corresponding implementations in related data transmission in the foregoing systems. Details are not described herein again.

Figure 26:
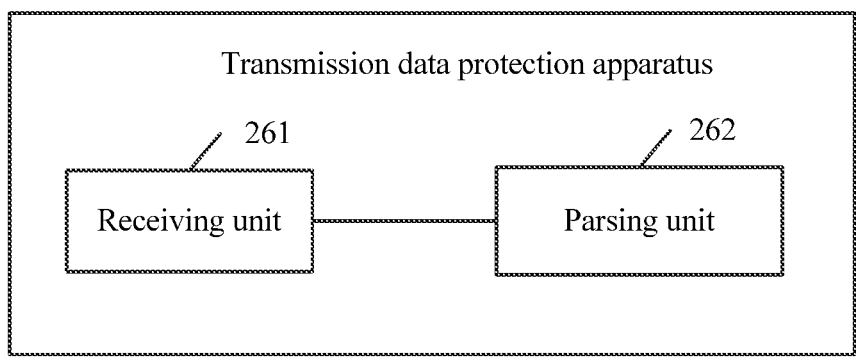
FIG. 26 is another schematic structural diagram of a transmission data protection apparatus according to an embodiment of the present invention.

FIG. 26 is another schematic structural diagram of a transmission data protection apparatus according to an embodiment of the present invention. The protection apparatus provided in this embodiment of the present invention includes a receiving unit 261, configured to receive a protection message sent by an access point, where the protection message carries an indication message indicating a protection manner of the transmission data sent by user equipment UE, and a parsing unit 262, configured to obtain a global public key in an identity based cryptography IBC technology and a private key corresponding to the core network node from second prestored data of the core network node based on the indication message indicating the protection manner that is received by the receiving unit, and parse the protection message by using the global public key and the private key corresponding to the core network node, to obtain the transmission data sent by the UE.

In some feasible implementations, the global public key includes a first global public key and a second global public key, and the private key corresponding to the core network node includes a fifth private key and a sixth private key, and the parsing unit 262 is further configured to obtain core network system parameters from a key management system KMS, and store the core network system parameters as the second prestored data of the core network access point, where the core network system parameters include a public key for encryption and at least one of the following two groups of data, including the first global public key and the fifth private key, or the second global public key and the sixth private key, where the first global public key is a global public key $GPK_{enc}$ for data encryption in the IBC technology, the fifth private key is a private key $SK_{CP\_ID\_enc}$ for data encryption corresponding to the core network node in the IBC technology, the second global public key is a global public key $GPK_{Sig}$ for data signature in the IBC technology, and the sixth private key is a private key $SK_{CP\_ID\_Sig}$ for data signature corresponding to the core network node in the IBC technology.

In some feasible implementations, the public key for encryption is an identity of the core network authentication node, or the public key for encryption includes an identity of the core network node.

In some feasible implementations, the second prestored data includes the $GPK_{enc}$ and the $SK_{CP\_ID\_enc}$, and the parsing unit 262 is specifically configured to determine the protection manner of the transmission data based on the indication message indicating the protection manner, obtain the $SK_{CP\_ID\_enc}$ and the $GPK_{enc}$ from the second prestored data, and decrypt the protection message by using the $SK_{CP\_ID\_enc}$ and the $GPK_{enc}$, to obtain the transmission data of the UE.

In some feasible implementations, the second prestored data includes the $GPK_{enc}$ and the $SK_{CP\_ID\_enc}$, and the parsing unit 262 is specifically configured to determine the protection manner of the transmission data based on the indication message indicating the protection manner, obtain the $GPK_{enc}$ and the $SK_{CP\_ID\_enc}$ from the second prestored data, and decrypt the protection message to obtain a decrypted message, obtain a fourth message authentication code MAC 3 carried in the decrypted message, and generate a symmetric key K4 by using identification information of the UE, the $GPK_{enc}$, and the $SK_{CP\_ID\_enc}$, and generate a fifth message authentication code MAC 4 by using the K4, the identification information of the UE, and the decrypted message, and obtain the transmission data when the MAC 4 matches the MAC 3.

In some feasible implementations, the second prestored data includes the public key for encryption, the $GPK_{enc}$, the $SK_{CP\_ID\_enc}$, and the $GPK_{Sig}$, and the parsing unit 262 is specifically configured to determine the protection manner of the transmission data based on the indication message indicating the encryption manner, and decrypt the protection message by using the $GPK_{enc}$, the public key for encryption, and the $SK_{CP\_ID\_enc}$ that are obtained from the second prestored data, and obtain the signature Sig3 from a decrypted message obtained by decrypting the protection message, attempt to authenticate the protection message by using identification information of the UE and the $GPK_{sig}$, and obtain the transmission data when the protection message has been authenticated.

In a specific implementation, for implementations performed by the units in the transmission data protection apparatus provided in this embodiment of the present invention, refer to corresponding implementations in related data transmission in the foregoing systems. Details are not described herein again.

Figure 27:
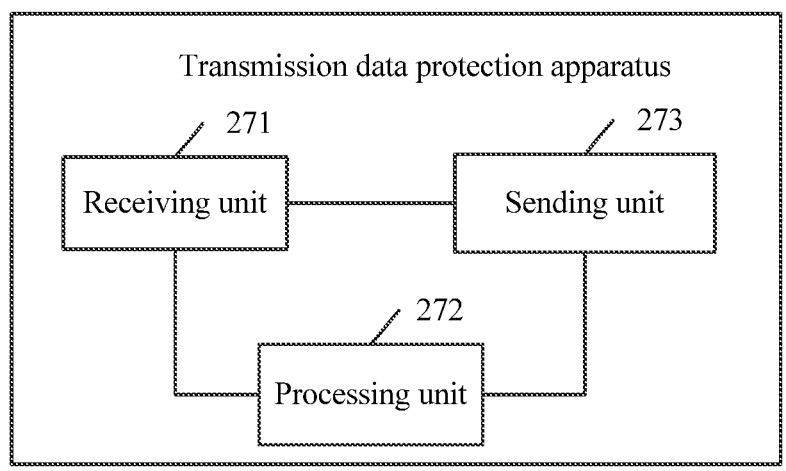
FIG. 27 is another schematic structural diagram of a transmission data protection apparatus according to an embodiment of the present invention.

FIG. 27 is another schematic structural diagram of a transmission data protection apparatus according to an embodiment of the present invention. The protection apparatus provided in this embodiment of the present invention includes a receiving unit 271, configured to receive transmission data delivered by a user plane gateway, a processing unit 272, configured to obtain, from second prestored data of a core network node, identification information of user equipment UE, a global public key in an identity based cryptography IBC technology, and a private key corresponding to the core network node, and protect the transmission data by using the identification information of the UE, the global public key, and the private key, to obtain a protection message, and a sending unit 273, configured to send, to an access point, the protection message obtained by the processing unit through processing.

In some feasible implementations, the global public key includes a first global public key and a second global public key, and the private key corresponding to the core network node includes a fifth private key and a sixth private key, and the processing unit 272 is further configured to obtain core network system parameters from a network or a key management system KMS, and store the core network system parameters as the second prestored data of the core network access point, where the core network system parameters include a public key for encryption and at least one of the following two groups of data, including the first global public key and the fifth private key, or the second global public key and the sixth private key, where the first global public key is a global public key $GPK_{enc}$ for data encryption in the IBC technology, the fifth private key is a private key $SK_{CP\_ID\_enc}$ for data encryption corresponding to the core network node in the IBC technology, the second global public key is a global public key $GPK_{Sig}$ for data signature in the IBC technology, and the sixth private key is a private key $SK_{CP\_ID\_Sig}$ for data signature corresponding to the core network node in the IBC technology.

In some feasible implementations, the second prestored data includes the $GPK_{enc}$ and the $SK_{CP\_ID\_enc}$, and the processing unit 272 is specifically configured to obtain the identification information of the UE, the $GPK_{enc}$, and the $SK_{CP\_ID\_enc}$ from the second prestored data, generate a symmetric key K5 based on the identification information of the UE, the $GPK_{enc}$, and the $SK_{CP\_ID\_enc}$, and input the transmission data and the K5 into a system function to obtain a sixth message authentication code MAC 5, and encrypt the transmission data by using the K5, to obtain the protection message.

In a specific implementation, for implementations performed by the units in the transmission data protection apparatus provided in this embodiment of the present invention, refer to corresponding implementations in related data transmission in the foregoing systems. Details are not described herein again.

Figure 28:
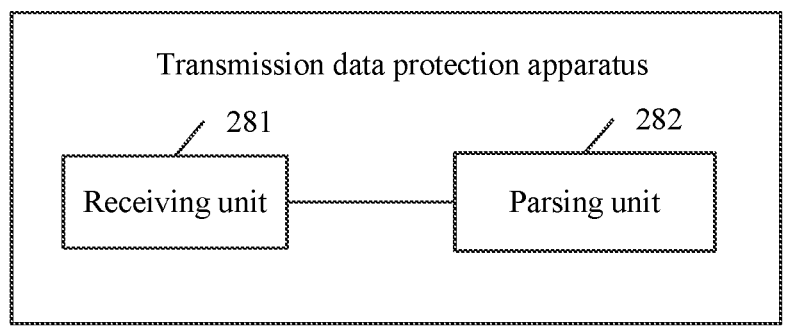
FIG. 28 is another schematic structural diagram of a transmission data protection apparatus according to an embodiment of the present invention.

FIG. 28 is another schematic structural diagram of a transmission data protection apparatus according to an embodiment of the present invention. The protection apparatus provided in this embodiment of the present invention includes a receiving unit 281, configured to receive a protection message sent by an access point, and a parsing unit 282, configured to obtain, from first prestored data of user equipment, an identity of a core network node, a global public key in an identity based cryptography IBC technology, and a private key corresponding to the UE, and parse the protection message to obtain the transmission data.

In some feasible implementations, the global public key includes a first global public key and a second global public key, and the private key corresponding to the UE includes a third private key and a fourth private key, and the parsing unit 282 is further configured to obtain, from a core network, identification information of the UE and core network processing parameters used by the UE to process the transmission data, and store the identification information and the core network processing parameters as the first prestored data of the UE, where the core network processing parameters include at least one of the following two groups of data, including the first global public key and the third private key, or the second global public key and the fourth private key, where the first global public key is a global public key $GPK_{enc}$ for data encryption in the IBC technology, the third private key is a private key $SK_{UE\_ID\_enc}$ for data encryption corresponding to the UE_ID in the IBC technology, the second global public key is a global public key $GPK_{Sig}$ for data signature in the IBC technology, and the fourth private key is a private key $SK_{UE\_ID\_Sig}$ for data signature corresponding to the UE_ID in the IBC technology.

In some feasible implementations, the first prestored data includes the identification information of the UE, the identity of the core network node, the $GPK_{enc}$, and the $SK_{UE\_ID\_enc}$, and the parsing unit 282 is specifically configured to obtain the $GPK_{enc}$ the $SK_{UE\_ID\_enc}$ from the first prestored data, and decrypt the protection message by using the $GPK_{enc}$ and the $SK_{UE\_ID\_enc}$, to obtain a decrypted message, generate a symmetric key K6 by using identification information of the core network node, the $GPK_{enc}$, and the $SK_{UE\_ID\_enc}$, decrypt the protection message by using the K6, to obtain a decrypted message, and generate a seventh message authentication code MAC 6 by using the K6 and the decrypted message, and obtain the transmission data when the MAC 6 matches a MAC 5 carried in the decrypted message.

In a specific implementation, for implementations performed by the units in the transmission data protection apparatus provided in this embodiment of the present invention, refer to corresponding implementations in related data transmission in the foregoing systems. Details are not described herein again.

In the specification, claims, and accompanying drawings of the present invention, the terms "first", "second", "third", "fourth", and so on are intended to distinguish between different objects but do not indicate a particular order. Moreover, the terms "including", "including", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (Read-Only Memory, ROM), or a random access memory (Random Access Memory, RAM).

What are disclosed above are merely examples of embodiments of the present invention, and certainly are not intended to limit the scope of the claims of the present invention. Therefore, equivalent variations made in accordance with the claims of the present invention shall fall within the scope of the present invention.

What is claimed is:

1. A transmission data protection system, comprising:
   a user equipment (UE); and
   an access point configured to:
   obtain system parameters from at least one of a network or a key management system (KMS), wherein the system parameters comprise a public key for encryption and at least one group of data selected from a first global public key and a first private key, or a second global public key and a second private key, wherein the first global public key is a global public key ($GPK_{enc}$) for data encryption in an identity based cryptography (IBC) technology, wherein the first private key is a private key ($SK_{BS\_ID\_enc}$) for data encryption corresponding to the access point in the IBC technology, wherein the second global public key is a global public key ($GPK_{Sig}$) for data signature in the IBC technology, and wherein the second private key is a private key ($SK_{BS\_ID\_Sig}$ for data signature corresponding to the access point in the IBC technology, and wherein the public key for encryption is at least one of is base station (BS) identity (BS_ID), comprises a BS_ID, comprises a media access control (MAC) address of a Wi-Fi access point (AP), comprises a service set identifier (SSID) of a Wi-Fi AP, comprises a hotspot UE identity (UE_ID), or comprises an international mobile subscriber identity (IMSI) of hotspot UE;
   store the system parameters as second prestored data of the access point; and
   send a broadcast message after obtaining the system parameters, wherein the broadcast message carries the public key for encryption;
   wherein the UE is configured to receive the broadcast message of the access point and store the public key for encryption;
   wherein the UE is further configured to perform, in response to transmission data needing to be sent to the access point:
   obtain at least one of a global public key in an identity based cryptography (IBC) technology or a private key corresponding to the UE from first prestored data of the UE, wherein the global public key comprises the first global public key and the second global public key; and
   protect the transmission data using the public key for encryption and the at least one of the global public key or the private key corresponding to the UE, and obtain a protection message;
   wherein the UE is further configured to send the protection message to the access point, wherein the protection message carries an indication message indicating a protection manner of the transmission data;
   wherein the access point is further configured to perform, after receiving the protection message:
   obtain the global public key and a private key corresponding to the access point from second prestored data of the access point according to the indication message indicating the protection manner, wherein the private key corresponding to the access point comprises the first private key and the second private key; and
   parse the protection message using the global public key and the private key corresponding to the access point, and obtain the transmission data sent by the UE; and
   wherein the access point is further configured to send, to a core network, the transmission data that is obtained through parsing and that is sent by the UE.

2. The protection system according to claim 1, wherein the global public key comprises a first global public key and a second global public key, and wherein the private key corresponding to the UE comprises a third private key and a fourth private key;
   wherein the UE is further configured to obtain, before receiving the broadcast message of the access point, from at least one of a network or a KMS, processing parameters used by the UE to process the transmission data, and store the processing parameters as the first prestored data of the UE;
   wherein the processing parameters comprise a first operator identity of an operator to which the UE belongs, and at least one group of data selected from the first global public key, or the first global public key and the third private key, or the second global public key and the fourth private key;
   wherein the first global public key is a global public key ($GPK_{enc}$) for data encryption in the IBC technology, wherein the third private key is a private key ($SK_{UE\_ID\_enc}$) for data encryption corresponding to the UE_ID in the IBC technology, wherein the second global public key is a global public key ($GPK_{Sig}$) for data signature in the IBC technology, and wherein the fourth private key is a private key ($SK_{UE\_ID\_Sig}$) for data signature corresponding to the UE_ID in the IBC technology.

3. The protection system according to claim 2, wherein the second prestored data comprises the $GPK_{Sig}$ and the $SK_{BS\_ID\_Sig}$; and
   wherein the access point is further configured to sign the broadcast message using the $GPK_{Sig}$ and the $SK_{BS\_ID\_Sig}$, to obtain a first signature of the broadcast message, and add indication information indicating that the access point has a data signature function or the first signature of the broadcast message to the broadcast message.

4. The protection system according to claim 3, wherein the first prestored data comprises the first operator identity and the $GPK_{Sig}$; and
   wherein the UE is configured to:
   determine, according to the indication information carried in the received broadcast message, that the access point has a data signature function, and to determine, according to identification information of the access point corresponding to the broadcast message, a second operator identity of an operator to which the access point belongs;
   match the second operator identity with the first operator identity, and search the first prestored data for a third global public key $GPK_{Sig}1$ corresponding to the access point;
   attempt, in response to the broadcast message carrying the first signature, to authenticate the broadcast message using the $GPK_{Sig}1$ and the identification information of the access point; and
   determine to add, to the first prestored data, in response to the broadcast message being authenticated, the public key for encryption that is carried in the broadcast message.

5. The protection system according to claim 4, wherein the first prestored data comprises the $GPK_{enc}$ and the $SK_{UE\_ID\_enc}$; and
the UE is specifically configured to:
when the transmission data needs to be sent to the access point, obtain the public key for encryption, the $GPK_{enc}$, and the $SK_{UE\_ID\_enc}$ from the first prestored data;
generate a first symmetric key according to the public key for encryption, the $GPK_{enc}$, and the $SK_{UE\_ID\_enc}$, and input the transmission data and the first symmetric key into a system function to obtain a first message authentication code; and
encrypt the transmission data, identification information of the UE, and the first message authentication code using the public key for encryption and the $GPK_{enc}$, to obtain the protection message, wherein
the protection manner of the transmission data is encrypting the transmission data, the identification information of the UE, and the first message authentication code using the public key for encryption and the $GPK_{enc}$.

6. The protection system according to claim 5, wherein the second prestored data comprises the public key for encryption, the $GPK_{enc}$, and the $SK_{BS\_ID\_enc}$; and
wherein the access point is configured to:
determine the protection manner of the transmission data according to the indication message indicating the protection manner;
obtain the $GPK_{enc}$ and the $SK_{BS\_ID\_enc}$ from the second prestored data;
decrypt the protection message using the $SK_{BS\_ID\_enc}$ and the $GPK_{enc}$, to obtain a decrypted message;
obtain the first message authentication code, the identification information of the UE, and the transmission data that are carried in the protection message from the decrypted message;
generate a second symmetric key using the identification information of the UE, the $GPK_{enc}$, and the $SK_{BS\_ID\_enc}$;
calculate a second message authentication code using the second symmetric key, the identification information of the UE, and the transmission data obtained through decryption; and
send, to the core network, in response to the second message authentication code matching the first message authentication code, the transmission data sent by the UE.

7. The protection system according to claim 4, wherein the first prestored data comprises the $GPK_{enc}$; and
wherein the UE is configured to:
obtain, in response to the transmission data needing to be sent to the access point, the public key for encryption and the $GPK_{enc}$ from the first prestored data; and
encrypt the transmission data using the public key for encryption and the $GPK_{enc}$, to obtain the protection message;
wherein the protection manner of the transmission data is encrypting the transmission data using the public key for encryption and the $GPK_{enc}$.

8. The protection system according to claim 7, wherein the second prestored data comprises the $GPK_{enc}$, the $SK_{BS\_ID\_enc}$, the $GPK_{Sig}$, and the $SK_{BS\_ID\_Sig}$; and
wherein the access point is configured to:
determine the protection manner of the transmission data according to the indication message indicating the protection manner;
obtain the $SK_{BS\_ID\_enc}$ and the $GPK_{enc}$ from the second prestored data;
decrypt the protection message using the $SK_{BS\_ID\_enc}$ and the $GPK_{enc}$, to obtain a decrypted message; and
send, to the core network, the transmission data that is carried in the decrypted message and that is sent by the UE.

* * * * *